United States Patent
Kasahara et al.

(10) Patent No.: US 7,854,971 B2
(45) Date of Patent: Dec. 21, 2010

(54) CELLULOSE ESTER FILM, PRODUCTION METHOD OF THE SAME, POLARIZING PLATE AND LIQUID CRYSTAL DISPLAY

(75) Inventors: Kenzo Kasahara, Hachioji (JP); Satomi Kawabe, Hachioji (JP); Koichi Saito, Kawagoe (JP); Kazuaki Nakamura, Kyoto (JP); Rumiko Yamada, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 316 days.

(21) Appl. No.: 11/757,498

(22) Filed: Jun. 4, 2007

(65) Prior Publication Data

US 2008/0118667 A1    May 22, 2008

(30) Foreign Application Priority Data

Jun. 13, 2006    (JP) .............................. 2006-163230

(51) Int. Cl.
*G02F 1/13363* (2006.01)

(52) U.S. Cl. .................. 428/1.33; 428/1.54; 106/139.3; 349/96; 349/117

(58) Field of Classification Search .................. 428/1.3, 428/1.31, 1.33, 1.54; 349/96, 117–118; 106/139.3; 252/404

See application file for complete search history.

(56) References Cited

U.S. PATENT DOCUMENTS

| | | | | |
|---|---|---|---|---|
| 4,774,274 | A * | 9/1988 | Takata et al. | 524/291 |
| 4,839,405 | A * | 6/1989 | Speelman et al. | 524/99 |
| 5,214,193 | A * | 5/1993 | Inoue et al. | 560/140 |
| 6,060,545 | A * | 5/2000 | Gilg | 524/199 |
| 2003/0020208 | A1* | 1/2003 | Tasaka et al. | 264/217 |
| 2003/0080326 | A1* | 5/2003 | Schunk et al. | 252/589 |
| 2003/0097963 | A1* | 5/2003 | Schunk et al. | 106/170.11 |
| 2003/0138654 | A1* | 7/2003 | Kido et al. | 428/521 |
| 2004/0096594 | A1* | 5/2004 | Takeuchi et al. | 428/1.2 |

FOREIGN PATENT DOCUMENTS

WO    WO 2005064369 A1 *    7/2005

\* cited by examiner

*Primary Examiner*—Sophie Hon
(74) *Attorney, Agent, or Firm*—Lucas & Mercanti, LLP

(57) ABSTRACT

A cellulose ester film comprising a cellulose ester and a compound containing: an acrylate group or a methacrylate group; and a phenolic hydroxyl group, in the molecule.

13 Claims, No Drawings

CELLULOSE ESTER FILM, PRODUCTION METHOD OF THE SAME, POLARIZING PLATE AND LIQUID CRYSTAL DISPLAY

This application is based on Japanese Patent Application No. 2006-163230 filed on Jun. 13, 2006 in Japanese Patent Office, the entire content of which is hereby incorporated by reference.

FIELD OF THE INVENTION

The present invention relates to a cellulose ester film, a production method of the same, a polarizing plate and a liquid crystal display.

BACKGROUND OF THE INVENTION

The cellulose ester film is widely used for its optical and physical advantages as a protective film for a polarizing plate. However, the film is manufactured by the casting film formation method using a halogen-containing solvent, and therefore, costs required for solvent recovery impose a heavy burden on manufacturers. Various types of solvents other than the halogen-containing solvent have been tested, however, no alternative that could provide satisfactory solubility has ever been found out so far. In addition to the effort to find out an alternative solvent, efforts have been made to develop a new technique for dissolution such as a cooling method (for example, refer to Patent Document 1). However, further studies are necessary due to tough problems for industrial implementation. Further, a technique has been, disclosed to produce a cellulose ester film for optical use by a melt casting method without using a solvent (for example, refer to Patent Document 2).

There have been a disclosure of a technique wherein spectral properties and mechanical properties are improved by adding a hindered phenol antioxidant, a hindered amine light stabilizer or an acid scavenger into the cellulose ester at a predetermined ratio (for example, refer to Patent Document 3). In another technique having been disclosed, a phenol compound containing an acrylate group at the terminus is used to minimize reduction in the molecular weight of a polymer containing a cycloolefin structure and to obtain a polymer sheet characterized by excellent transparency and heat resistance (for example, refer to Patent Document 4).

However, the cellulose ester is a polymer characterized by a very high viscosity at the time of melting, as well as by a high glass transfer temperature. Even if the cellulose ester is melted to extrude from a die and to cast over a cooling drum or a cooling belt, it is difficult to achieve satisfactory leveling. The cellulose ester solidifies in a short time after extrusion. Thus, it has been found that such a cellulose ester may have a problem in forming a melt-cast film exhibiting a uniform optical property, for example, a uniform retardation property, specifically, a uniform retardation property in the lateral direction of the film. It has also been found that the cellulose ester film formed by a melt-casting method may be inferior to a cellulose ester film formed by a solution-casting method in physical properties, such as colaration of the film, haze, bright spots due to foreign substances (also referred to as bright foreign defects), since it is melted and cast at a higher temperature to form a film.

Patent Document 1 Japanese Patent Application Publication Open to Public Inspection (hereafter referred to as JP-A) No. 10-95861

Patent Document 2 JP-A No. 2000-352620
Patent Document 3 JP-A No. 2003-192920
Patent Document 4 JP-A No. 2002-114949

SUMMARY OF THE INVENTION

An object of the present invention is to provide: a cellulose ester film which reduces a burden for production and facility due to drying and recovering the solvent, and exhibits: optical properties free from a fluctuation in a retardation vale, coloration of the film, haze and bright foreign defects; a method of producing the cellulose ester film; and a polarizing plate and a liquid crystal display using the same.

One of the aspects to achieve the above object of the present invention is a cellulose ester film comprising a cellulose ester and a compound containing: an acrylate group or a methacrylate group; and a phenolic hydroxyl group, in the molecule.

DESCRIPTION OF THE PREFERRED EMBODIMENTS

The above object of the present invention is achieved by the following structures:

(1) A cellulose ester film comprising a cellulose ester and a compound containing: an acrylate group or a methacrylate group; and a phenolic hydroxyl group, in the molecule.

(2) The cellulose ester film of Item (1), wherein the compound containing: an acrylate group or a methacrylate group; and a phenolic hydroxyl group, in the molecule is represented by Formula (A):

Formula (A)

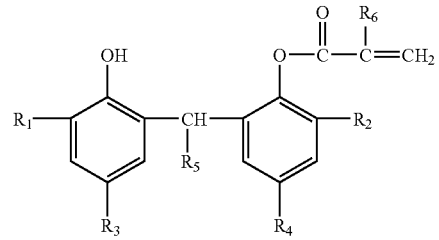

wherein $R_1$ through $R_5$ each represent a hydrogen atom or an alkyl group containing 1 through 10 carbon atoms; $R_1$ through $R_5$ may be the same or different from each other; and $R_6$ represents a hydrogen atom or a methyl group.

(3) The cellulose ester film of Item (2), wherein the compound represented by Formula (A) is Compound S:

Compound S

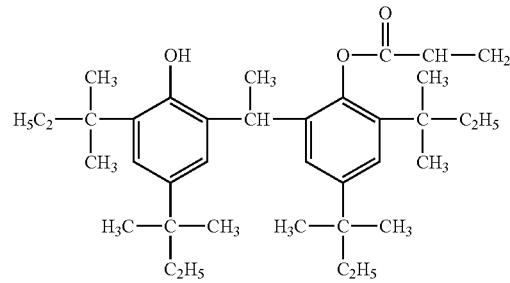

(4) The cellulose ester film of any one of Items (1) to (3) further comprising a compound represented by Formula (p):

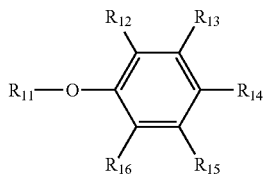

Formula (p)

wherein $R_{11}$, $R_{12}$, $R_{13}$, $R_{14}$, $R_{15}$, and $R_{16}$ each represent a substituent, provided that the compound containing: an acrylate group or a methacrylate group; and a phenolic hydroxyl group, in the molecule is not included in the compound represented by Formula (p).

(5) The cellulose ester film of Item (4), wherein the compound represented by Formula (p) is pentaerythritoltetrakis [3-(3,5-di-t-butyl-4-hydroxyphenyl) propionate].

(6) The cellulose ester film of any one of Items (1) to (5) further comprising a compound represented by Formula (B):

$$Ar^1-L^1-Ar^2 \qquad \text{Formula (B)}$$

wherein $Ar^1$ and $Ar^2$ each independently represent an aromatic group, and $L^1$ represents a divalent linkage group selected from the group consisting of a single bond, an alkylene group, an alkenylene group, an alkynylene group, an —O— group, a —CO— group and a combination thereof, provided that the compound containing: an acrylate group or a methacrylate group; and a phenolic hydroxyl group, in the molecule is not included in the compound represented by Formula (B).

(7) The cellulose ester film of any one of Items (1) to (6) further comprising a polyalcohol ester.

(8) The cellulose ester film of any one of Items (1) to (7), wherein the cellulose ester film is a cellulose acetate propionate film having an acetyl substitution degree of 0.9 to 1.6; and a propionyl substitution of 1.1 to 1.8

(9) The cellulose ester film of any one of Items (1) to (8), wherein the cellulose ester film exhibits:

an in-plane retardation value Ro of 10 to 100 nm, Ro being represented by Equation (i);

a retardation value in a thickness direction Rt of 80 to 400 nm, Rt being represented by Equation (ii); and an Rt/Ro value of 2.0 to 5.0, wherein Ro and Rt being measured at a wavelength of 590 nm, under a condition of 23° C. and 55% RH:

$$Ro=(nx-ny) \times d \qquad \text{Equation (i)}$$

$$Rt=\{(nx+ny)/2-nz\} \times d \qquad \text{Equation (ii)}$$

wherein nx represents a refractive index in a slow axis direction of the cellulose ester film; fly represents a refractive index in a direction perpendicular to the slow axis in a plane of the cellulose ester film, and nz represents a refractive index in a thickness direction of the cellulose ester film; and d represents a thickness (nm) of the cellulose ester film.

(10) The cellulose ester film of any one of Items (1) to (8) having an antireflection layer.

(11) A polarizing plate comprising a polarizer and the cellulose ester film of any one of Items (1) to (9) provided on one surface of the polarizer.

(12) A polarizing plate comprising:

a polarizer;

the cellulose ester film of Item (9) provided on one surface of the polarizer; and a cellulose ester film comprising a compound containing: an acrylate group or a methacrylate group; and a phenolic hydroxyl group, in the molecule provided on the other surface of the polarizer.

(13) A liquid crystal display employing the cellulose ester film of any one of Items (1) to (10).

(14) A liquid crystal display employing the polarizing plate of Item (11) or (12).

(15) A method of producing a cellulose ester film comprising the steps of:

melting the cellulose ester and the compound both comprised in the cellulose ester film of any one of Items (1) to (10) to form a melt;

extruding the melt in a film form from a casting die;

cooling the melt extruded from the dye on a support for cooling to form a cooled film;

peeling the cooled film from the support;

stretching the peeled film; and winding the stretched film to form a roll.

According to the present invention, the burden for production and facility due to drying and recovering the solvent can be reduced, and a cellulose ester film exhibiting: optical properties free from a fluctuation in a retardation vale, coloration of the film, haze and bright foreign defects; a method of producing the cellulose ester film; and a polarizing plate and a liquid crystal display using the same can be obtained The following describes the details of the best mode to carry out the present invention, however, the present invention is not limited thereto.

The cellulose ester film of the present invention contains a compound having an acrylate group or a methacrylate group; and a phenolic hydroxyl group, in the molecule and is characterized by excellent optical properties with the minimum variation in the retardation across the width, and superb physical properties with respect to coloring, haze and bright foreign defects.

The cellulose ester film of the present invention may be produced either by the solution casting method or melt casting method. For the purpose of reducing the production load and equipment load resulting from drying and recovery of the solvent, the melt casting method is preferably used. The cellulose ester film of the present invention is preferably produced at 150 through 300° C., more preferably at 200 through 280° C. according to the melt casting method.

The following describes the details of the present invention:

<Compound Containing: Acrylate Group or Methacrylate Group; and Phenolic Hydroxyl Group, in the Molecule>

The cellulose ester film of the present invention includes a compound having: an acrylate group or a methacrylate group; and a phenolic hydroxyl group, in the same molecule. Details are not fully known as to the mechanism how inclusion of this compound enhances improvement of uniform retardation. However, the following reasoning will be possible:

The acrylate group or methacrylate group reacts with the cleaved portion of the main chain and the phenol group traps the radical, when a cellulose ester is thermally decomposed. In addition to this normally predicted mechanism, the generated cellulose ester reaction product (polymer having a cellulose ester+phenol component) has an aromatic ring, and this structure is considered to be effective in promoting uniform mixing at the time of dissolution with aromatic plasticizer or retardation improver to be added normally. If so, these actions cannot be achieved by mere radical strapping by a phenol. It can be considered to be achieved when the phenol having an acrylate group or a methacrylate group has bonded with the cellulose ester.

Further, this uniformity is effective in reducing the haze (resulting from very slight uneven mixing) as well as the bright foreign defects (resulting from the locally contained cellulose ester having a smaller substitution degree). Needless to say, the antioxidant function of the phenol (hindered phenol in particular) can be anticipated to be working as usual.

In the compound of the present invention, an acrylate or methacrylate group, and a phenol group are preferably arranged adjacent to each other. If they are not adjacent, for example, an alkylene chain having a soft structure is preferably present between them. The molecular weight of the compound is preferably 200 through 2000.

The compound having an acrylate or methacrylate group, and a phenolic hydroxyl group incorporated in the molecule is preferably the compound expressed by following Formula (A):

Formula (A)

$$\begin{array}{c}\text{(structure shown)}\end{array}$$

(where $R_1$ through $R_5$ each represent a hydrogen atom or an alkyl group containing 1 through 10 carbon atoms, and may be the same or different from each other. $R_6$ represents a hydrogen atom or methyl group.)

One or more of these substituents can be used in combination.

Of the compounds having an acrylate or methacrylate group, and a phenolic hydroxyl group incorporated in the molecule expressed by Formula (A), $R_1$ through $R_5$ each are a hydrogen atom or an alkyl group containing 1 through 10 carbon atoms, preferably an alkyl group containing 1 through 5 carbon atoms, and may be the same or different from each other. The alkyl group is selected according to the advantages as a stabilizer and the ease of production. The alkyl groups represented by the $R_1$ through $R_5$ are exemplified by methyl group, ethyl group, n-propyl group, isopropyl group, n-butyl group, sec-butyl group, isobutyl group, tert-butyl group, and 1,1-dimethyl propyl group. The bulky alkyl group that may be a three-dimensional obstacle such as an isopropyl group, sec-butyl group, tert-butyl group or 1,1-dimethyl propyl group can be preferably used especially as $R_1$ and $R_2$ for the purpose of ensuring stability and manufacturing ease. Among them, tert-butyl group and 1,1-dimethyl propyl group are preferably utilized. Methyl groups ethyl group, n-propyl group, isopropyl group, n-butyl group, sec-butyl group, isobutyl group, tert-butyl group and 1,1-dimethyl propyl group are used as $R_3$ and $R_4$ for the purpose of manufacturing ease. When consideration is given to the quinoid structure generation reaction resulting from the step of hydrogen removal, tert-butyl group and 1,1-dimethyl propyl group are preferably employed. The alkyl group that hardly serves as a three-dimensional obstacle such as methyl group, ethyl group, propyl group or n-butyl group is preferably used as $R_5$ from the viewpoint of ensuring manufacturing ease. The $R_6$ denotes a hydrogen atom or methyl group.

The following describes the examples of the compounds of the present invention containing an acrylate group or methacrylate group and phenolic hydroxyl group in one the molecule, however, the present invention is not limited thereto.

1

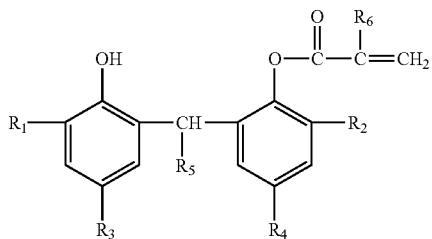

2

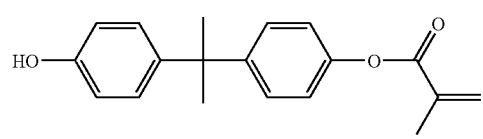

3

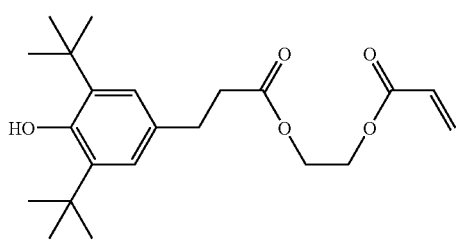

4

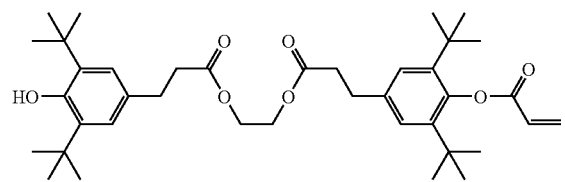

5

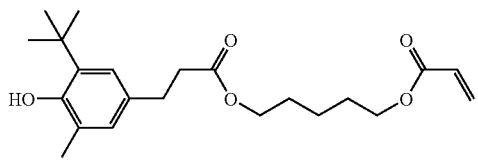

-continued
6
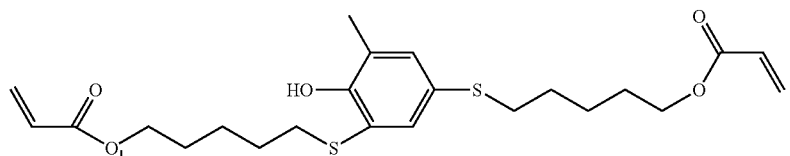
7
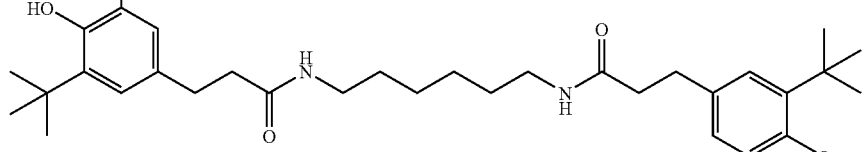
8
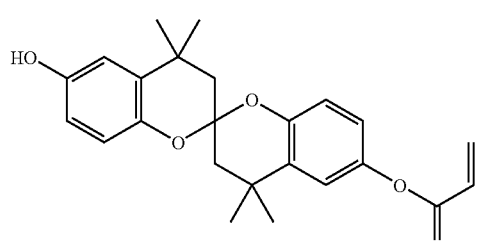
9
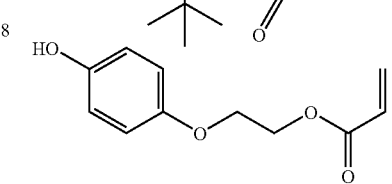
10
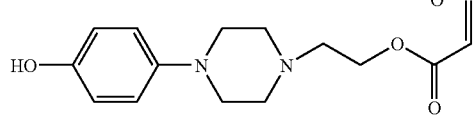
11
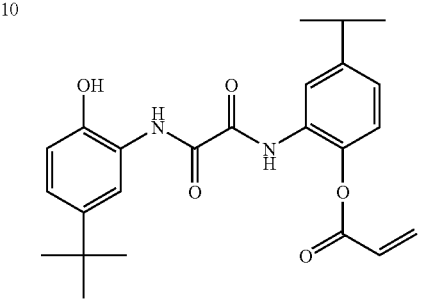
12
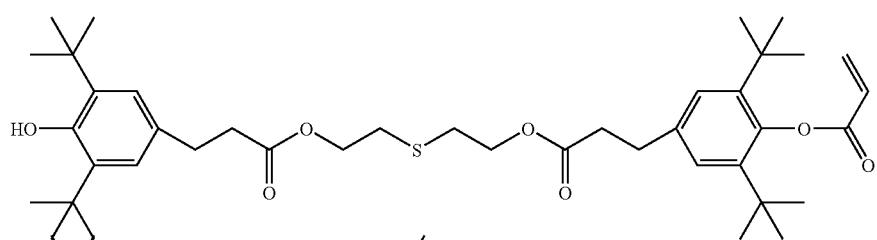
13
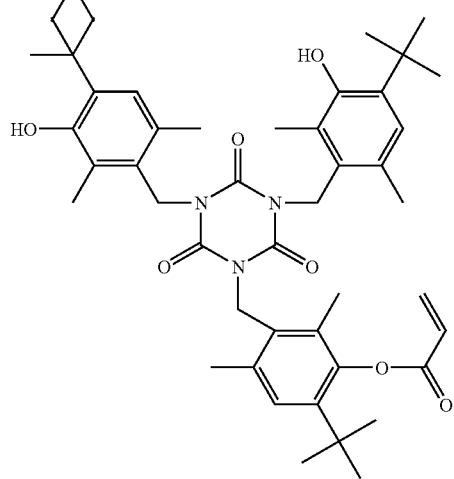

-continued
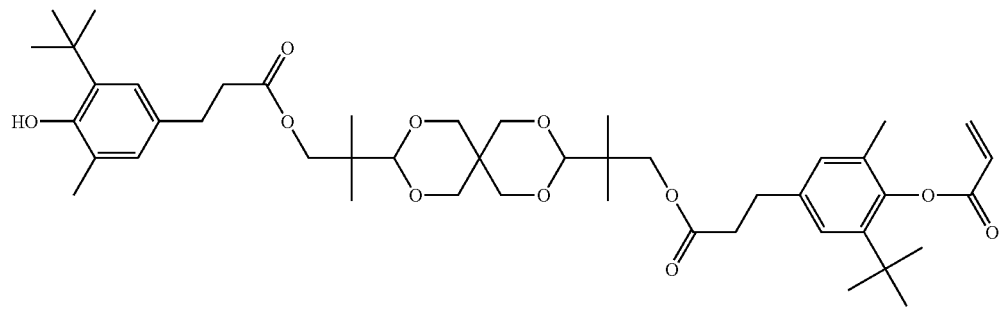
14
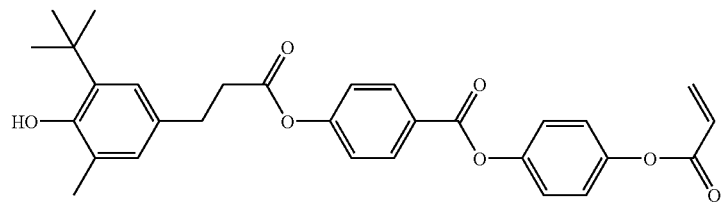
15
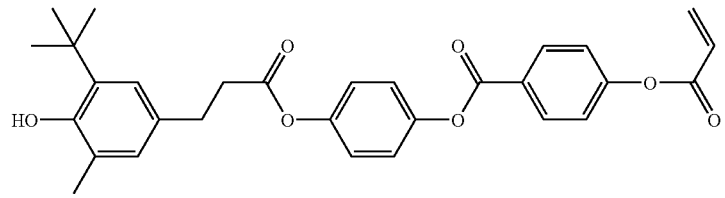
16
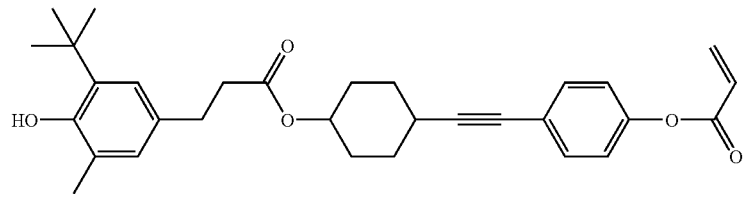
17
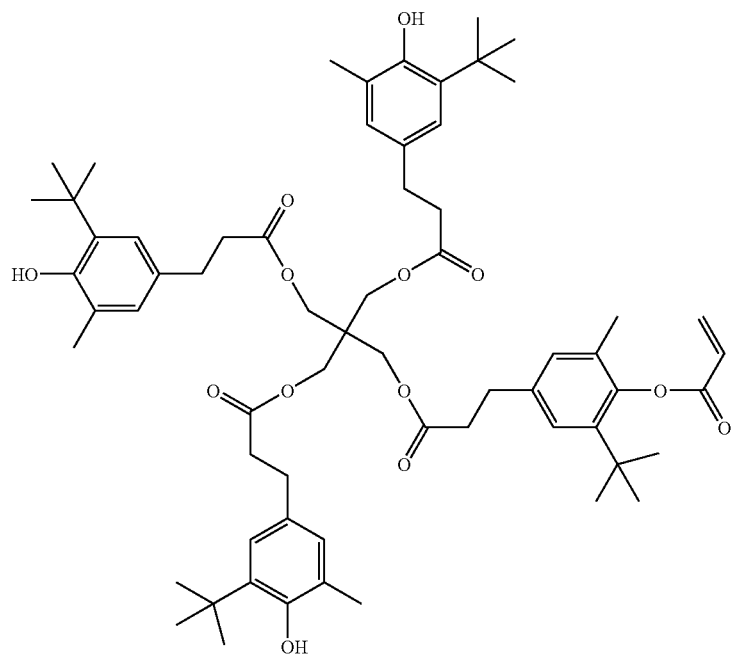
18

-continued
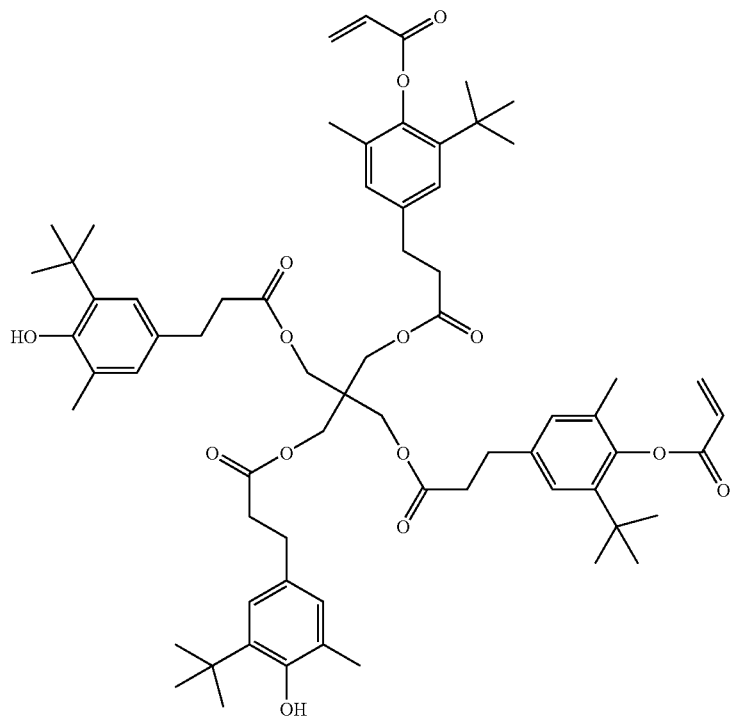
19
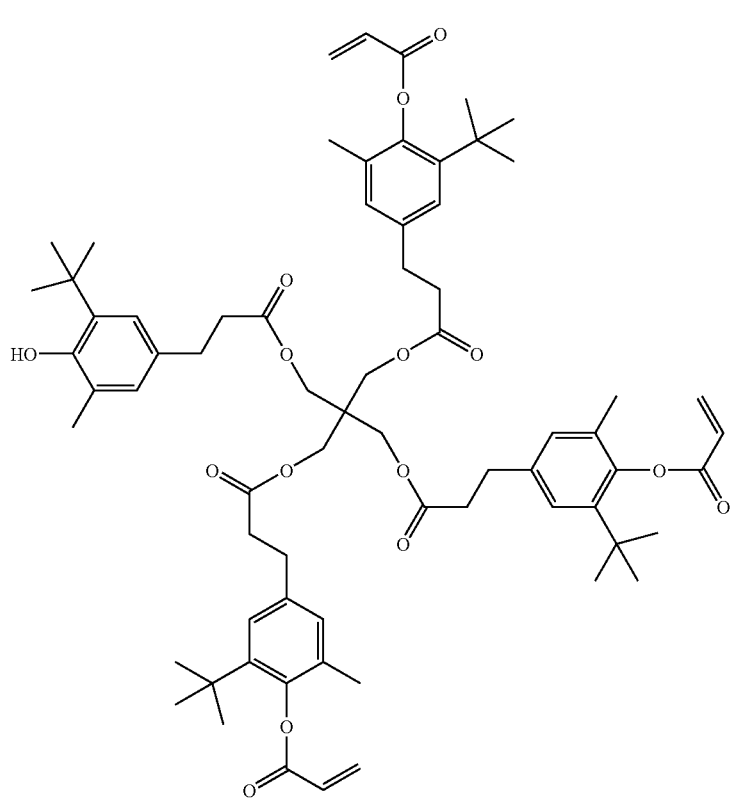
20

The aforementioned compounds are commercially available under the tradename of "Sumirizer GS" and "Sumirizer GM (Sumitomo Chemical Co., Ltd.). The "Sumirizer GS" in particular contains the structure expressed by the following Compound S, and is preferably used in the present invention.

Compound S

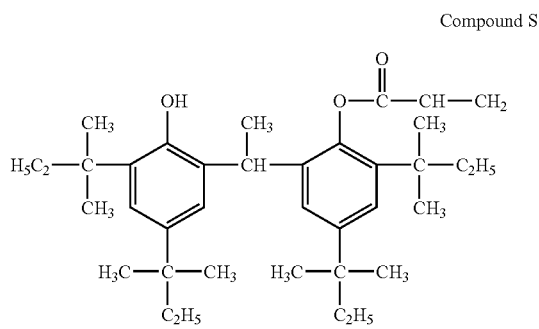

The compound of the present invention containing an acrylate or methacrylate group, and a phenolic hydroxyl group in the molecule is preferably contained in an amount of 0.01 through 5 parts by mass based on 100 parts by mass of cellulose ester. For the purpose of achieving excellent advantages of the present invention, the amount of this compound in the composition is preferably 0.1 through 3 parts by mass, more preferably 0.2 through 0.5 parts by mass.

In addition to the aforementioned compound, the hindered phenol compound to be described later is preferably used in combination.

<Compound Expressed by Formula (B): Rod-Shaped Compound>

The cellulose ester film of the present invention preferably contains the compound expressed by aforementioned Formula (B), in addition to the compound containing an acrylate group or methacrylate group and phenolic hydroxyl group incorporate in the molecule. The compound of the present invention containing an acrylate group or methacrylate group and phenolic hydroxyl group in the molecule may be included in the expression $Ar^1$-$L^1$-$Ar^2$ of Formula (B) in some cases. However, in the present invention, the compound of the present invention is not included in the compound represented by Formula (B).

The compound represented by Formula (B) is referred to as a rod-shaped compound or, with respect to the function, as a retardation controlling agent. The rod-shaped compound preferably has one or more, and preferably two or more, aromatic rings. The rod-shaped compound preferably has a linear molecular structure. The linear molecular structure means that the molecular structure of the rod-shaped compound is linear in the thermodynamically most stable structure state. The thermodynamically most stable structure can be determined by crystal structure analyzing or molecular orbital calculation. The molecular structure, by which the heat of formation is made minimum, can be determined on the calculation by, for example, a software for molecular orbital calculation WinMOPAC2000, manufactured by Fujitsu Co., Ltd. The linear molecular structure means that the angle of the molecular structure is not less than 140° in the thermodynamically most stable structure calculated as the above. The rod-shaped compound is preferably one exhibiting a liquid crystal property. The rod-shaped compound more preferably exhibits a liquid crystal property by heating (thermotropic liquid crystal property). The phase of the liquid crystal is preferably a nematic phase or a smectic phase. By adding a compound represented by Formula (B) the variation coefficient of retardation Re which will be described later is lowered, and the haze of the film also decreases.

Trans-1,4-cyclohexane-dicarboxylic acid ester represented by Formula (B) will be explained.

In Formula (B), $Ar^1$ and $Ar^2$ are each independently an aromatic group. Examples of the aromatic group include an aryl group (an aromatic hydrocarbon group), a substituted aryl group, an aromatic heterocyclic group and a substituted heterocyclic group. The aryl group and the substituted alkyl group are more preferable than the aromatic heterocyclic group and the substituted aromatic heterocyclic group. The heterocycle of the aromatic heterocyclic group is usually unsaturated. The aromatic heterocyclic group is preferably a 5-, 6- or 7-member ring, and more preferably a 5- or 6-member ring. The heterocyclic ring usually has the largest number of double bond. The hetero atom is preferably a nitrogen atom, an oxygen atom or a sulfur atom and the nitrogen atom or the oxygen atom is more preferable. Examples of the aromatic heterocyclic ring include a furan ring, a thiophene ring, a pyrrole ring, an oxazole ring, in isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. As the aromatic ring of the aromatic group, a benzene ring, a furin ring, a thiophene ring, a pyrrole ring, an oxazole ring, a thiazole ring, a thiazole ring, an imidazole ring, a triazole ring, a pyridine ring, a pyrimidine ring and pyrazine ring are preferable and the benzene ring is particularly preferable.

Examples of the substituent of the substituted aryl group and the substituted aromatic heterocyclic group include a halogen atom (F, Cl, Br, I), a hydroxyl group, a carboxyl group, a cyano group, an amino group, an alkylamino group (such as a methylamino group, an ethylamino group, a butylamno group and a dimethylamino group), a nitro group, a sulfo group, a carbamoyl group, an alkylcarbamoyl. group (such as an N-methylcarbaamoyl group, an N-ethylcarbaamoyl group and an N,N-dimethylcarbamoyl group), a sulfamoyl group, an alkylsulfamoyl group (such as an N-methylsulfamoyl group, an N-ethylsulfamoyl group and an N,N-dimethylsulfamoyl group), a ureido group, an alkylureido group (such as an N-methylureido group, an N,N-dimethylureido group and N,N,N-trimethylureido group), an alkyl group (such as a methyl group, an ethyl group, a propyl group, a butyl group, a pentyl group, a heptyl group, an octyl group, an isopropyl group, an s-butyl group, a t-amyl group, a cyclohexyl group and a cyclopentyl group), an alkenyl group (such as a vinyl group, an allyl group and a hexenyl group), an alkynyl group (such as an ethynyl group and a butynyl group), an acyl group (such as a formyl group, an acetyl group, a butylyl group, a hexanoyl group and a lauryl group), an acyloxy group (such as an acetoxy group, a butylyloxy group, a hexanoyloxy group and lauryloxy group), an alkoxy group (such as a methoxy group, an ethoxy group, a propoxy group, a butoxy group, a pentyloxy group, a heptyloxy group and an octyloxy group), an aryloxy group (such as a phenoxy group), an alkoxycarhonyl group (such as a methoxycarbonyl group, an ethoxycarbonyl group, a propoxycarbonyl group, a butoxycarbonyl group, a pentyloxycarbonyl group and a heptyloxycarbonyl group), an aryloxycarbonyl group (such as a phenoxycarbonyl group), an alkoxycarbonylamino group (such as a butoxycarbonylamino group and a hexyloxycarbonylamino group), an alkylthio group (such as a methylthio group, an ethylthio group, a propylthio group, butylthio group, a pentylthio group, a heptylthio group and an octylthio group), an arylthio group (such as a thiophenyl group), an alkylsulfonyl group (such as a methylsulfonyl group, an ethylsulfonyl group, a propylsulfonyl group, a butylsulfonyl group, a pentylsulfonyl group, a heptylsulfonyl group and an octylsulfonyl group), an amido group (such as an acetoamido group, a butylamido group, a hexylamido group and an laurylamido group), and a non-aromatic heterocyclic group (such as a morpholyl group and a pyradinyl group).

Examples of a preferable substituent of the substituted aryl group and the substituted aromatic heterocyclic group include: a halogen atom, a cyano group, a carboxyl group, a hydroxyl group, an amino group, an allyl-substituted amino group, an acyl group, an acyloxy group, an amido group, an alkoxycarbonyl group, an alkoxy group, an alkylthio group and an alkyl. The alkyl moiety of the alkylamino group, the alkoxycarbonyl group, the alkoxy group and the alkylthio group, and the alkyl group each may further have a substituent. Examples of the substituent of the alkyl moiety or the alkyl group include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, a ureido group, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amido group and a non-aromatic heterocyclic group. The halogen atom, the hydroxyl group, an amino group, an alkylamino group, an acyl group, an acyloxy group, an acylamino group, an alkoxycarbonyl group and an alkoxy group are preferable as the substituent of the alkyl moiety or the alkyl group.

In Formula (B), $L^1$ is a divalent linkage group, for example, an alkylene group, an alkenylene group, an alkynylene group, a divalent saturated heterocyclic group, an O— group, a —CO— group and a combination thereof. The alkylene group may have a cyclic structure. As the cyclic alkylene group, a cyclohexylene group is preferable, and 1,4-cyclohexylene group is more preferable. As the chain-shaped alkylene group, a straight-chain alkylene group is more preferable than a branched-chain alkylene group. The number of carbon atoms of the alkylene group is preferably 1-20, more preferably 1-15, further preferably 1-10, further more preferably 1-8, and most preferably 1-6.

The alkenylene group and the alkynylene group each more preferably have a chain structure tan a cyclic structure, and further preferably have a straight-chain structure than a branched-chain structure. The number of carbon atom of the alkenylene group and the alkynylene group is preferably 2-10, more preferably 2-8, further preferably 2-6, and further more preferably 2-4, and most preferably 2, namely a vinylene or an ethynylene group. The divalent saturated heterocyclic group is preferably from a 3- to 9-member heterocyclic ring. The hetero atom of the heterocyclic ring is preferably an oxygen atom, a nitrogen atom, a boron atom, a sulfur atom, a silicon atom, a phosphor atom or a germanium atom. Examples of the saturated heterocyclic ring include a piperidine ring, a piperazine ring, a morpholine ring, a pyrrolidine ring, an imidazolidine ring, a tetrahydrofuran ring, a tetrahydropyrane ring, a 1-3-dioxane ring, a 1,4-dioxane ring, a tetrahydrothiophene ring, a 1,3-thiazolidine ring, a 1,3-oxazolidine ring, a 1,3-dioxoran ring, a 1,3-dithiosilane ring and a 1,3,2-dioxoboran ring. Particularly preferable divalent saturated heterocyclic group is a piperazine-1,4-diylene group, a 1,3-dioxane-2,5-diylene group and a 1,3,2-dioxororane-2,5-diylene group.

Examples of divalent linkage group composed of a combination of groups are listed as follows.

L-1: —O—CO-alkylene-CO—O—
L-2: —CO—O-alkylene-O—CO—
L-3: —O—CO-alkenylene-CO—O—
L-4: —CO—O-alkenylene-O—CO—
L-5: —O—CO-alkynylene-CO—O—
L-6: —CO—O-alkynylene-O—CO—
L-7: —O—CO-divalent saturated heterocyclic group-CO—O—
L-8: —CO—O— divalent saturated heterocyclic group —O—CO—

In the structure of Formula (B), the angle formed by $Ar^1$ and $Ar^2$ through $L^1$ is preferably not less than 140°. Compounds represented by Formula (C) are further preferable as the rod-shaped compound.

$$Ar^1\text{-}L^1\text{-}X\text{-}L^3\text{-}Ar^2 \qquad \text{Formula (C)}$$

In Formula (C), $Ar^1$ and $Ar^2$ are each independently an aromatic group. The definition and the example are the same as $Ar^1$ and $Ar^2$ in Formula (B).

In Formula (C), $L^2$ and $L^3$ are each independently a divalent linkage group selected from the group of an alkylene group, an —O— atom, a —CO— group and a combination thereof. The alkylene group preferably have a chain structure rather than a cyclic structure, and further preferably have a straight-chain structure rather than a branched-chain structure. The number of carbon atoms in the alkylene group is preferably 1 - 10, more preferably from 1 to 8, further preferably from 1 to 6, further more preferably 1 - 4, and most preferably 1 or 2, namely a methylene group or an ethylene group. $L^2$ and $L^3$ are particularly preferably an —O—CO— group or a —CO—O— group.

In Formula (C), X is a 1,4-cyclohexylene group, a vinylene group or an ethynylene group. Concrete examples of the compound represented by Formula (B) are listed below.

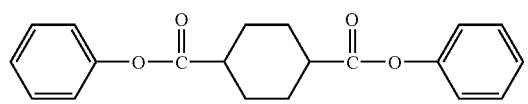

(1)

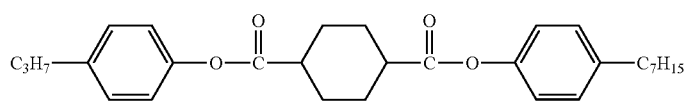

(2)

-continued
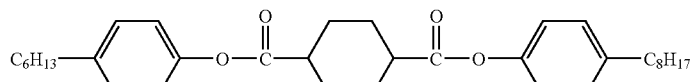
(3)
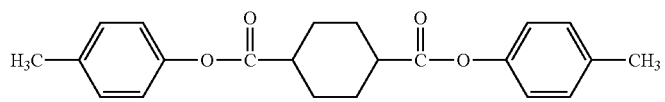
(4)
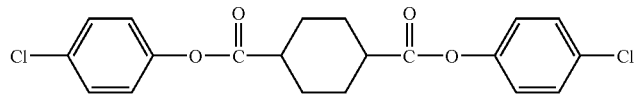
(5)
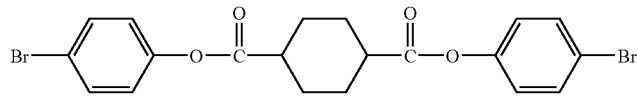
(6)
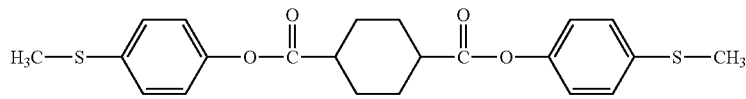
(7)
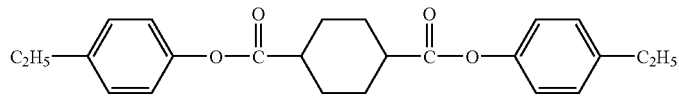
(8)
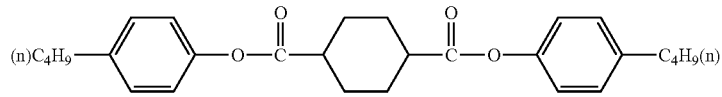
(9)
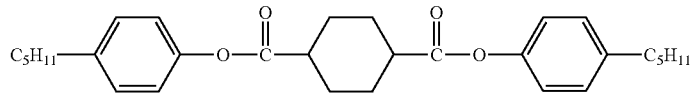
(10)
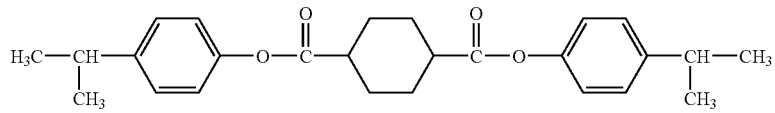
(11)
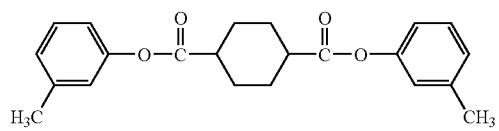 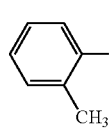
(12) (13)
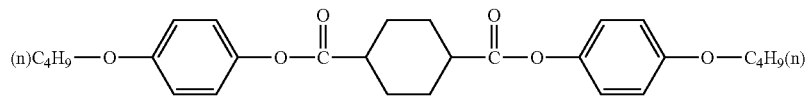
(14)
(15)
(16)
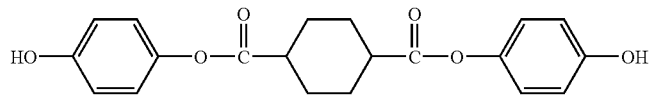
(17)

-continued
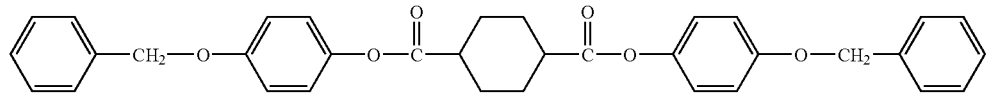
(18)
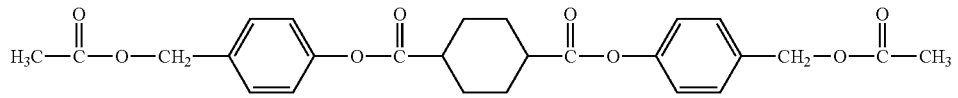
(19)
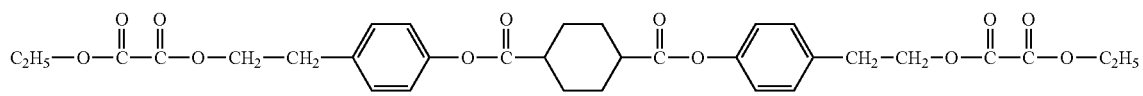
(20)
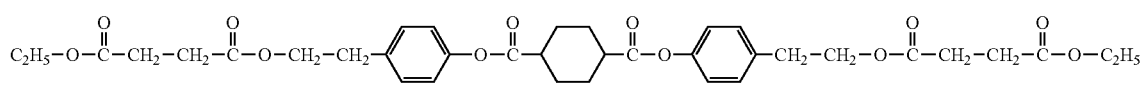
(21)
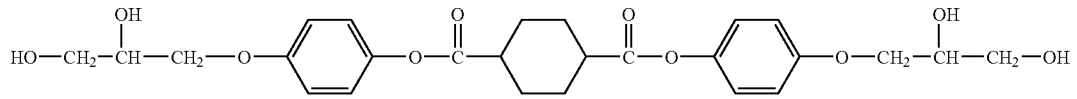
(22)
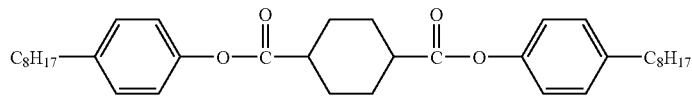
(23)
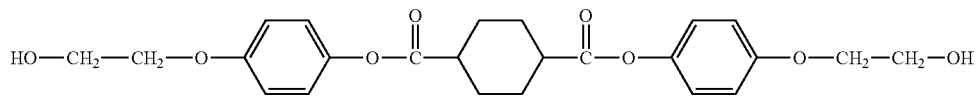
(24)
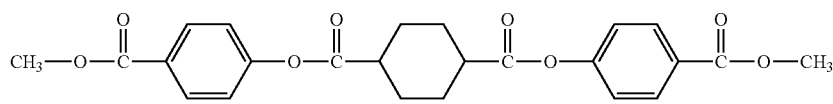
(25)
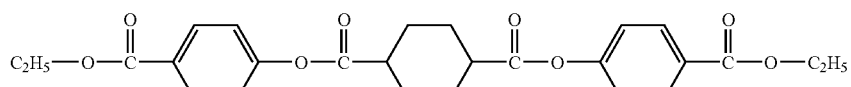
(26)
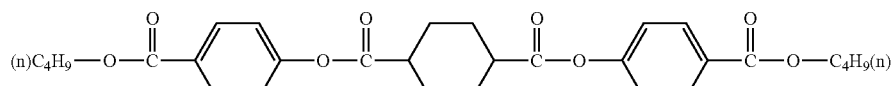
(27)
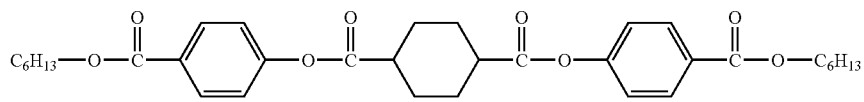
(28)
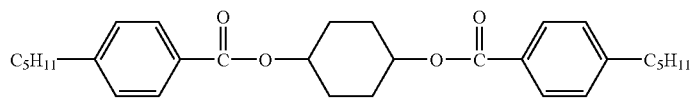
(29)
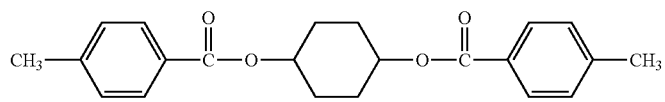
(30)
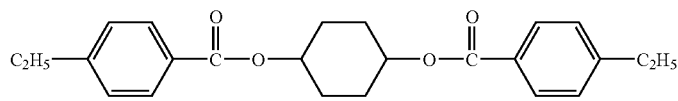
(31)

-continued
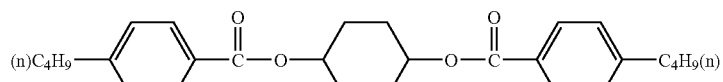
(32)
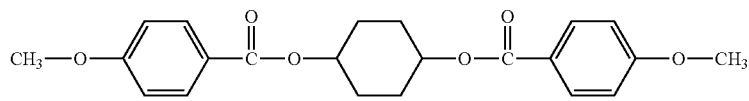
(33)
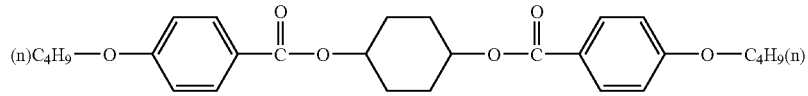
(34)
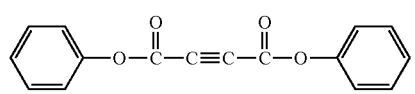
(35)
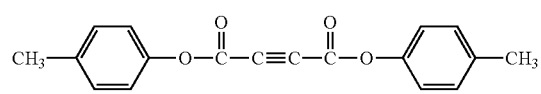
(36)
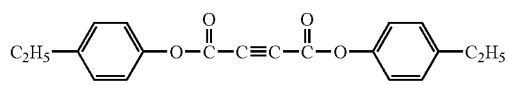
(37)
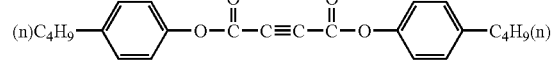
(38)
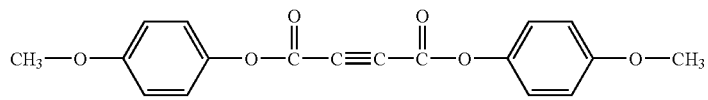
(39)
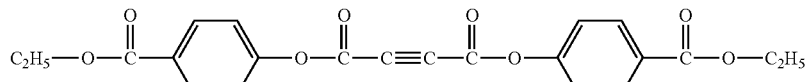
(40)
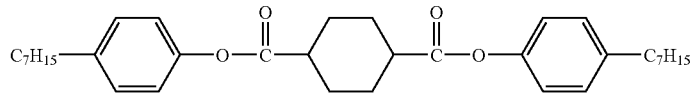
(41)
(42)
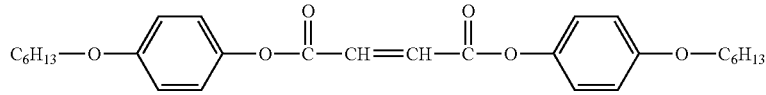
(43)
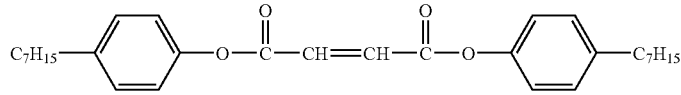
(44)
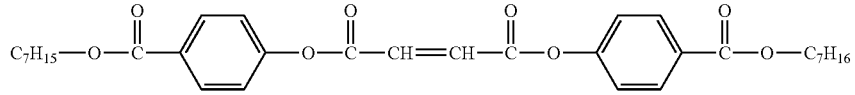
(45)
(46)
(47)

-continued

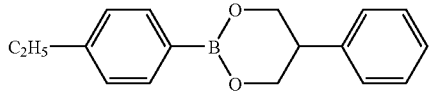
(48)

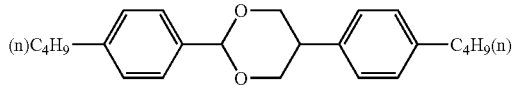
(49)

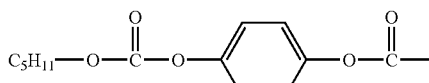
(50)

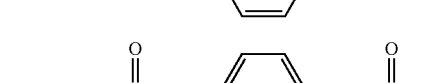
(51)

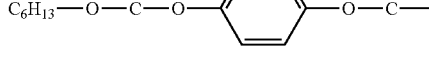
(52)

(53)

Exemplified compounds (1)-(34), (41), (42), (46), (47), (52) and (53) each has two asymmetric carbon atoms at 1- and 4-positions of the cyclohexane ring. However, Exemplified compounds (1), (4)-(34), (41), (42), (46), (47), (52) and (53) have no optical isomerism (optical activity) since they have symmetrical meso form molecular structure, and there are only geometric isomers thereof. Exemplified compound 1 in trans-form (1-trans) and that in cis-form (1-cis) are shown below.

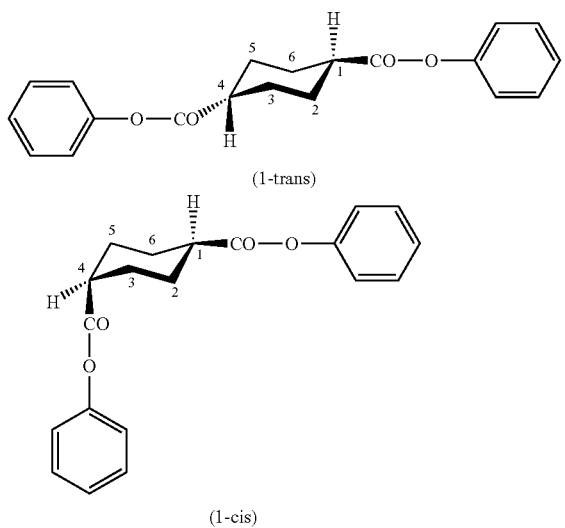

(1-trans)

(1-cis)

As above-mentioned, the rod-shaped compound preferably has a linear molecular structure. Therefore, the trans form is preferably to the cis-form. Exemplified compounds (2) and (3) have optical isomers additionally to the geometric isomers (four isomers in total). Regarding the geometric isomers, the trans-form is more preferable than the cis-form, There is no difference between the optical isomers and D-, L- and racemic-body are all employable. In Exemplified compounds (43)-(45), cis-form and trans-form are formed at the vinylene bond. The trans-form is preferable than the cis-form due to the above-described reason.

Two kinds of the rod-shaped compounds each having the maximum absorption at a wavelength ($\lambda_{max}$) shorter than 250 nm may be employed in combination. "Mol. Cryzst. Liq. Cryst." vol. 53, p. 229 (1979), ibid. vol. 89, p. 93 (1982), ibid. vol. 145, p. 111 (1987), and ibid. vol. 170, p. 43 (1989), "J. Am. Chem. Soc." Vol. 113, p. 1349 (1991), ibid. vol. 118, p. 5346 (1996), and ibid. vol. 92, p. 1582 (1970), "J. Org. Chem." Vol. 40, p. 420 (1975), and "Tetrahedron" vol. 48, No. 16, p. 3437 (1992) can be cited as relating documents.

The amount of the compound represented by Formula (B) is preferably 1-20 mass parts in, 100 mass parts of cellulose ester. In order to obtain the excellent effect of the present invention, the content of the compound represented by Formula (B) in the film composition is preferably 3-15 mass and more preferably 5-10 mass %.

<Cellulose Ester>

The following describes the details of the cellulose ester used in the present invention:

The cellulose ester film of the present invention is preferably produced by a melt casting method. The melt casting method permits a substantial reduction in the amount of the organic solvent used to produce the film. As compared with the conventional solution casting method requiring use of a great amount of organic solvent, the melt casting method provides a film characterized by a substantial improvement in environmental adaptability.

There is no restriction to the cellulose ester constituting the cellulose ester film if it is a cellulose ester that can be molten to form a film. When the film properties obtained such as optical properties are taken into account; the lower fatty acid ester of cellulose is preferably used. In the present invention, the lower fatty acid in lower fatty acid ester cellulose is defined as a fatty acid containing 5 or less carbon atoms. Cellulose acetate, cellulose propionate, cellulose butyrate and cellulose pivalate can be mentioned as preferable lower fatty acid esters of cellulose. Although the cellulose ester replaced by the fatty acid containing six or more carbon atoms has a good melt film formation property, the cellulose ester film having been obtained therefrom has poor dynamic characteristics. This cellulose ester can hardly be used as a practical optical film. To ensure compatibility between the dynamic characteristics and melt casting film formation property, it is preferred to use a mixed fatty acid ester such as cellulose acetate propionate and cellulose acetate butyrate. Triacetyl cellulose which is commonly used in the solution casting method is difficult to use in a melt casting method, since the decomposition temperature of the triacetyl cellulose is lower than the melting temperature.

Therefore, the most preferable lower fatty acid ester of cellulose has an acyl group having 2-4 carbon atoms as a substituent. When the degree of substitution by acetic acid, i.e., the degree of substitution by an acetyl group is represented by X, and the degree of substitution by an organic acid having 3-5 carbon atoms, i.e., the degree of substitution by an acyl group derived from an aliphatic organic acid having 3-5 carbon atoms, for example, a propionyl group, and a butyryl group, is represented by Y, the cellulose ester preferably satisfy following Expressions (1) and (2).

$$2.6 \leq X+Y \leq 3.0 \qquad \text{Expression (1)}$$

$$0.0 \leq X \leq 2.5 \qquad \text{Expression (2)}$$

Among them, cellulose acetate propionate is specifically preferably used. Of these, more preferable is cellulose acetate propionate satisfying $0.9 \leq X \leq 1.8$ and $0.9 \leq Y \leq 1.8$, and further more preferable is a cellulose acetate propionate satisfying $0.9 \leq X \leq 1.6$ and $1.1 \leq Y \leq 1.8$. The portion not substituted with an acyl group generally exists as a hydroxyl group. These cellulose esters can be synthesized by a method well known in the art.

The substitution degree of acyl group such as acetyl group, propionyl group and butyl group can be measured according to the ASTM-D817-96.

In the cellulose ester preferably used in the present invention, the ratio of (weight average molecular weight Mw)/(umber average molecular weight Mn) is 1.0 through 5.5. This ratio is more preferably 1.4 through 5.0, still more preferably 2.0 through 3.0. Further, the Mw is preferably 100,000 through 500,000, more preferably 150,000 through 300,000.

The average molecular weight of cellulose ester and the distribution of the molecular weight can be measured by a high performance liquid chromatography according to the conventionally known method. This is used to calculate the number average molecular weight and weight average molecular weight.

The following describes the measuring requirements: Solvent: Column: Shodex K806, K805, K803 (produced by Showa Denko Co., Ltd.) Three columns were connected to be used Column temperature: 25° C., Sample concentration: 0.1% by weight, Detector: RI Model 504 (produced by GL Science) Pump: L6000 (produced by Hitachi, Ltd.), Flow rate: 1.0 ml/min, Calibration curve: Thirteen samples of Standard polystyrene STK (Produced by Toso, Corp.), the Mw being in the range of 500-1000000, are used to obtain a calibration curve. The thirteen samples of uniform intervals are preferably used.

The cellulose material of the cellulose ester used in the present invention can be either a wood pulp or cotton linter. The wood pulp can be either a conifer or a broad-leaved tree. The conifer is more preferred. The cellulose esters manufactured therefrom can be mixed properly and used, or can be used independently.

For example, the ratio of the cotton linter-derived cellulose ester to the wood pulp (conifer)-derived cellulose ester to the wood pulp (broad-leaved tree)-derived cellulose ester can be 100:0:0, 90:10:0, 85:15:0, 50:50:0, 20:80:0, 10:90:0, 0:100:0, 0:0:100, 80:10:10, 85:0:15, and 40:30:30.

The cellulose ester can be obtained, for example, by replacing the hydroxyl group of the material cellulose by the acetic anhydride, anhydrous propionic acid and/or anhydrous butyric acid according to the normal method in such a way that the acetyl group, propionyl group and/or butyl group are kept within the aforementioned range. There is no restriction to the method of synthesizing such a cellulose ester. For example, it can be synthesized by using the method disclosed in JP-A No. 10-45804, or Published Japanese Translation of PCT International. Publication No. 6-501040.

From the industrial viewpoint, cellulose ester is synthesized using sulfuric acid as a catalyst. This sulfuric acid is not completely removed, and the remaining sulfuric acid causes various forms of decomposition reaction at the time of melt casting film formation. This will affect the quality of the cellulose ester film to be obtained. Thus, the amount of the residual sulfuric acid contained in the cellulose ester used in the present invention is 0.1 through 40 ppm in terms of the sulfur element. They are considered to be included as salts. The amount of the residual sulfuric acid contained therein of 40 ppm or less is preferable since the deposition on the die lip at the time of heat-melting is reduced and the film tends not to split off at the time of thermal stretching or slitting subsequent to thermal stretching. The amount of the residual sulfuric acid contained therein should be reduced as much as possible, but when it is to be reduced below 0.1, the load on the cellulose ester washing process will be excessive and the material tends to be damaged easily. This should be avoided. This may be because an increase in the frequency of washing affects the resin, but the details are not yet clarified. Further, the preferred amount is in the range of 0.1 through 30 ppm. The amount of the residual sulfuric acid can be measured according to the ASTM-D817-96 in the similar manner.

The total amount of the residual amount of acid (e.g., acetic acid) is preferably 1000 ppm or less, more preferably 500 ppm or less, still more preferably 100 ppm or less.

The amount of the residual acid can be kept within the aforementioned range if the synthesized cellulose ester is washed more carefully than in the case of the solution casting method. Then, when a film is manufactured by the melt casting, the amount of depositions on the lip portion will be reduced so that a film characterized by a high degree of flatness is produced. Such a film will be further characterized by excellent resistance to dimensional changes, mechanical strength, transparency, resistance to moisture permeation, Rth value (to be described later) and Ro value.

Further, the cellulose ester can be washed using water as well as a poor solvent such as methanol or ethanol. It is also possible to use a mixture between a poor solvent and a good solvent if it is a poor solvent as a result. This will remove the inorganic substance other than residual acid, and low-molecular organic impurities. The cellulose ester is washed preferably in the presence of an antioxidant such as a hindered amine and phosphorous acid ester. This will improve the heat resistance and film formation stability of the cellulose ester.

To improve the heat resistance, mechanical property and optical property of the cellulose ester, the cellulose ester is settled again in the poor solvent, subsequent to dissolution of the good solvent of the cellulose ester. This will remove the low molecular weight component and other impurities of the cellulose ester. In this case, similarly to the aforementioned case of washing the cellulose ester, washing is preferably carried out in the presence of an antioxidant.

Subsequent to resettling of the cellulose ester, another polymer or low molecular weight compound may be added.

The cellulose ester used in the present invention is excellent with respect to having few bright foreign defect. It is also preferable that there are few bright foreign defects when formed into a film. The bright foreign defect can be defined as follows: Two polarizing plates are arranged perpendicular to each other (crossed-Nicols), and a cellulose ester film is inserted between them. Light of the light source is applied from one of the surfaces, and the cellulose ester film is observed from the other surface. In this case, a spot formed by the leakage of light from the light source. This spot is referred to as a bright detect. The polarizing plate employed for evaluation in this case is preferably made of the protective film free of a bright foreign defect. A glass plate used to protect the polarizer is preferably used for this purpose. The bright foreign defect may be caused by non-acetified cellulose or cellulose with a low degree of acetification contained in the cellulose ester. It is necessary to use the cellulose ester containing few bright foreign defects (use the cellulose ester with few distributions of substitution degree), or to filter the molten cellulose ester. Alternatively, the material in a state of solution is passed through a similar filtering step in either the later process of synthesizing the cellulose ester or in the process of obtaining the precipitate, whereby the bright foreign defect can be removed. The molten resin has a high degree of viscosity, and therefore, the latter method can be used more efficiently.

The thinner the film is, the fewer the number of bright foreign defects per unit area is and the fewer the number of the cellulose esters contained in the film is. The number of the bright foreign defects having a bright spot diameter of 0.01 mm or more is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright foreign defect at all. The number of the bright foreign defects having a bright spot diameter of 0.005 through 0.01 mm is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright foreign defect at all.

When the bright foreign defect is to be removed by the filtration of the melt, the bright foreign defect is more effectively removed by filtering the cellulose ester composition mixed with a plasticizer, anti-deterioration agent and antioxidant, rather than filtering the cellulose ester melted independently. It goes without saying that, at the time of synthesizing the cellulose ester, the cellulose ester can be dissolved in a solvent, and the bright foreign defect can be reduced by filtering. Alternatively, the cellulose ester mixed with an appropriate amount of ultraviolet absorber and other additive can be filtered. At the time of filtering, the viscosity of the melt including the cellulose ester is preferably 1000 Pa·s or less, more preferably 500 Pa·s or less, still more preferably 100 Pa·s or less, further more preferably 50 Pass or less. A conventionally known medium including a fluoride resin such as a glass fiber, cellulose fiber, filter paper and tetrafluoroethylene resin is preferably used as a filter medium. Particularly, ceramics and metal can be used in preference. The absolute filtration accuracy is preferably 50 μm or less, more preferably 30 μm or less, still more 10 μm or less, further more preferably 5 μm or less. They can be appropriately combined for use. Either a surface type or depth type filter medium can be used. The depth type is more preferably used since it has a greater resistance to clogging.

In another embodiment, it is also possible that the cellulose ester as a material is dissolved in a solvent at least once, and is dried and used. In this case, the cellulose ester is dissolved in the solvent together with one or more of the plasticizer, ultraviolet absorber, anti-deterioration agent, antioxidant and matting agent, and is dried and used. Such a good solvent as methylene chloride, methyl acetate or dioxolane that is used in the solution casting method can be used as the solvent. At the same time, the poor solvent such as methanol, ethanol or butanol can also be used. In the process of dissolution, it can be cooled down to −20° C. or less or heated up to 80° C. or more. Use of such a cellulose ester allows uniform additives to be formed in the molten state, and the uniform optical property is ensured in some cases.

The cellulose ester film of the present invention can be made of an adequate mixture of polymer components other than the cellulose ester. The polymer components to be mixed are preferably characterized by excellent compatibility with the cellulose ester. When formed into a film, the transmittance is preferably 80% or more, more preferably 90% or more, still more preferably 92% or more.

<Additive>

Other additives used together with the cellulose ester are exemplified by the additives capable of performing the functions of a plasticizer, antioxidant, acid scavenger, light stabilizer, peroxide decomposer, radical scavenger, metal deactivator, matting agent, dye, pigment, fluorophore, ultraviolet absorber, infrared absorber, two-color pigment, refractive index modifier, retardation regulating agent, gas permeation depressant, antimicrobial agent, electroconducting agent, biodegradation agent, antigelling agent, viscosity modifier and viscosity depressant. Other additives not classified in this category may be used if they have the aforementioned functions.

The cellulose ester of the present invention is preferably formed into a film at a high temperature of 150 through 300° C. according to the melt casting method. In this case, the cellulose ester is more likely to be decomposed or deteriorated than in the case of the conventional melt casting method, Additives are used to minimize degeneration represented by coloring or reduction in the molecular weight or generation of the volatile component by material decomposition, including the reaction of decomposition which is not yet clarified, as exemplified by prevention of oxidation of the cellulose ester composition, capturing of the acid produced by decomposition and suppression or inhibition of decomposition reaction resulting from radicals by light or heat.

The additives themselves are required to have high heat resistance. Additives are preferably provided with such a heat resistance that temperature Td1 with respect to 1% reduction in mass is 250° C. or more. (Temperature Td1 with respect to 1% reduction in mass can be defined as the temperature when the sample mass is reduced 1% by thermal deformation or decomposition, wherein this temperature can be obtained from the TG curve described in JIS K7120 "Methods for Measuring the Heat and Mass of Plastics"). In the present invention, this was measured at a nitrogen flow rate of 100 n·ml/min., a start/end temperature of 30/500° C., and a temperature rise speed of 10° C./min., using a simultaneous differential heat and mass measuring apparatus TG/DTA (Seiko Instrument Co., Ltd.).

When the cellulose ester composition is heated and molten, decomposition reaction is activated. This decomposition reaction may deteriorate the strength of the component materials resulting from coloring or reduction in the molecular weight in some cases. Further, unwanted volatile components may be produced by the decomposition reaction of the cellulose ester composition. When the cellulose ester composition is heated and molten, the presence of the aforementioned additives is advantageous in that the deterioration of the strength due to the material deterioration or decomposition can be reduced, or the strength inherent to the material can be maintained. Presence of the aforementioned additives is essential to produce the cellulose ester film of the present invention.

Such additives are exemplified by antioxidant, acid-acceptor, hindered amine light stabilizer, ultraviolet absorber, peroxide decomposer, radical acceptor, and metal deactivator, however, the present invention is not limited thereto. They are disclosed in the Unexamined Japanese Patent Application Publication No. 3-199201, Unexamined Japanese Patent Application Publication No. 5-1907073, Unexamined Japanese Patent Application Publication No. 5-194789, Unexamined Japanese Patent Application Publication. No. 5-271471, and Unexamined Japanese Patent Application Publication No. 6-107854. At least one additive selected from among them is included in the material used for film formation.

The presence of the additive is advantageous in that generation of a colored object in the visible light area is reduced at the time of heating and melting, or the disadvantageous performance of the optical film in the transmittance or haze value resulting from the entry of a volatile component into the film can be reduced or eliminated.

A particular advantage is found in that coloring or haze value can be minimized by the arrangement of the present invention. Use of the cellulose ester film of the present invention reduces the haze value to less than 1%, more preferably less than 0.5%.

When the cellulose ester film of the present invention is used as a polarizer protective film or retardation film, polarizer is less resistant to the ultraviolet ray. Accordingly, ultraviolet absorber is preferably included in the cellulose ester film at least on the side wherein light enters the polarizer.

When the cellulose ester film of the present invention is used as a retardation film, the additive for adjusting the retardation can be contained, in addition to the compound expressed by Formula (B). The retardation modifier disclosed in the European Patent No. 911,656A2 Specification can be used as the compound added to adjust the retardation.

An organic polymer or inorganic polymer can be added to the cellulose ester film to control the viscosity at the time of heating and melting or to adjust the film physical properties after processing of the film.

When adding the cellulose ester and these additives, the total amount including them is preferably 1 through 30% by mass with respect to the mass of the cellulose ester. If this is less than 1% by mass, the performance of melt-cast film formation will be reduced. If it is more than 30% by mass, the mechanical properties and storage stability of the cellulose ester film may not be obtained.

In the storage or film making step of the cellulose ester composition, deterioration reaction may be caused due to oxygen in the air. In this case, the function of stabilization of the aforementioned additive and the effect of reducing the concentration of oxygen in the air can be used in combination when embodying the present invention. Use of nitrogen or argon as an inert gas, deaeration operation by depressurization and evacuation, and operation in an enclosed environment can be mentioned as conventionally known techniques. At least one of these three techniques can be used in combination with the method of allowing the aforementioned additive to be present. The deterioration of the material can be reduced by reducing the probability of the cellulose ester composition coming into contact with oxygen in the air. This is preferred to achieve the object of the present invention.

In order to use the cellulose ester film of the present invention as a polarizing plate protective film, the aforementioned additive is preferably contained in the cellulose ester composition for the purpose of improving the long-term storage quality of the polarizing plate of the present invention and the polarizer constituting the polarizing plate.

In the liquid crystal display apparatus using the polarizing plate of the present invention, the aforementioned additive is present in the cellulose ester film of the present invention. Accordingly, the long term storage quality of the cellulose ester film can be improved, and, further, from the viewpoint of improving the display quality of the liquid crystal display apparatus, the optical compensatory design based on the cellulose ester film can perform its function for a long time, because aforementioned degeneration and deterioration are minimized.

In the following, additives will be described in more detail.

<<Plasticizer>>

The plasticizer used in the present invention is not specifically limited, however, it is preferable that the cellulose ester film of the present invention contains one or more ester plasticizer selected from an ester plasticizer derived from a polyalcohol and a mono-valent carboxylic acid and an ester plasticizer derived from a polycarboclic acid and a mono-valent alcohol.

A plasticizer, as described herein, commonly refers to an additive which decreases brittleness and result in enhanced flexibility upon being incorporated in a polymer. In the present invention, a plasticizer is added so that the melting temperature of a cellulose ester resin is lowered, and at the same temperature, the melt viscosity of the film forming materials including a plasticizer is lower than the melt viscosity of a cellulose ester resin containing no additive. Further, addition is performed to enhance hydrophilicity of cellulose ester so that the water vapor permeability of cellulose ester films is lowered. Therefore, the plasticizers of the present invention have a property of an anti-moisture-permeation agent.

The melting temperature of a film forming material, as described herein, refers to the temperature at which the above materials are heated to exhibit a state of fluidity. In order that cellulose ester results in melt fluidity, it is necessary to heat cellulose ester to a temperature which is at least higher than the glass transition temperature. At or above the glass transition temperature, the elastic modulus or viscosity decreases due to heat absorption, whereby fluidity is observed however, at higher temperatures, cellulose ester melts and simultaneously undergoes thermal decomposition to result in a decrease in the molecular weight of the cellulose ester, whereby the dynamical characteristics of the resulting film may be adversely affected. Consequently, it is preferable to melt cellulose ester at a temperature as low as possible. Lowering the melting temperature of the film forming materials is achieved by the addition of a plasticizer having a melting point or a glass transition temperature lower than the glass transition temperature of the cellulose ester. The polyalcohol ester plasticizer employed in the present invention having a structure obtained by condensing an organic acid represented by Formula (1) and a polyalcohol has the following excellent properties, namely, lowering the melting temperature of the cellulose ester, being suitable for processing due to the lower volatility during or after the film forming process, and exhibiting excellent optical property, dimensional stability and flatness of the obtained cellulose ester film.

An ester plasticizer prepared from a polyalcohol and a monocarboxylic acid or from a polycarboxylic acid and a monoalcohol is preferable because of its high compatibility with cellulose acylate.

Ethylene glycol ester plasticizer which is one of polyalcohol ester plasticizers. Specific examples of an ethylene glycol ester plasticizer include: ethylene glycol alkyl ester plasticizers such as ethylene glycol diacetate and ethylene glycol dibutyrate; ethylene glycol cycloalkyl ester plasticizers such as ethylene glycol dicyclopropyl carboxylate and ethylene glycol dicyclohexyl carboxylate; and ethylene glycol aryl ester plasticizers such as ethylene glycol dibenzoate and ethylene glycol di-4-methyl benzoate. These alkylate groups, cycloalkylate groups and arylate groups may be the same or different and may further be substituted. The substituent groups may be a mixture of alkylate groups, cycloalkylate groups and arylate groups, and the substituent groups may be bonded to each other via covalent linkage. Further, the ethylene glycol portions may be substituted and the ethylene glycol ester part of the structure may be part of the polymer or may be systematically included as a pendant. It may also be introduced into a part of the molecular structure of the additives such as an antioxidant, an acid scavenger, and an ultraviolet light absorber.

Glycerin ester plasticizer which is one of polyalcohol ester plasticizers: Examples of a glycerin ester plasticizer include: glycerin alky esters such as triacetin, tributylin, glycerin diacetate caprylate and glycerin oleate propionate; glycerin cycloalkyl esters such as glycerin tricyclopropyl carboxylate, and glycerin tricyclohexyl carboxylate; glycerin aryl esters such as glycerin tribenzoate and glycerin 4-methylbenzoate; diglycerin alkyl esters such as diglycerin tetraacetylate, diglycerin tetrapropionate, digylcerin acetate tri caprylate and diglycerin tetralaurate; diglycerin cycloalkyl esters such as diglycerin tetracylobutyl carboxylate and diglycerin tetracylopentyl carboxylate; and diglycerin aryl esters such as diglycerin tetrabenzoate and diglycerin 3-methyl benzoate. These alkylate groups, cycloalkyl carboxylate groups and arylate groups may be same or different and may further be substituted. The substituent groups may be a mixture of an alkylate group, a cycloalky carboxylate group and an arylate groups, and the substituent groups may be bonded to each other via covalent bond. Further, the glycerin and diglycerin portions may be substituted and a partial structure of the glycerin ester or diglycerin ester may be a part of the polymer or may be systematically included as a pendant. It may also be introduced into a part of the molecular structure of the additive such as an antioxidant, an acid scavenger, and an ultraviolet light absorber.

Other polyalcohol ester plasticizers: Specific examples of polyalcohol ester plasticizers include the polyalcohol ester plasticizers disclosed in JP-A 2003-12823, paragraphs 30-33.

These alkylate groups, cycloalkyl carboxylate groups and arylate groups may be the same or different and may be further be substituted. The alkylate groups, cycloalky carboxylate groups and arylate groups may be mixed, and the substituent groups may be bonded to each other via covalent bond. Furthermore, the polyhydric alcohol portion may be substituted and a partial structure of the polyhydric alcohol may be a part of the polymer or may be systematically included as a pendant. It may also be introduced into a part of the molecular structure of the additives such as an antioxidant, an acid scavenger or an ultraviolet light absorber.

Among the above described ester plasticizers derived from a polyalcohol and a monocarboxylic acid, for example, an aryl ester of an alkyl-polyalcohol is preferable, specific examples of which include: an ethyleneglycoldibenzoate, a glycerintribenzoate, a diglycerintetrabenzoate and exemplified compounds 16 disclosed in JP-A No. 2003-12823 paragraph 32.

Dicarboxylic acid ester plasticizer which, is one of the polycarboxylic acid esters: Specific examples of a dicarboxylic acid ester plasticizer include: alkyl dicarboxylic acid cycloalkyl ester plasticizers such as didodecyl malonate (C1), dioctyl adipate (C4) and dibutyl cebacate (C8); alkyl dicarboxylic acid cycloalkyl ester plasticizers such as dicyclopentyl succinate and dicyclohexyl adipate; alkyl dicarboxylic acid aryl ester plasticizers such as diphenyl succinate and di-4-methyl phenyl glutarate; cycloalkyl dicarboxylic acid alkyl ester plasticizers such as dihexyl-1,4-cyclohexane dicarboxylate and didecyl bicyclo[2.2.1]heptane-2,3-dicarboxylate; cycloalkyl dicarboxylic acid cycloalkyl ester plasticizers such as dicyclohexyl-1,2-cyclobutane dicarboxylate and dicyclopropyl-1,2-cyclohexyl dicarboxylate; cycloalkyl dicarboxylic acid aryl ester plasticizers such as diphenyl-1,1-cyclopropyl dicarboxylate and di-2-naphthyl-1,4-cyclohexane dicarboxylate; aryl dicarboxylic acid alkyl ester plasticizers such as diethyl phthalate, dimethyl phthalate, dioctyl phthalate, dibutyl phthalate and di-2-ethylhexyl phthalate; aryl dicarboxylic acid cycloalkyl ester plasticizers such as dicyclopropyl phthalate and dicyclohexyl phthalate; and aryl dicarboxylic acid aryl ester plasticizers such as diphenyl phthalate and di-4-methylphenyl phthalate. These alkoxy groups and cycloalkoxy groups may be the same or different, and may also be monosubstituted and the substitution groups may be further substituted. The alkyl groups and the cycloalkyl groups may be mixed, and the substituent groups may be bonded to each other via covalent bond. Furthermore, the aromatic ring of the phthalic acid may be substituted and may be a multimer such as a dimer, a trimer or a tetramer. The phthalic acid ester part of the structure may be a part of the polymer or may be systematically included as a pendant. It may also be introduced into a part of the molecular structure of the additives such as an antioxidant, an acid scavenger and an ultraviolet light absorber.

Other polycarboxylic acid ester plasticizers: Specific examples of polyhydric carboxylic acid ester plasticizers include: alkyl polycarboxylic acid alkyl ester plasticizers such as tridodecyl tricarbalate and tributyl-meso-butane-1,2,3,4,-tetracarboxylate; alkyl polyhydric carboxylic acid cycloalkyl ester plasticizers such as tricyclohexyl tricarbalate and tricyclopopyl-2-hydroxy-1,2,3-propane tricarboxylate; alkyl polyhydric carboxylic acid aryl ester plasticizers such as triphenyl-2-hydroxy-1,2,3-propane tricarboxylate, tetra-3-methylphenyl tetrahydrofuran-2,3,4,5-tetracarboxylate; cycloalkyl polyhydric carboxylic acid alkyl ester plasticizers such as tetrahexyl-1,2,3,4-cyclobutane tetracarboxylate and tetrabutyl-1,2,3,4,-dicyclopentane tetracarboxylate; cycloalkyl polyhydric carboxylic acid cycloalkyl ester plasticizers such as tetracyclopropyl-1,2,3,4-cyclobutane tetracarboxylate and tricyclohexyl-1,3,5-cyclohexyl tricarboxylate; cycloalkyl polyhydric carboxylic acid aryl ester plasticizers such as triphenyl-1,3,5-cyclohexyl tricarboxylate, hexa-4-methylphenyl-1,2,3,4,5,6-cyclohexyl hexacarboxylate; aryl polyhdric carboxylic acid alkyl ester based plasticizers such as tridodecyl benzene-1,2,4-tricarboxylate and tetracetylbenzene-1,2,4,5-tetracarboxylate; aryl polyhdric carboxylic acid cycloalkyl ester plasticizers such as tricyclopentyl-benzene-1,3,5-tricarboxylate and tetracyclohexyl benzene-1,2,3,5-tetracarboxylate; and aryl polyhdric carboxylic acid aryl ester plasticizers such as triphenyl benzene-1,3,5-tetracarboxylate and hexa-4-methylphenyl benzene-1,2,3,4,5,6-hexacarboxylate. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be a polymer such as a dimer, trimer, tetramer and the like. The phthalic acid ester part of the structure may be a part of the polymer or may be systematically included as a pendant. It may also be introduced into a part of the molecular structure of the additive such as an antioxidant, an acid scavenger and an ultraviolet light absorber.

Among the above ester plasticizer derived from a polycarboxylic acid and a monoalcohol, a dialkylcarboxylic acid alkyl ester is preferable, specifically, abovementioned dioctyladipate and tridecyltricarbalate are cited.

The cellulose ester film of the present invention preferably contains 1-25 weight % of an ester compound, as a plasticizer, having a structure obtained by condensing the organic acid represented by Formula (1) and a polyalcohol having a valence of trivalent or more. When the amount of the plasticizer is less than 1 weight %, the effect of the addition of the plasticizer cannot be obtained, while, when the amount of the plasticizer is more than 25 weight %, bleeding tends to occur, resulting in loss of long term stability of the film. More preferable is a cellulose ester film containing 3-20 weight % of plasticizer, and still more preferable is a cellulose ester film containing 5-11 weight % of plasticizer.

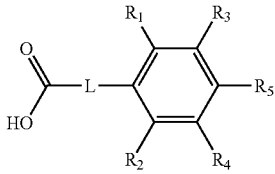

Formula (1)

In above Formula (1), $R_1$-$R_5$ each independently represent a hydrogen atom, a cycloalkyl group, an aralkyl group, an alkoxy group, a cycloalkoxy group, an aryloxy group, an aralkyloxy group, an acyl group, a carbonyloxy group, an oxycarbonyl group, or an oxycarbonyloxy group, any of which may further be substituted, provided that at least one of $R_1$-$R_5$ is not a hydrogen atom. L represents a linkage group, which includes a substituted or unsubstituted alkylene group, an oxygen atom or a direct bond.

Preferred as the cycloalkyl group represented by $R_1$-$R_5$ is a cycloalkyl group having 3-8 carbon atoms, and specific examples include cycloproyl, cyclopentyl and cyclohexyl groups. These groups may be substituted. Examples of preferred substituents include: halogen atoms such as a chlorine atom, a bromine atom and a fluolinr atom, a hydroxyl group, an alkyl group, an alkoxy group, an aralkyl group (the phenyl group may further be substituted with an alkyl group or a halogen atom), an alkenyl group such as a vinyl group or an allyl group, a phenyl group (the phenyl group may further be substituted with an alkyl group, or a halogen atom), a phenoxy group (the phenyl group may further be substituted with an alkyl group or a halogen atom), an acyl group having 2-8 carbon atoms such as an acetyl group or a propionyl group, and a non-substituted carbonyloxy group having 2-8 carbon atoms such as an acetyloxy group and a propionyloxy group.

The aralkyl group represented by $R_1$-$R_5$ includes a benzyl group, a phenetyl group, and a γ-phenylpropyl group, which may be substituted. Listed as the preferred substituents may be those which may substitute the above cycloalkyl group.

The alkoxy group represented by $R_1$-$R_5$ include an alkoxy group having 1-8 carbon atoms. The specific examples include an methoxy group, an ethoxy group, an n-propoxy group, an n-butoxy group, an n-octyloxy group, an isopropoxy group, an isobutoxy group, a 2-ethylhexyloxy group and a t-butoxy group. The above groups may further be substituted. Examples of preferred substituents include: halogen atoms such as a chlorine atom, a bromine atom and a fluorine atom; a hydroxyl group; an alkoxy group; a cycloalkoxy group; an aralkyl group (the phenyl group may be substituted with an alkyl group or a halogen atom); an alkenyl group; a phenyl group (the phenyl group may further be substituted with an alkyl group or a halogen atom); an aryloxy group (for example, a phenoxy group (the phenyl group may further be substituted with an alkyl group or a halogen atom)); an acyl group having 2-8 carbon, atoms such as an acetyl group or a propionyl group; an acyloxy group such as a propionyloxy group; and an arylcarbonyloxy group such as a benzoyloxy group.

The cycloalkoxy groups represented by $R_1$-$R_5$ include an cycloalkoxy group having 1-8 carbon atoms as an unsubstituted cycloalkoxy groups. Specific examples include a cyclopropyloxy group, a cyclopentyloxy group and a cyclohexyloxy group. These groups may further be substituted. Listed as the preferred substituents may be those which may substitute the above cycloalkyl group.

The aryloxy groups represented by $R_1$-$R_5$ include a phenoxy group, the phenyl group of which may further be substituted with the substituent listed as a substituent such as an alkyl group or a halogen atom which may substitute the above cycloalkyl group.

The aralkyloxy group represented by $R_1$-$R_6$ includes a benzyloxy group and a phenethyloxy group, which may further be substituted. Listed as the preferred substituents may be those which may substitute the above cycloalkyl group.

The acyl group represented by $R_1$-$R_5$ includes an unsubstituted acyl group having 1-8 carbon atoms such as an acetyl group and a propionyl group (an alkyl, alkenyl, or alkynyl group is included as a hydrocarbon group of the acyl group), which may further be substituted. Listed as the preferred substituents may be those which may substitute the above cycloalkyl group.

The carbonyloxy group represented by $R_1$-$R_5$ includes an unsubstituted acyloxy group (an alkyl, alkenyl, or alkynyl group is included as a hydrocarbon group of the acyl group) having 2-8 carbon atoms such as an acetyloxy group or a propionyloxy group, and an arylcarbonyloxy group such as a benzoyloxy group, which may further be substituted with the group which may substitute the above cycloalkyl group.

The oxycarbonyl group represented by $R_1$-$R_5$ includes an alkoxycarbonyl group such as a methoxycarbonyl group, an ethoxycarbonyl group or a propyloxycarbonyl group, and an aryloxycarbonyl group such as a phonoxycarbonyl group, which may further be substituted. Listed as the preferred substituents may be those which may substitute the above cycloalkyl group.

The oxycarbonyloxy group represented by $R_1$-$R_5$ includes an alkoxycarbonyloxy group having 1-8 carbon atoms such as a methoxycarbonyloxy group, which may further be substituted. Listed as the preferred substituents may be those which may substitute the above cycloalkyl group.

Among these $R_1$-$R_5$, at least one of $R_1$-$R_5$ is not a hydrogen atom. Further, any of $R_1$-$R_5$ may be combined with each other to form a ring structure.

Further, the linkage group represented by L includes a substituted or unsubstituted alkylene group, an oxygen atom, or a direct bond. The alkylene group includes a methylene group, an ethylene group, and a propylene group, which may further be substituted with the substituent which is listed as the substituent which may substitute the groups represented by above $R_1$-$R_5$.

Of these, one which is particularly preferred as the linking group is the direct bond, which forms an aromatic carboxylic acid.

In the organic acid represented by Formula (1), which constitutes an ester compound to be used as a plasticizer in the present invention, at least one of $R_1$ and $R_2$ is preferably the above mentioned alkoxy group, acyl group, oxycarbonyl group, carbonyloxy group or oxycarbonyloxy group. Further, the organic acids represented by above Formula (1) may contain a plurality of substituents.

In the present invention, the organic acids which substitute the hydroxyl groups of a polyalcohol having a valence of trivalent or more may either be of a single kind or of a plurality of kinds.

In the present invention, the polyalcohol of trivalent or more which reacts with the organic acid represented by above Formula (1) to form a polyalcohol ester is preferably an aliphatic polyalcohol having a valence of 3-20. In the present invention, preferred as a polyalcohol having a valence of trivalent or more is represented by following Formula (3).

R'—(OH)$_m$  Formula (3)

wherein R' represents a m-valent organic group, m represents an integer of 3 or more, and the OH group represents an alcoholic hydroxyl group. Specifically preferable is a polyalcohol with a "m" value of 3 or 4.

The following examples of a polyalcohol are cited, however, the present invention is not limited thereto. Examples of the preferred polyalcohol include: adonitol, arabitol, 1,2,4-butanetriol, 1,2,3-hexanetriol, 1,2,6-hexanetriol, glycerin, diglycerin, erythritol, pentaerythritol, dipentaerythritol, tripentaerythritol, galactitol, glucose, cellobiose, inositol, mannitol, 3-methylpentane-1,3,5-triol, pinacol, sorbitol, trimethylolpropane, trimethylolethane, and xylitol. Of these, specifically preferable are glycerin, trimethylolethane, trimethylolpropane, and pentaerythritol.

An ester of an organic acid represented by Formula (1) and a polyalcohol having a valence of trivalent or more can be synthesized employing methods known in the art. Typical synthesis examples are shown in the examples. Examples of the synthetic method include: a method in which an organic acid represented by Formula (1) and a polyalcohol undergo etherification via condensation in the presence of, for example, an acid; a method in which an organic acid is converted to an acid chloride or an acid anhydride which is allowed to react with a polyalcohol; and a method in which a phenyl ester of an organic acid is allowed to react with a polyalcohol. Depending on the targeted ester compound, it is preferable to select an appropriate method which results in a high yield.

As an example of a plasticizer containing an ester of an organic acid represented by Formula (1) and a polyalcohol having a valence of trivalent or more, the compound represented by Formula (2) is preferably cited.

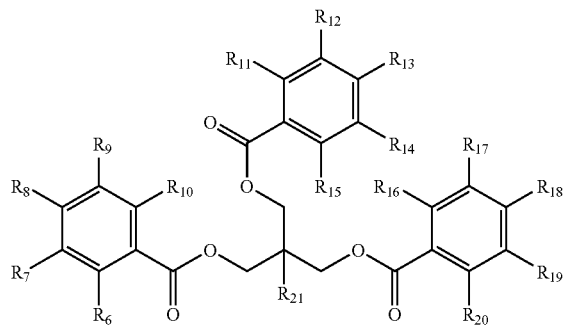

Formula (2)

In Formula (2), $R_6$ to $R_{20}$ each independently represent a hydrogen atom, a cycloalkyl group, an aralkyl group, an alkoxy group, a cycloalkoxy group, an aryloxy group, an aralkyloxy group, an acyl group, a carbonyloxyl group, an oxycarbonyl group or an oxycarbonyloxy group, provided that $R_6$ to $R_{20}$ may further have a substituent. At least on of $R_6$ to $R_{10}$ is not a hydrogen atom, at least on of $R_{11}$ to $R_{15}$ is not a hydrogen atom, and at least on of $R_{16}$ to $R_{20}$ is not a hydrogen atom. $R_{21}$ represents an alkyl group.

As examples of the above described cycloalkyl group, aralkyl group, alkoxy group, cycloalkoxy group, aryloxy group, aralkyloxy group, acyl group, carbonyloxyl group, oxycarbonyl group and oxycarbonyloxy group represented by $R_6$ to $R_{20}$, the same groups as described for abovementioned $R_1$ to $R_5$ can be cited.

The molecular weight of the polyalcohol esters prepared as above is not specifically limited, but is preferably 300-1,500, more preferably 400-1,000. A greater molecular weight is preferred due to reduced volatility, while a smaller molecular weight is preferred in view of reducing water vapor permeability and improving the compatibility with cellulose ester.

Specific compounds of polyalcohol esters according to the present invention will be exemplified below.

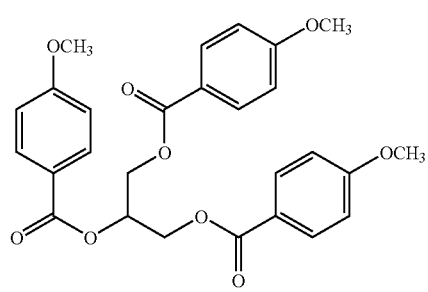

494.49

K-1

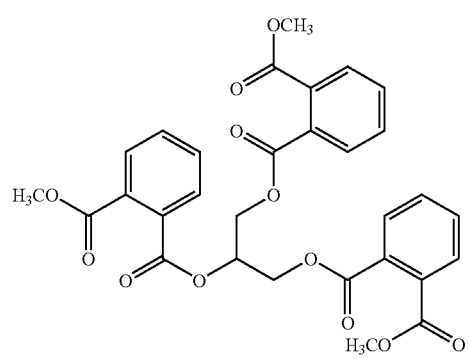

578.52

K-2

-continued
K-3
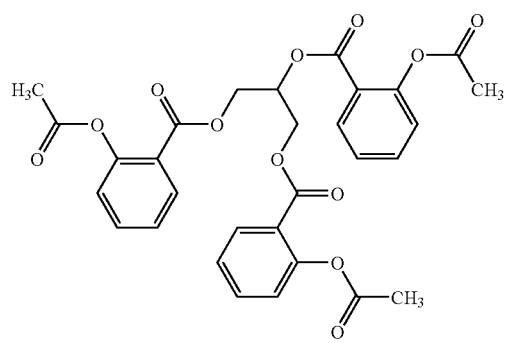
578.52
K-4
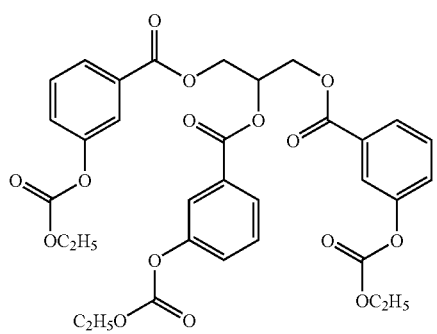
668.60
K-5
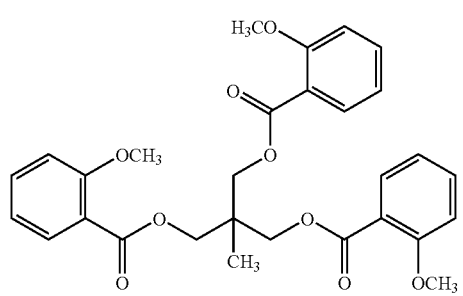
522.54
K-6
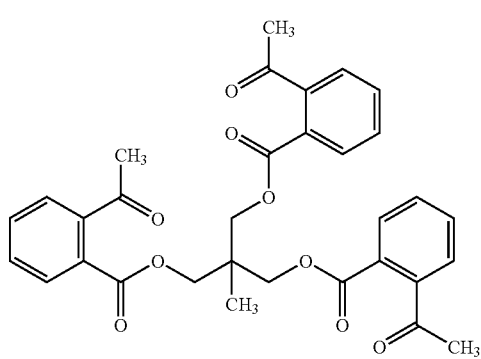
558.58
K-7
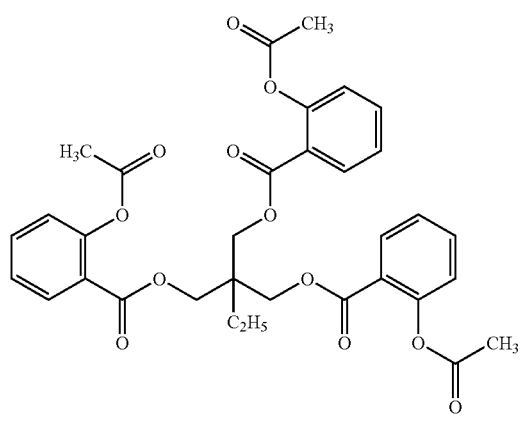
620.60
K-8
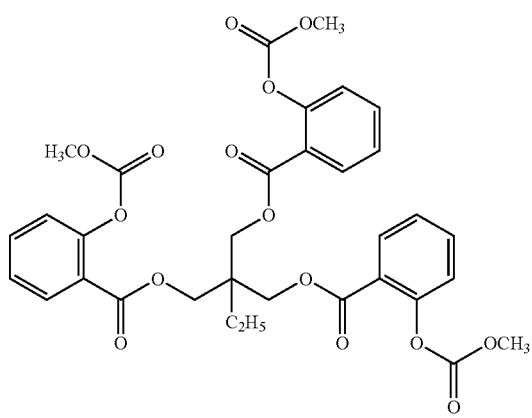
668.60
K-9
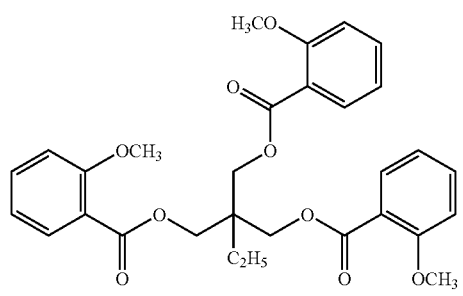
536.57
K-10
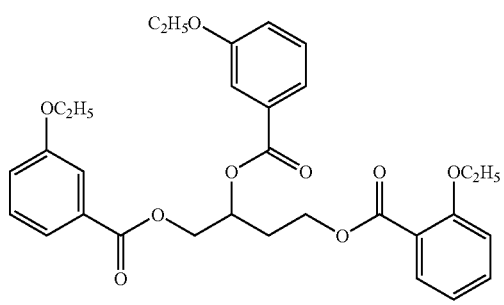
550.60

-continued
K-11
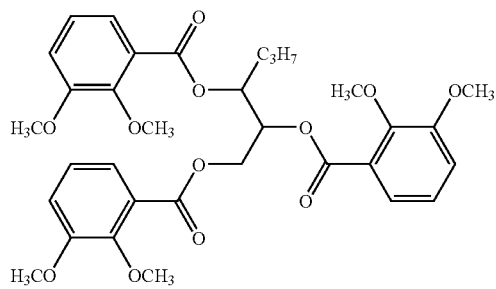
626.65
K-12
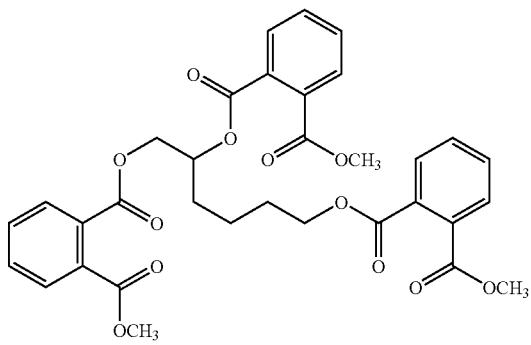
620.60
K-13
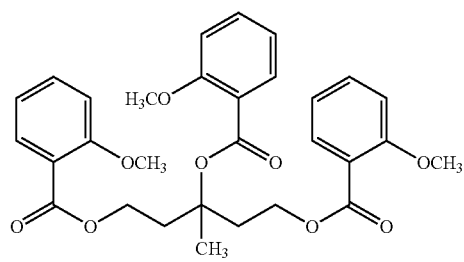
536.57
K-14
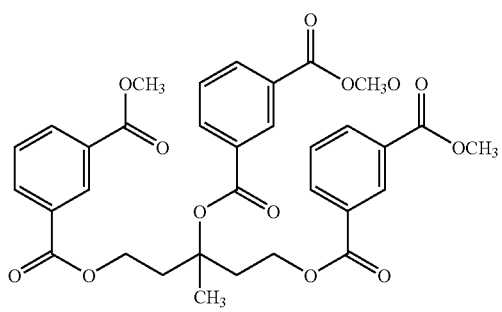
620.60
K-15
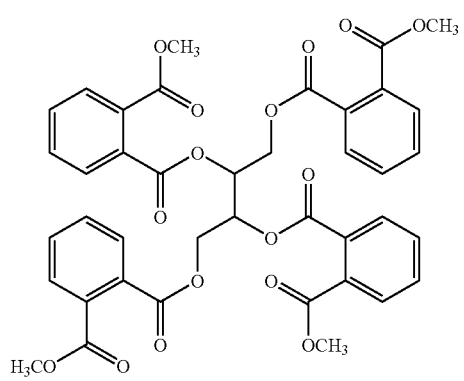
770.69
K-16
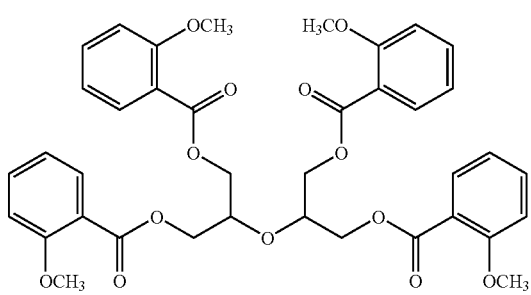
702.70
K-17
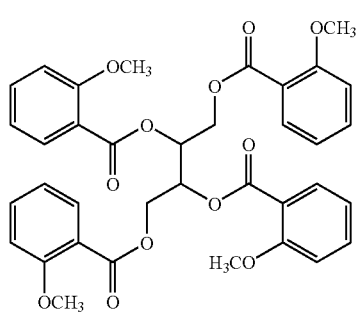
658.65
K-18
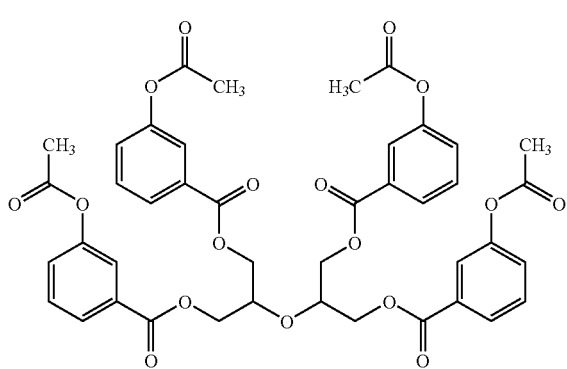
814.74

-continued
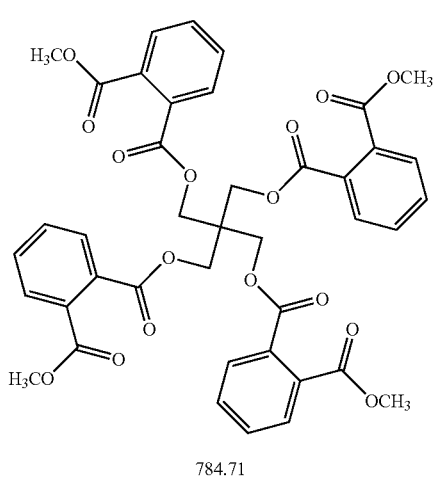
K-19
784.71
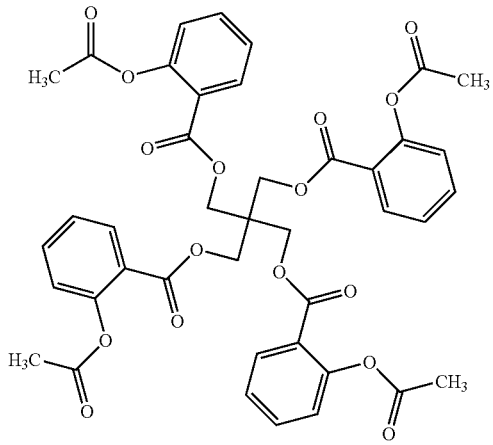
K-20
784.71
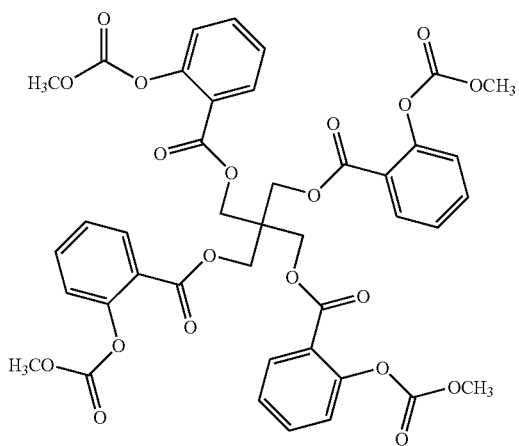
K-21
848.71
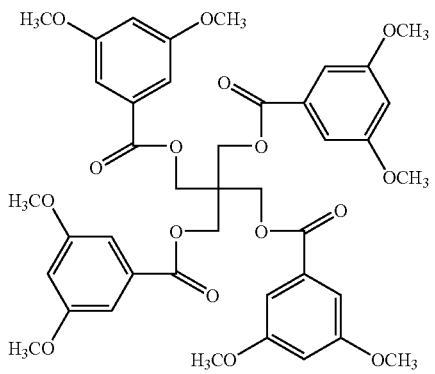
K-22
792.78
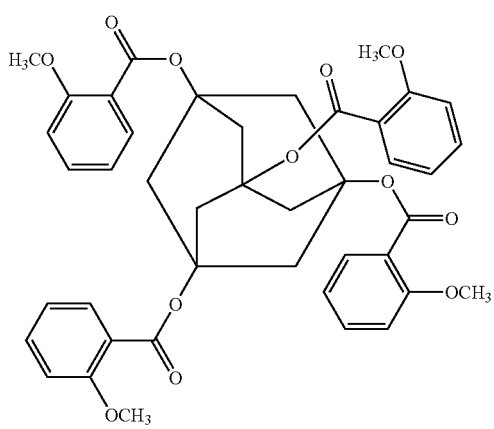
K-23
736.76
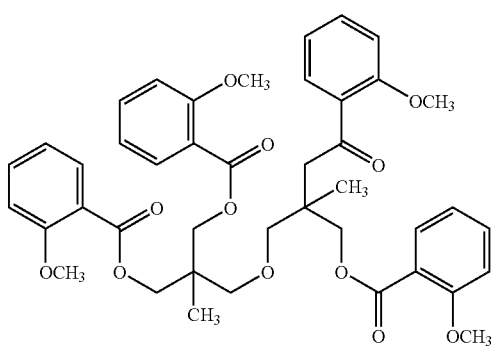
K-24
742.81

-continued
K-25
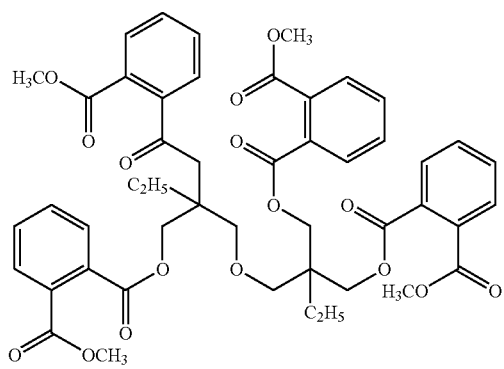
882.90
K-26
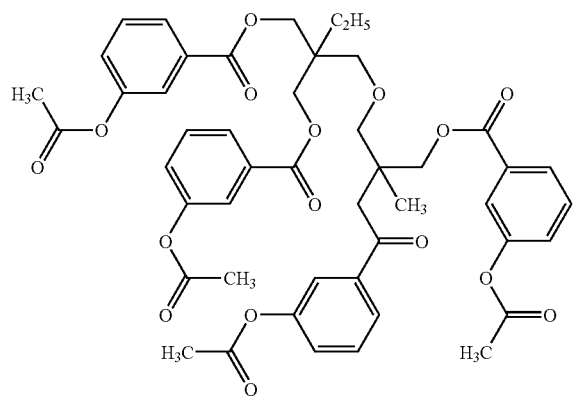
868.87
K-27
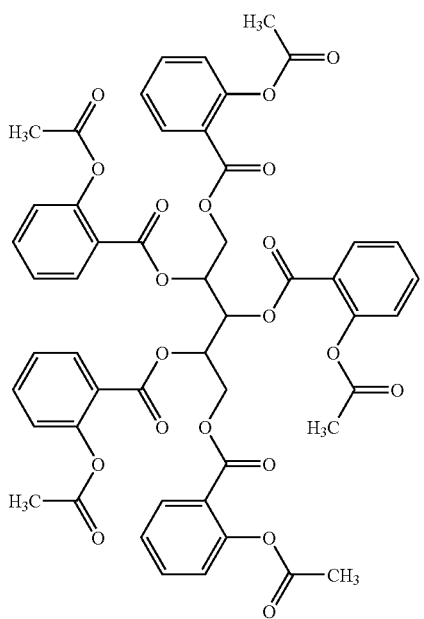
962.86
K-28
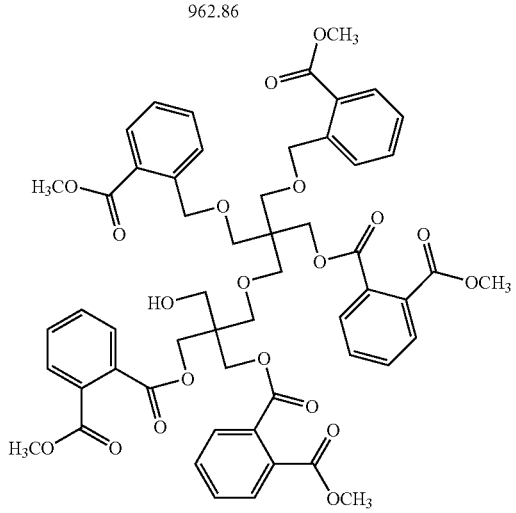
1064.99
K-29
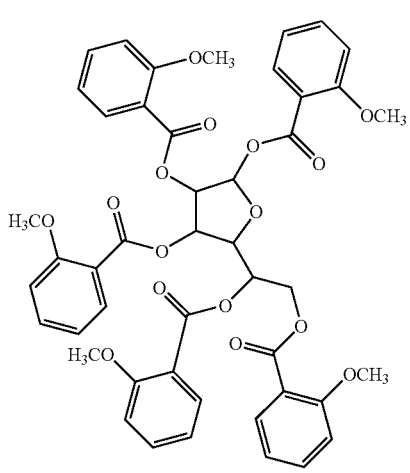
850.82

-continued
K-30
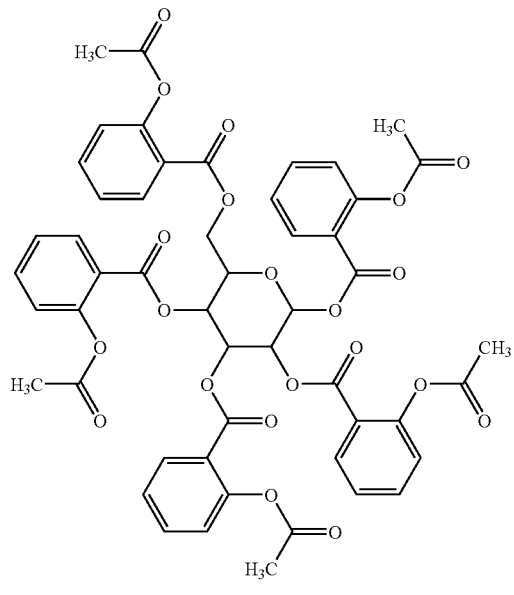
990.87
K-31
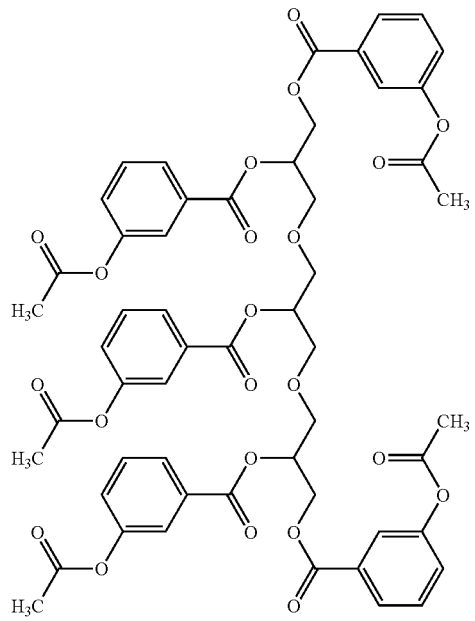
1050.96
K-32
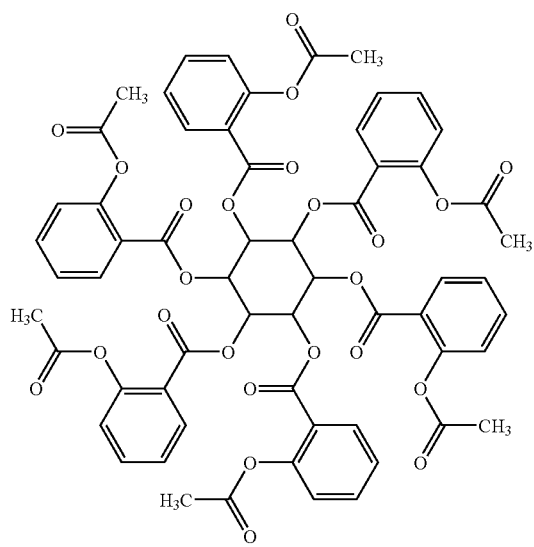
1153.01
K-33
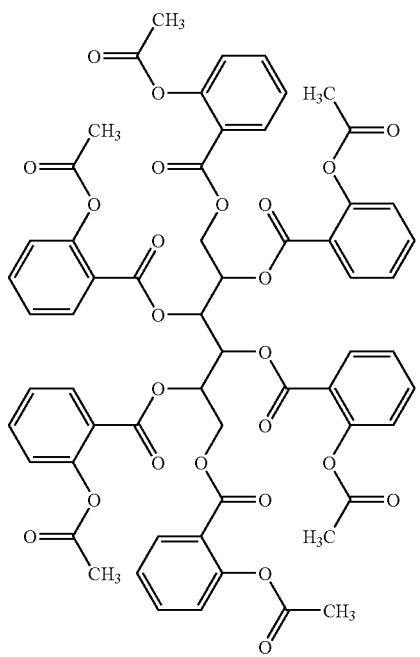
1155.02

K-34
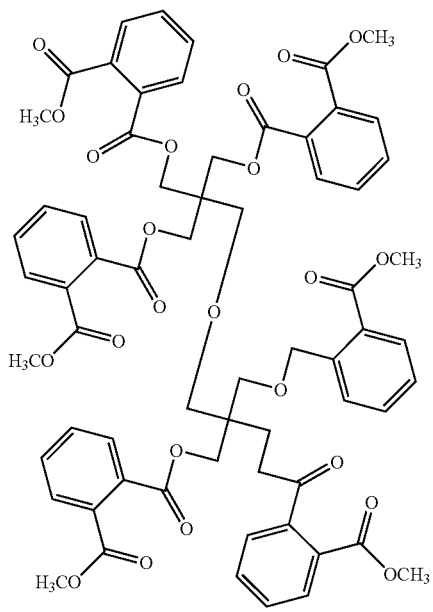
1213.15
K-35
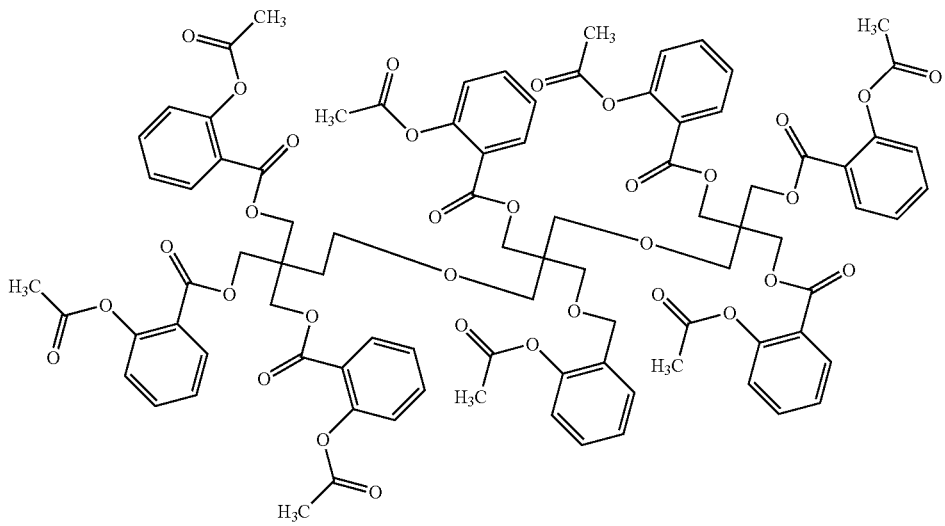
1669.59
K-36
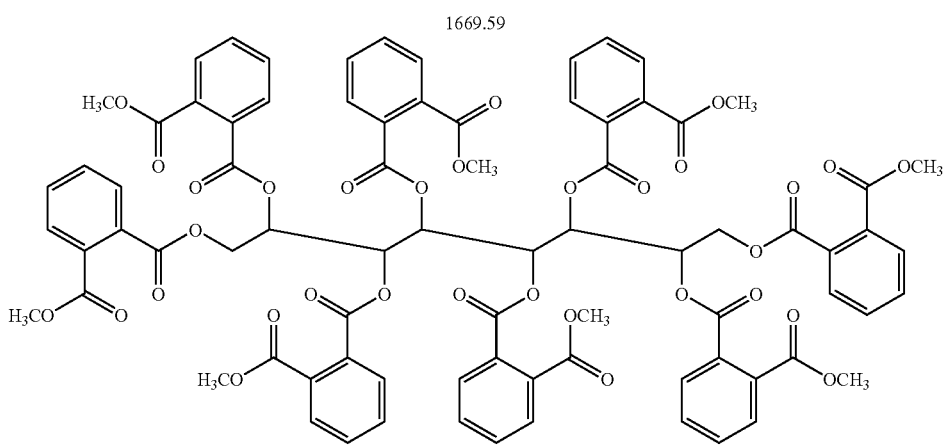
1539.36

-continued
K-37
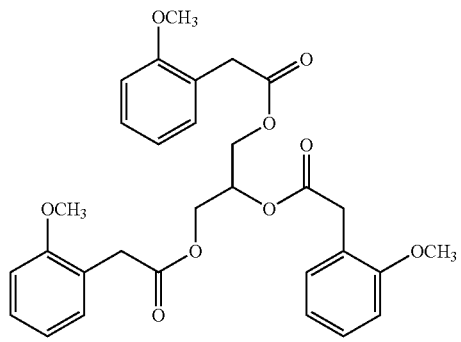
536.57
K-38
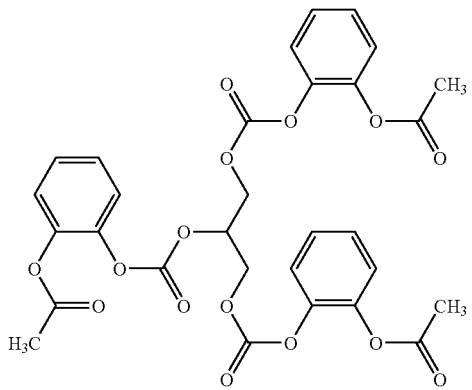
626.52
K-39
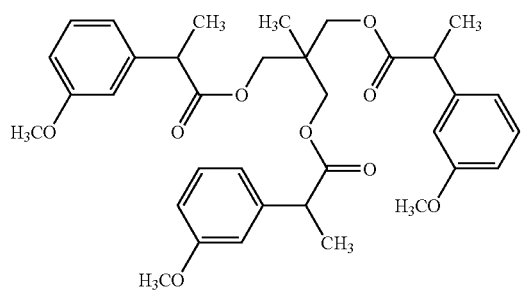
606.70
K-40
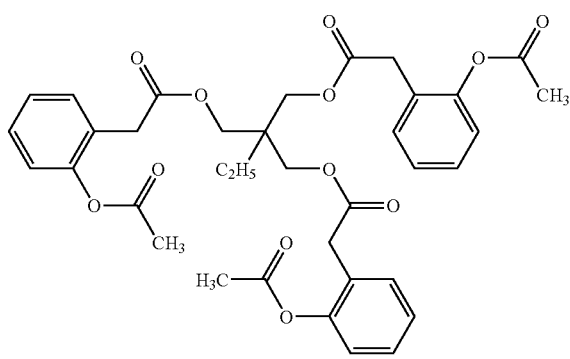
662.68
K-41
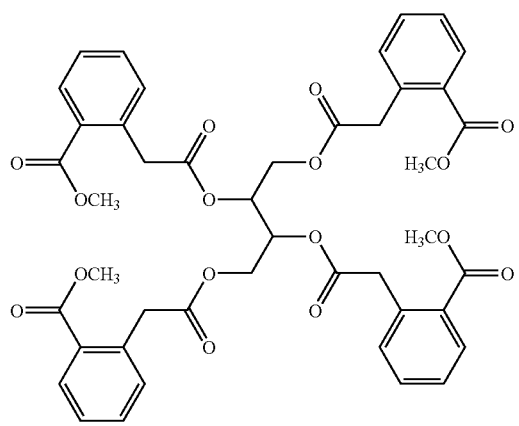
826.79
K-42
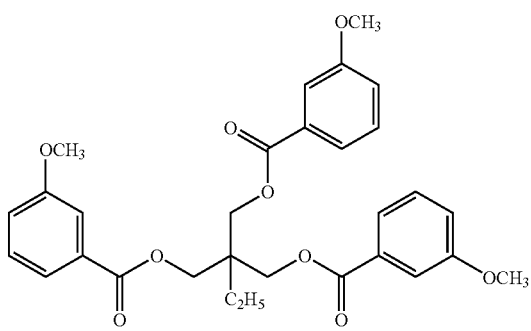
536.57
K-43
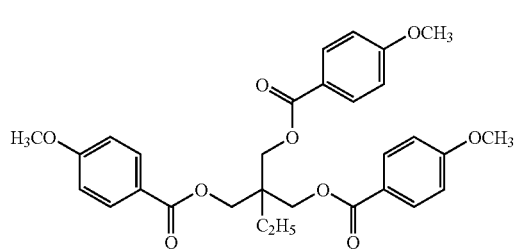
536.57
K-44
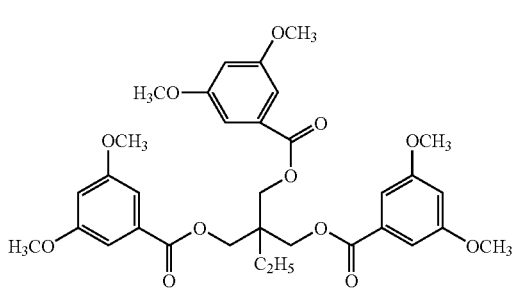
626.65

-continued
K-45
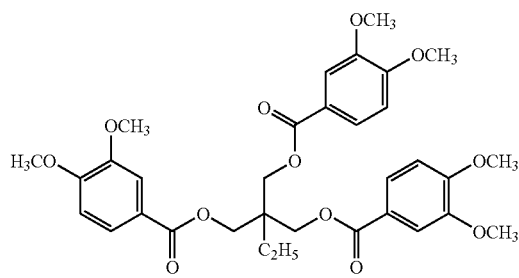
626.65
K-46
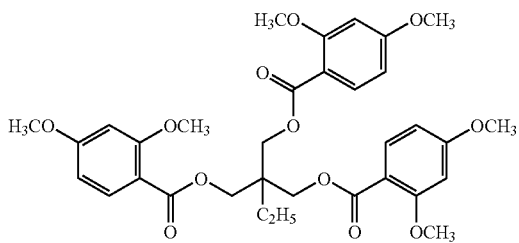
626.65
K-47
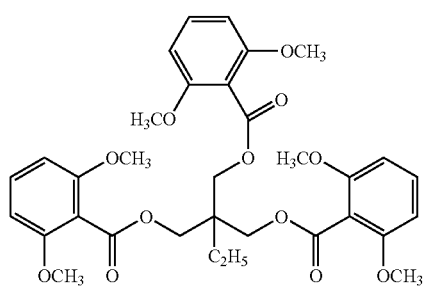
626.65
K-48
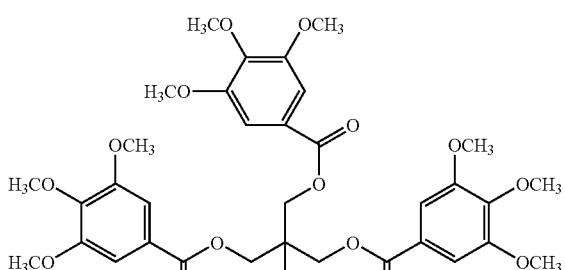
716.73
K-49
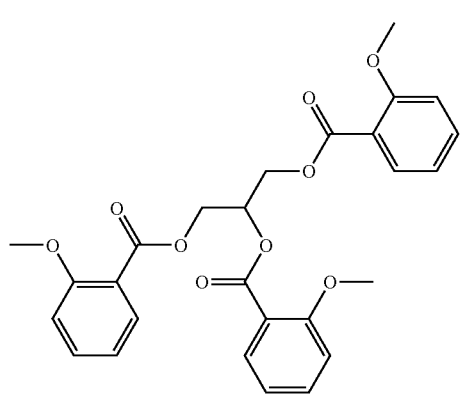
494.49
K-50
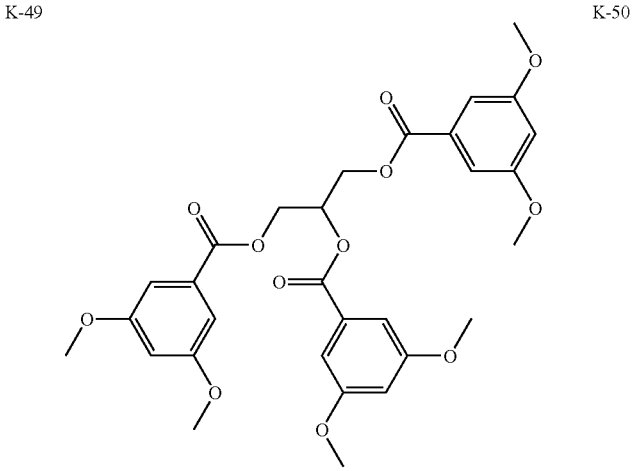
584.57
K-51
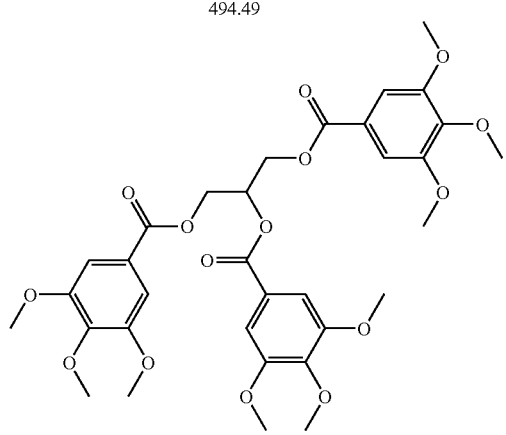
674.65
K-52
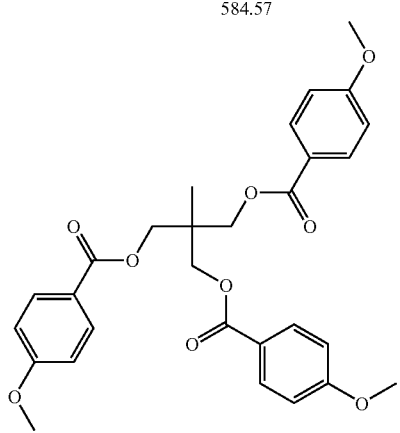
522.54

-continued
K-53
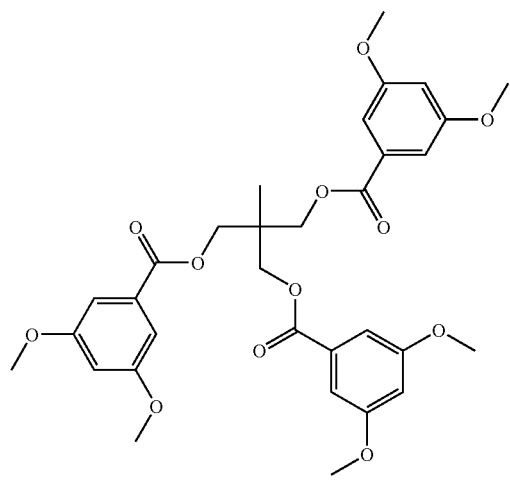
612.62
K-54
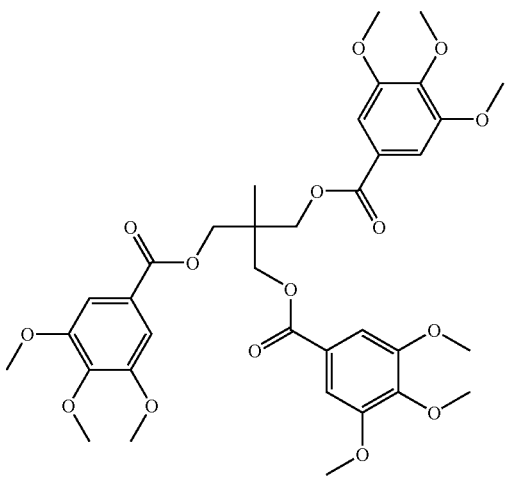
702.70
K-55
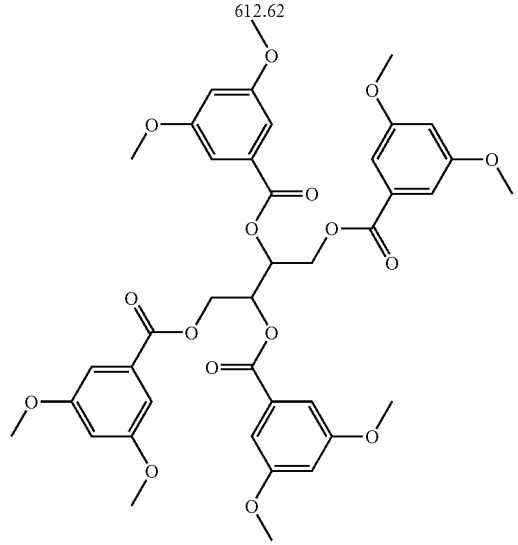
778.75
K-56
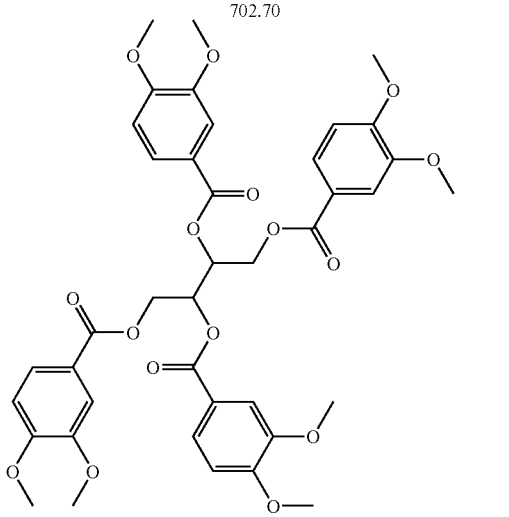
778.75
K-57
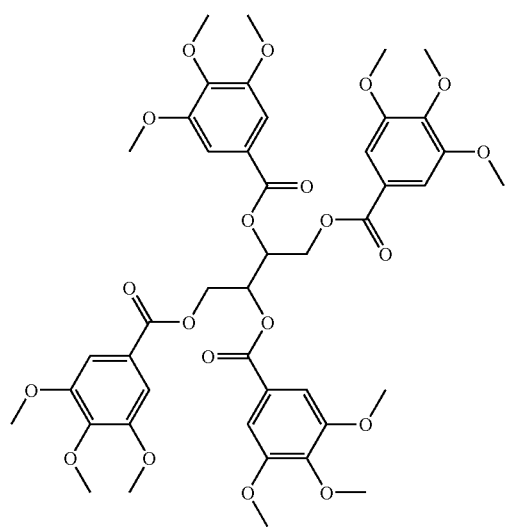
778.75
K-58
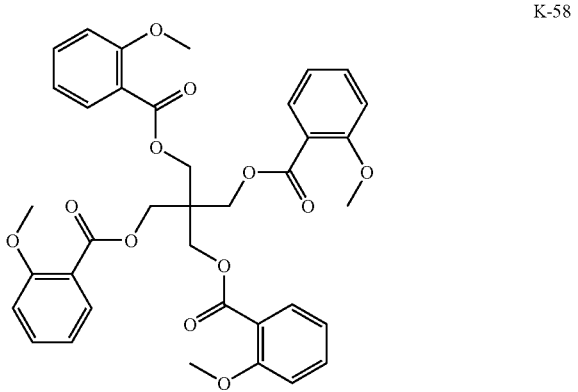
672.67

K-59

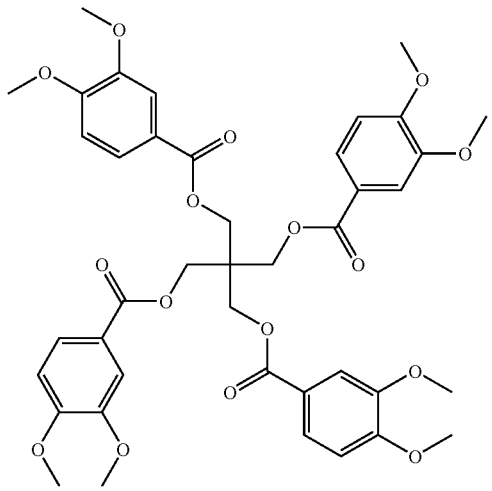

792.78

K-60

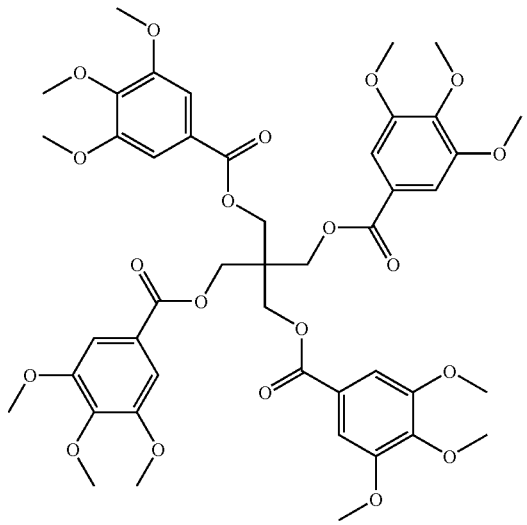

912.88

The ester compound containing an ester of an organic acid represented by Formula (1) and a polyalcohol having a valence of trivalent or more, which is preferably used as a plasticizer in the present invention, exhibits excellent compatibility with cellulose ester and thus a high amount of addition is possible. Accordingly, bleeding out tends not to occur when used together with other plasticizer or additive, whereby other plasticizer or additive can be used without any problem.

(Other Plasticizer)

Other examples of a plasticizer used in the present invention include a phosphate ester plasticizer and a polymer plasticizer.

Phosphate ester plasticizer: Specific examples of the phosphate ester plasticizer include phosphoric acid alkyl esters such as triacetyl phosphate and tributyl phosphate; phosphoric acid cycloalkyl esters such as tricyclopentyl phosphate and cyclohexyl phosphate; and phosphoric acid aryl esters such as triphenyl phosphate, tricresyl phosphate, cresylphenyl phosphate, octydiphenyl phosphate, diphenylbiphenyl phosphate, trioctyl phosphate, tributyl phosphate, trinaphtyl phosphate, trixylyl phosphate, trisortho-biphenyl phosphate. The substituent groups for these may be the same or different, and may be further substituted. The substituent groups may be a mix of an alkyl group, a cycloalkyl group and an aryl group, and the substituent groups may be bonded to each other via covalent bond.

Examples of the phosphate ester also include: alkylenebis (dialkylphosphate) such as ethylenebis(dimethylphosphate) or butylenebis(diethylphosphate); alkylenebis(diarylphosphate) such as ethylenebis(diphenylphosphate) or propylenebis(dinaphtylphosphate); arylenebis(dialkylphosphate) such as phenylenebis(dibutylphosphate) or biphenylenebis (dioctylphosphate); and arylenebis(diarylphosphates) such as phenylenebis(diphenylphosphate) or naphtylenebis (ditluylphosphate). These substituent groups may be the same or different, and may be further substituted. The substituent groups may be a mixture of an alkyl group, cycloalkyl groups and aryl groups, and the substituent groups may be bonded to each other via covalent bond.

Furthermore, a part of the structure of the phosphate ester may be a part of the polymer or may be systematically included as a pendant. It may also be introduced into a part of the molecular structure of an additive such as an antioxidant, an acid scavenger, an ultraviolet absorber of the compounds listed above, aryl phosphate ester and arylenebis(diarylphosphate) are preferable, and more specifically, triphenyl phosphate and phenylenebis(diphenylphosphate) are preferable.

Polymer plasicizers: Specific examples of polymer plasticizes include: an aliphatic hydrocarbon polymer; an alicyclic hydrocarbon polymer; acrylic polymers such as poly(ethylacrylate) and poly(methylmethacrylate); vinyl polymers such as poly(vinylisobutylether) and poly(N-vinylpyrrolidone); styrene polymers such as polystyrene and poly(4-hydroxystyrene); polyesters such as polybutylenesuccinate, polyethylenetelephthalate and polyethylenenaphthalate; polyethers such as polyethyleneoxide and polypropyleneoxide; polyamide; polyurethane; and polyurea. The number average molecular weight of a polymer plasticizer is preferably 1000-500,000 and specifically preferably 5,000-200,000. The number average molecular weight of less than 1,000 may cause a problem of volatility and that of more than 500,000 may result in lowering of plastcizing ability which may cause an unfavorable effect on the physical property of the cellulose ester film. These polymer plasticizers may be a homopolymer containing a single kind of repeat unit or a copolymer containing plural kinds of repeat units, or may contain 2 or more of the above polymers.

In the plasticizer of the present invention, it is preferable, like in the above-mentioned cellulose ester, to remove impurities of residual acid, mineral salt, and low molecular weight organic material, and it is more preferable that the purity of the plasticizer is 99%or more. Each of the amounts of residual acid and water is preferably 0.01-100 ppm, whereby in the melt-casting process of cellulose ester, heat deterioration can be reduced, and film-production stability, optical property and mechanical property of the film are improved.

(Stabilizer)

(Antioxidant)

Since decomposition of cellulose ester is accelerated not only by heat but also by oxygen at temperatures where melt-casting is carried out, it is preferable to incorporate an antioxidant as a stabilizer in the cellulose ester film of the present invention.

As a useful antioxidant in the present invention, a compound which restrains deterioration of the material for melt-casting due to oxygen can be utilized without limitation, however, examples of a useful compound include: phenol, hindered amine, a phosphorus-containing compound, a sulfur-containing compound, a heat resistant processing stabilizer and an oxygen scavenger. Specifically preferable among them is at least one antioxidant (stabilizer) selected from phenol, hindered amine and a phosphorus-containing compound. By blending such a compound, it is possible to prevent coloring or strength decrease of the film, while keeping the transparency or heat resistance of the film. These antioxidants each can be utilized alone or in combination of two types or more. The total adding amount of the antioxidant is 0.01%-5%, preferably 0.1%-3%, and more preferably 0.3%-1%.

A phenol type compound is a compound well known in the art and is described, for example, in columns 12-14 of U.S. Pat. No. 4,839,405, including 2,6-dialkylphenol derivative compounds. Among these compounds, examples of a preferable compound include those represented by Formula (p).

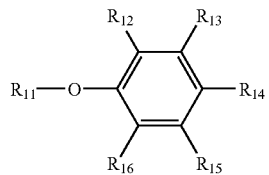

Formula (p)

In Formula (p), $R_{11}$, $R_{12}$, $R_{13}$, $R_{14}$, $R_{15}$, and $R^{16}$ each represent a substituent. Examples of the substituent include: a hydrogen atom, a halogen atom (for example, a fluorine atom and a chlorine atom), an allyl group (for example, a methyl group, an ethyl group, an isopropyl group, a hydroxyethyl group, a methoxy methyl group, a trifluoro methyl group and a t-butyl group), a cycloalkyl group (for example, a cyclopentyl group and a cyclohexyl group), an aralkyl group (for example, a benzyl group and a 2-phenethyl group), an aryl group (for example, a phenyl group, a naphthyl group, p-tolyl group and a p-chlorophenyl group), an alkoxy group (for example, a methoxy group, an ethoxy group, an isopropoxy group and a butoxy group), an aryloxy groups (for example, a phenoxy group), a cyano group, an acylamino group (for example, an acetylamino group and a propionylamino group), an alkylthio group (for example, a methylthio group, an ethylthio group and a butylthio group), an arylthio group (for example, a phenylthio group), a sulfonylamino group (for example, a methanesulfonylamino group and a benzene sulfonyl amino group), an ureido group (for example, a 3-methylureido group, a 3,3-dimethylureido group and a 1,3-dimethylureido group), a sulfamoylamino group (for example, a dimethylsulfamoyl amino group), a carbamoyl group (for example, a methylcarbamoyl group, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group, (for example, a phenoxycarbonyl group), a sulfonyl group (for example, a methanesulfonyl group, a butane sulfonyl group and a phenylsulfonyl group), an acyl group (for example, an acetyl group, a propanoyl group and a butyroyl group), an amino group (for example, a methylamino group, an ethylamino group and a dimethylamino group), a cyano group, a hydroxy group, a nitro group, a nitroso group, an amineoxide group (for example, a pyridine oxide group), an imide group (for example, a phthalimide group), disulfide group (for example, a benzene disulfide group and a benzothiazolyl-2-disulfide group), a carboxyl group, a sulfo group and a heterocycle group (for example, a pyrrole group, a pyrrolidyl group, a pyrazolyl group, an imidazolyl group, a pyridyl group, a benzimidazolyl group, a benzthiazolyl group and a benzoxazolyl group). These substituents may be further substituted. Further, $R_{11}$ is preferably a hydrogen atom, and $R_{12}$ and $R_{16}$ each are preferably a t-butyl group which is a phenol compound. Examples of the phenol compound include: n-octadecyl-3-(3,5-di-t-butyl-4-hydroxyphenyl)propionate, n-octadecyl-3-(3,5-di-t-butyl-4-hydroxyphenyl)acetate, n-octadecyl-3,5-di-t-butyl-4-hydroxybenzoate, n-hexyl-3,5-di-t-butyl-4-hydroxyphenylbenzoate, n-dodecyl-3,5-di-t-butyl-4-hydroxyphenylbenzoate, neo-dodecyl-3-(3,5-di-t-butyl-4-hydroxyphenyl)propionate, dodecyl-β-(3,5-di-t-butyl-4-hydroxyphenyl)propionate, ethyl-α-(4-hydroxy-3,5-di-t-butylphenyl)isobutyrate, octadecyl-α-(4-hydroxy-3,5-di-t-butylphenyl)isobutyrate, octadecyl-α-(4-hydroxy-3,5-di-t-butyl-4-hydroxyphenyl)propionate, 2-(n-octylthio)ethyl-3,5-di-t-butyl-4-hydroxy-benzoate, 2-(n-octylthio)ethyl-3,5-di-t-butyl-4-hydroxyphenylacetate, 2-(n-octadecylthio)ethyl-3,5-di-t-butyl-4-hydroxyphenylacetate, 2-(n-octadecylthio)ethyl-3,5-di-t-butyl-4-hydroxybenzoate, 2-(2-hydroxyethylthio)-ethyl-3,5-di-t-butyl-4-hydroxybenzoate, diethylglycol-bis-(3,5-di-t-butyl-4-hydroxyphenyl)propionate, 2-(n-octadecylthio)ethyl-3,5-di-t-butyl-4-hydroxyphenyl)-propionate, stearamide-N,N-bis-[ethylene-3-(3,5-di-t-butyl-4-hydroxyphenyl)propionate], N-butylimino-N,N-bis-[ethylene-3-(3,5-di-t-butyl-4-hydroxyphenyl)propionate], 2-(2-stearoyloxyethylthio)ethyl-3,5-di-t-butyl-4-hydroxybenzoate, 2-(2-stearoyloxyethylthio)ethyl-7-(3-methyl-5-t-butyl-4-hydroxyphenyl)heptanoate, 1,2-propyleneglycol-bis-[3-(3,5-di-t-butyl-4-hydroxyphenyl)propionate], ethyleneglycol-bis-[3-(3,5-di-t-butyl-4-hydroxyphenyl)propionate], neopentylglycol-bis-[3-(3,5-di-t-butyl-4-hydroxyphenyl)propionate], ethyleneglycol-bis-(3,5-di-t-butyl-4-hydroxyphenylacetate) glycerol-1-n-octadecanoate-2,3-bis-(3,5-di-t-butyl-4-hydroxyphenylacetate), pentaerythritoltetrakis[3-(3',5'-di-t-butyl-4'-hydroxyphenyl)propionate], 1,1,1-trimethylolethane-tris-[3-(3,5-di-t-butyl-4-hydroxyphenyl)propionate], sorbitol-hexa-[3-(3,5-di-t-butyl-4-hydroxyphenyl)propionate], 2-hydroxyethyl-7-(3-methyl-5-t-butyl-4-hydroxyphenyl)propionate, 2-stearoyloxyethyl-7-(3-methyl-5-t-butyl-4-hydroxyphenyl)heptanoate, 1,6-n-hexanediol-bis-[(3',5'-di-butyl-4-hydroxyphenyl)propionate]and pentaerythritoltetrakis(3,5-di-t-butyl-4-hydroxyhydrocinnamate). Above phenol compounds have been commercialized, for example, as "Irganox1076" and "Irganox1010" from Ciba Specialty Chemicals, Inc Specifically, "Irganox1010" (pentaerythritoltetrakis[3-(3,5-di-t-butyl-4-hydroxyphenyl) propionate]) is preferably utilized.

As a hindered amine compound used in the present invention, preferable is a compound represented by Formula (h) is preferably used as one of the useful antioxidants.

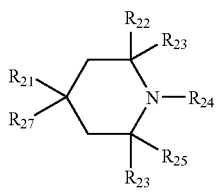

Formula (h)

In Formula (B), $R_{21}$, $R_{22}$, $R_{23}$, $R_{24}$, $R_{25}$, $R_{26}$, and $R_{27}$ each represent a substituent. Examples of the substituent are common to those described for Formula (p). $R_{24}$ is preferably a hydrogen atom or a methyl group, $R_{27}$ is preferably a hydrogen atom and $R_{22}$, $R_{23}$, $R_{25}$ and $R_{26}$ each are preferably a methyl group.

Examples of a hindered amine compound include: bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl))-2-(3,5-di-t-butyl-4-hydroxybenzyl)-2-butylmalonate, bis(1-acroyl-2,2,5,6-tetramethyl-4-piperidyl)-2,2-bis(3,5-di-t-butyl-4-hydroxybenzyl)-2-butylmalonate, bis(1,2,2,6,6-pentamethyl-4-piperidyl)decanedioate, 2,2,6,6-tetramethyl-4-piperidylmethacrylate, 4-[3-(3,5-di-t-butyl-4-1-hydroxyphenyl) propionyloxy]-1-[2-(3-(3,5-di-t-butyl-4-hydroxyphenyl) propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propioneamide, tetrakis(2,2,6,6-tetramethyl-4-piperidyl)-1,2,3,4-butanetetracarboxylate and tetrakis(1,2,2,6,6-pentamethyl-4-piperidyl)-1,2,3,4-butanetetracarboxylate.

Also, a polymer compound is preferable, examples of which include: N,N',N'',N'''-tetrakis [4,6-bis-[butyl(N-methyl-2,2,6,6-tetramethylpiperidine-4-yl)amino]-triazine-2-yl]-4,7-diazadecane-1,10-diamine; a polycondensation compound of dibutylamine, 1,3,5-triazine-N,N'-bis(2,2,6,6-tetramethyl-4-piperidyl)-1,6-hexamethylenediamine and N-(2,2,6,6-tetramethyl-4-piperidyl) butylamine; a polycondensation compound of dibutylamine, 1,3,5-triazine and N,N'-bis(2,2,6,6-tetramethyl-4-piperidyl) butylamine; poly[{(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; a polycondensation compound of 1,6-hexanediamine-N,N'-bis(2,2,6,6-tetramethyl-4-piperidyl) and morpholine-2,4,6-trichloro-1,3,5-triazine; a high molecular weight HALS in which plurality of piperidine rings are combined via a triazine moiety, such as poly[(6-morpholino-s-triazine-2,4-diyl)][(2,2,6,6-tetramethyl-4-piperidyl)imino]-hexamethylene [(2,2,6,6-tetramethyl-4-piperidyl)imino]]; a polymer of dimethyl succinate and 4-hydroxy-2,2,6,6-tetramethyl-1-piperidineethanol; and a compound in which a piperizine ring is combined via a ester bond, such as a mixed ester compound of 1,2,3,4-butanetetracarboxylic acid, 1,7,2,6,6-pentamethyl-4-piperizinol and 3,9-bis(2-hydroxy-1,1-dimethylethyl)-2,4,8,10-tetraoxaspiro[5,5]undecane, however, the present invention is not limited thereto. Among these compounds, preferable are, for example, a polycondensation compound of dibutylamine, 1,3,5-triazine and N,N'-bis(2,2,6,6-tetramethyl-4-piperidyl) butylamine; poly[{1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; and a polymer of dimethyl succinate and 4-hydroxy-2,2,6,6-tetramethyl-1-piperidine ethanol, which have a number average molecular weight (Mn) of 2,000-5,000.

Above hindered amine compounds have been commercialized, for example, as "Tinuvin144" and "Tinubin770" from Ciba Specialty Chemicals, Inc, and as "ADK STABLA-52" from ADEKA Corp.

(Phosphorus-Containing Compound)

As the phosphorus-containing compound used in the present invention, preferable is a compound having a substructure represented by following Formula (r-1), (r-2), (r-3), (r-4) or (r-5) in the molecule.

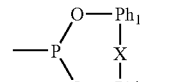

Formula (r-1)

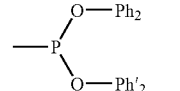

Formula (r-2)

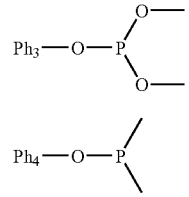

Formula (r-3)

Formula (r-4)

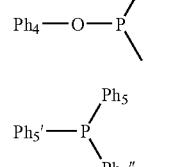

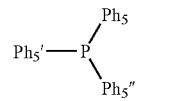

Formula (r-5)

In the Formulas, $Ph_1$ and $Ph'_1$ each represent a phenylene group, and the hydrogen atom of the phenylene group may be replaced with a phenyl group, an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_1$ and $Ph'_1$ may be mutually the same, or may be different. X represents a single bond, a sulfur atom, or a —$CHR_6$-group. $R_6$ represents a hydrogen atom, an alkyl group having 1 to 8 carbon atoms, or a cycloalkyl group having 5 to 8 carbon atoms. $Ph_2$ and $Ph'_2$ each represent a phenyl group or a biphenyl group. The hydrogen atom of the phenyl group or the biphenyl group may be replaced with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_2$ and $Ph'_2$ may be mutually the same or may be different. $Ph_3$ represents a substituent. The substituent is the same as the substituent described for Formula (p). More preferably, $Ph_3$ represents a phenyl group or a biphenyl group. The hydrogen atom of the phenyl group or the biphenyl group may be replaced with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_3$ may further be substituted with a substituent which is the same as the substituent described for Formula (p).

Ph₃ represents a substituent. The substituent is the same as the substituent described for Formula (p). More preferably, Ph₃ represents a phenyl group or a biphenyl group. The hydrogen atom of the phenyl group or the biphenyl group may be replaced with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. Ph₂ may further be substituted with a substituent which is the same as the substituent described for Formula (p).

Ph₄ represents a substituent. The substituent is the same as the substituent described for Formula (p). More preferably, Ph₄ represents an alkyl group or a phenyl group each having 1 to 20 carbon atoms. The hydrogen atom of the alkyl group or the phenyl group may be replaced with a substituent which is the same as the substituent described for Formula (p).

Ph₅, Ph'₅, and Ph"₅ each represent a substituent. The substituent is the same as the substituent described for Formula (p). More preferably, Ph₅, Ph'₅, and Ph"₅ each represent an alkyl group or a phenyl group each having 1 to 20 carbon atoms. The hydrogen atom of the alkyl group or the phenyl group may be replaced with a substituent which is the same as the substituent described for Formula (p).

Specific examples of a phosphorus-containing compound include: mono-phosphite compounds such as triphenyl phosphite, diphenylisodecyl phosphite, phenyldiisodecyl phosphite, tris(nonylphenyl) phosphite, tris(dinonylphenyl) phosphite, tris(2,4-di-t-butylphenyl) phosphite, 10-(3,5-di-t-butyl-4-hydroxybenzyl)-9,10-dihydro-9-oxa-10-phosphaphenanthrene-10-oxide, 6-[3-(3-t-butyl-4-hydroxy-5-methylphenyl)propoxy]-2,4,8,10-tetra-t-butyldibenz[d,f][1.3.2]dioxaphosphepin and tridecyl phosphite; diphosphite compounds such as 4,4'-butylidene-bis(3-methyl-6-t-butylphenyl-di-tridecyl phosphite) and 4,4'-isopropylidene-bis(phenyl-di-alkyl (C12-C15) phosphite); phosphonite compounds such as triphenyl phosphonite, tetrakis(2,4-di-tert-butylphenyl)[1,1-biphenyl]-4,4'-diylbisphosphonite and tetrakis(2,4-di-tert-butyl-5-methylphenyl)[1,1-biphenyl]-4,4'-diylbisphosphonite; phosphinite compounds such as triphenyl phosphinite and 2,6-dimethylphenyldiphenyl phosphinite; and phosphine compounds such as triphenyl phosphine and tris(2,6-dimethoxyphenyl) phosphine. Above phosphorus-containing compound have been commercialized, for example, as "Sumilizer GP" from Sumitomo Chemical Co., Ltd., "ADK STAB PEP-24G" "ADK STAB PEP-36" "ADK STAB 3010" from ADEKA Corp., "GSY-P101" from SAKAI CHEMICAL INDUSTRY CO., LTD. and "IRGAFOS P-EPQ" from Ciba Specialty Chemicals, Inc.

In the present invention, a sulfur-containing compound is preferably used as an antioxidant, and the compound resented by Formula (s) is preferably used.

$$R_{31}\text{—}S\text{—}R_{32} \qquad \text{Formula (s)}$$

In the Formula, R₃₁ and R₃₂ each represent a substituent. The substituent is the same as the substituent described for Formula (p). R₃₁ and R₃₂ each are preferably an alkyl group.

Examples of a sulfur-containing compound include: dilauryl-3,3-thio-dipropionate, dimyristyl-3,3'-thiodipropionate, distearyl-3,3-thio-dipropionate, laurylstearyl-3,3-thio-dipropionate, pentaerythritol-tetrakis (β-lauryl-thio-propionate), 3,9-bis(2-dodecylthioethyl)-2,4,8,10-tetra-oxaspiro[5,5]undecane. Above sulfur-containing compounds have been commercialized, for example, as "Sumilizer TPL-R" and "Sumilizer TP-D" from Sumitomo Chemical Co., Ltd.

Similarly to the case of the aforementioned cellulose ester, the antioxidant preferably removes the impurities such as residual acid, inorganic salt and organic low-molecule compound that have been carried over from the process of manufacturing, or that have occurred during preservation. More preferable is to have a purity of 99% or more. The amount of residual acid and water is preferably 0.01 through 100 ppm. This reduces thermal deterioration in the melt-castling film formation of the cellulose ester, and improves the film formation stability, the optical property and the mechanical property of the film.

An acid scavenger is an agent which has a role to trap a residual acid (a protonic acid) in cellulose ester, which has been carried over from the process of manufacturing. Alternatively, when cellulose ester is melted, acetic acid or propionic acid is formed when the cellulose ester is cellulose acetate propionate, since the hydrolysis of the side chain of the cellulose ester is accelerated by the water contained in the polymer and the heat. The acid scavenger is usable when it is chemically bonded with an acid, and examples of an, acid scavenger include compounds having an epoxy structure, a tertiary amine structure or an ether structure, however, the acid scavenger is not limited thereto.

Specifically, preferable is an acid scavenger containing an epoxy compound disclosed in U.S. Pat. No. 4,137,201. Such epoxy compounds as the acid scavenger have been known in the art, and examples thereof include diglycidyl ether of various polyglycols, particularly a polyglycol driven by condensation of approximately 8 to 40 moles of ethylene glycol per mole of the polyglycol, diglycidyl ether of glycerol, an metal epoxy compound (for example, ones usually used in a vinyl chloride polymer composition, or one usually used together with a vinyl chloride polymer composition), an epoxide ether condensate, diglycidyl ether of bisphenol A (namely, 4,4'-dihydroxydiphenyldimethylmethane), an epoxide unsaturated fatty acid ester (specifically, an ester of alkyl haring 2-4 carbon atoms of at fatty acid having 2-22 carbon atoms such as butyl epoxystearate) and a triglyceride of one of various epoxide long chain fatty acids (for example, an epoxide soybean oil composition. The examples further include an epoxide of plant oil or another unsaturated natural oil. The epoxide oils are sometimes called as epoxide of natural glyceride or epoxide of unsaturated fatty acid and these fatty acids are each contains 12-22 carbon atoms. As an epoxy group-containing epoxide resin compound available on the market, EPON 815C, and an epoxide ether oligomer condensation product represented by Formula (4) are preferably employed.

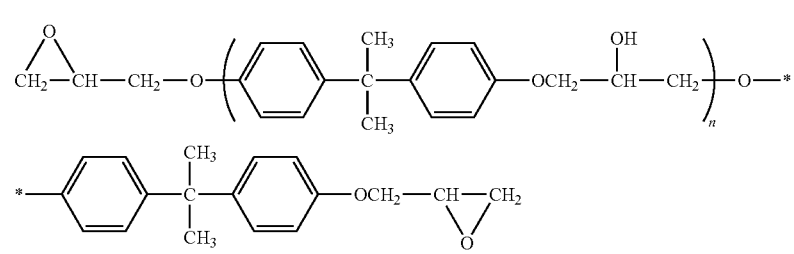

Formula (4)

In the above formula, n is 0-12.

Also following Compound e is preferable.

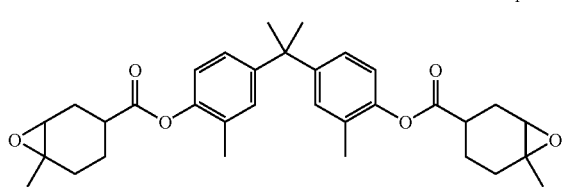

Compound e

Also, usable acid scavenger includes one disclosed in paragraphs 87-105 of JA-A No. 5-194788. The adding amount of these acid scavengers is 0.01%-5%, preferably 0.1%-3%, and more preferably 0.3%-1%.

The acid scavenger preferably removes the impurities such as residual acid, inorganic salt and organic low-molecule compound that have been carried over from the process of manufacturing, or that have occurred during preservation. More preferable is to have a purity of 99% or more. The amount of residual acid and water is preferably 0.01 through 100 ppm. This reduces thermal deterioration in the melt-casting film formation of the cellulose ester, and improves the film formation stability, the optical property and the mechanical property of the film.

An acid scavenger is also referred to as an acid remover, an acid trapping agent, an acid catcher, however, in the present invention, any of these agents are usable regardless of the difference in the address term.

<<UV Absorbent>>

A UV absorbent (an ultraviolet light absorber) preferably has excellent ultraviolet light absorbance for wavelengths of 370 nm or less in view of preventing deterioration of the polarizer film or the display device due to ultraviolet light, and from the viewpoint of the liquid crystal display it is preferable that there is little absorbance of visible light having wavelengths of 400 nm or more. Examples of the UV absorbent include: oxybenzophenone compounds, benzotriazole compounds, salicylic acid ester compounds, benzophenone compounds, cyano acrylate compounds and nickel complex compounds. Of these, preferable are benzophenone compounds and benzotriazole compounds which exhibit little coloration. In addition, the structure of the UV absorvent may be that of a multimer, for example, a dimmer, a trimer and a tetramer, having plural portions exhibiting UV absorbing function in the molecule. UV absorbents disclosed in JP-A Nos. 10-182621 and 8-337574, and polymer UV absorbents disclosed in JP-A No. 6-148430 are also applicable.

Specific examples of a useful benzotriazole UV absorbent include 2-(2'-hydroxy-5'-methylphenyl)benzotriazole, 2-(2'-hydroxy 3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimide methyl)-5'-methylphenyl)benzotriazole, 2,2-methylenebis(4-(1,1,3,3,-tetramethylbutyl)-6-(2H-benzotriazole-2-yl) phenyl), 2-(2'-hydroxy-3'-tert-butyl-5'-methylphenyl)-5-chlorobenzotriazole, 2-(2H-benzotriazole-2-yl)-6-(straight chain or side chain dodecyl)-4-methylphenol, a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate. However, the present invention is not limited thereto.

As commercially available UV absorbents, TINUVIN 109, TINUVIN 171, TINUVIN 360 and TINUVIN 928 (all of which are manufactured by Chiba Specialty Chemical Co., Ltd.) are usable.

Examples of the benzophenone compound include: 2,4-dihydroxy benzophenone, 2,2'-dihydroxy-4-methoxy benzophenone, 2-hydroxy-4-methoxy-5-sulfobenzophenone and bis (2-methoxy-4-hydroxy-5-benzoylphenylmethane), however, the present invention is not limited thereto.

The amount of the UV absorbent used in the present invention is preferably 0.1-20 weight %, more preferably 0.5-10 weight %, and still more preferably 1-5 weight %. Two or more UV absorbents may be used in combination.

<<Viscosity Lowering Agent>>

In the present invention, a hydrogen bondable solvent may be added in order to reduce a melt viscosity. The hydrogen bondable solvent means an organic solvent capable of causing "bonding" of a hydrogen atom mediation generated between electrically negative atoms (oxygen, nitrogen, fluorine, chlorine) and hydrogen covalent bonding with the electrically negative atoms, in other word, it means an organic solvent capable of arranging molecules approaching to each other with a large bonding moment and by containing a bond including hydrogen such as O—H ((oxygen hydrogen bond), N—H (nitrogen hydrogen bond) and F—H (fluorine hydrogen bond), as disclosed in the publication "Inter-molecular force and surface force" written by J. N. Israelachibiri (translated by Yasushi Kondo and Hiroyuki Ohshima, published by McGraw-Hill, 1991). Since the hydrogen bondable solvent has an ability to form a hydrogen bond between celluloses stronger than that between molecules of cellulose ester, the melting temperature of a cellulose ester composition can be lowered by the addition of the hydrogen bondable solvent than the glass transition temperature of a cellulose ester alone in the melting casting method conducted in the present invention. Further, the melting viscosity of a cellulose ester composition containing the hydrogen bondable solvent can be lowered than that of a cellulose ester in the same melting temperature.

Examples of the hydrogen bondable solvents include alcohol such as methanol, ethanol, propanol, isopropanol, n-butanol, sec-butanol, t-butanol, 2-ethyl hexanol, heptanol, octanol, nonanol, dodecanol, ethylene glycol, propylene glycol, hexylene glycol, dipropylene glycol, polyethylene glycol, polypropylene glycol, methyl cellosolve, ethyl cellosolve, butyl cellosolve, hexyl cellosolve, and glycerol; ketone such as acetone and methyl ethyl ketone; carboxylic acid such as formic acid, acetic acid, propionic acid, and butyric acid; ether such as diethyl ether, tetrahydrofuran, and dioxane; pyrolidone such as N-methylpyrolidone; and amines such as trimethylamine and pyridine. These hydrogen bondable solvents may be used alone or a mixture of two or more kinds. Among them, alcohol, ketone, and ether are desirable, and especially, methanol, ethanol, propanol, isopropanol, octanol, dodecanol, ethylene glycol, glycerol, acetone, and tetrahydrofuran are desirable. Further, water-soluble solvents such as methanol, ethanol, propanol, isopropanol, ethylene glycol, glycerol, acetone, and tetrahydrofuran are more preferable. Here, "water soluble" means that the solubility for 100 g of water is 10 g or more.

<<Retardation Adjusting Agent>>

In the cellulose ester film of the present invention, a polarizing plate treatment to provide an optical compensation function may be conducted such that a liquid crystal layer is formed on an optical film by forming an orientation layer so as to combine the retardation of the optical film and that of the liquid crystal layer, or a cellulose ester film may be made to contain a compound for adjusting the retardation besides the compound represented by Formula (B).

As the compound to be added to adjust the retardation, an aromatic compound including two or more aromatic rings disclosed in the specification of the European patent No. 911,656 A2 may be used or two or more kinds of aromatic compound may be used. Examples of the aromatic rings of the aromatic compound include aromatic hetero rings in addition to aromatic hydrocarbon rings. The aromatic hetero rings may be more preferable, and the aromatic hetero rings are generally unsaturated hetero rings. Specifically, compounds having 1,3,5-triazine ring are desirable.

(Matting Agents)

In order to provide a lubricant property to the cellulose ester film of the present invention, particles such as a matting agent may be incorporated. Listed as such matting agents are particles of inorganic or organic compounds. The matting agent is preferably as minute as possible. Examples of particles include: inorganic particles such as silicon dioxide, titanium dioxide, aluminum oxide, zirconium oxide, calcium carbonate, kaolin, talc, calcined calcium silicate, hydrated calcium silicate, aluminum silicate, magnesium silicate, or calcium phosphate; and crosslinking polymer particles. Of these, silicon dioxide is preferred due to a resulting decrease in film haze. Particles such as silicon dioxide are often subjected to a surface treatment, and such particles are preferable, since the haze of the film is lowered.

Examples of a preferable organic material for the surface treatment of inorganic particles include: halosilane, alkoxysilane, silazane and siloxane. As the average diameter of the particles increases, lubricant effect is enhanced, while, as the average diameter decreases the transparency of the film increases. The average diameter of the primary particles of the secondary particles is preferably 5-50 nm, but is more preferably 7-14 nm. These particles are preferably employed to form unevenness of 0.01-1.0 µm on the surface of the film. The content of the particles in the cellulose ester film is preferably 0.005-0.3% by mass based on the mass of cellulose ester.

Examples of silicon dioxide particles include AEROSIL 200, 200V, 300, R972, R972V, R974, R202, R812, OX50, TT600, produced by Nihon Aerosil Co., Ltd. Of these, preferred are AEROSIL 200V, R972, R972V, R974, R202 and R812. Two or more kinds of particles may be used in combination. When two or more kinds of particles are used in combination, the mixing ratio may be arbitrary. In this case, particles of different diameters or different materials may be mixed, for example, AEROSIL 200V and R972V may be mixed in the ratio by mass of 0.1:99.9 to 99.9:0.1.

The above matting agent may also be used in other purpose such as to improve a mechanical property of the film.

It is also possible that the above mentioned particles work to improve the orientation of cellulose ester itself in the cellulose ester film of the present invention, (Polymer Material)

Polymer materials and oligomers other than cellulose ester may be suitably selected and mixed in the optical film of the present invention. The abovementioned polymer materials and oligomers preferably have excellent compatibility with cellulose ester and the transparency when formed as a film is preferably 80% or more, more preferably 90% or more and still more preferably 92% or more. The purpose of mixing at least one of polymer material and oligomer other than cellulose ester is to regulate viscosity during heat melting and to improve the physical properties of the film after film processing. In this case, the polymer material is included as one of the abovementioned other additives.

<Film Formation of Cellulose Ester Film by Melt-Casting Method>

(Manufacturing Method of the Mold Pellet and its Size)

To obtain the cellulose ester film of the present invention by the melt-casting method, it is preferred to prepare a molded pellet of cellulose ester and additive in advance. In one of the methods for preparing the molded pellet, a composition is melt-extruded by a twin screw extruder at a temperature equal to or greater than the glass transition temperature of the cellulose ester without exceeding the melting point plus 30 melting points, thereby obtaining a rod-like strand, which is trimmed to desired dimensions.

The cellulose ester is seriously deteriorated by heat, and therefore, it is preferred to use a method of molding at a temperature wherein deterioration does not occur.

To ensure the advantages of the present invention, the dimensions of the molded product obtained from a mixture of the cellulose ester and organic additive are preferably kept within a cube of 1 mm×1 mm×1 mm through 20 mm×20 mm×20 mm. If the dimensions are smaller than 1 mm×1 mm×1 mm in the melt extrusion method, blocking will occur at the time of charging the molding and a stable supply cannot be ensured. If the dimensions are greater than 20 mm×20 mm×20 mm, the melting and pulverization of the molding will deteriorate. This will cause blocking at the material inlet and will seriously reduce the productivity. If the dimensions are smaller than 1 mm×1 mm×1 mm, the specific surface area will increase, and the area of contact with air (especially with oxygen and water) will increase. This may lead to deterioration of cellulose, and reduction in molecular weight and mechanical strength. In the pressure/heat melting method, if the dimensions are greater than 20 mm×20 mm×20 mm, a film of small thickness (100 µm or less) cannot be obtained, and film thickness tends to be uneven (poorer precision in film thickness will result). When a molding is formed, a close contact between the resin and additive will occur, with the result that mixing and dispersion properties will increase. Further, there is a reduction in the area in contact with air (especially oxygen and water). This is effective in protecting against deterioration of cellulose ester.

For example, the mixture of the cellulose ester and additive used of the present invention is dried by hot air or under vacuum. After that, these materials are melt-extruded, and are formed in a film using a T-die. They are brought in close contact with a cooling drum by electrostatic impression method to cool and solidify the film, whereby an unstretched film is obtained.

The cellulose ester of the present invention and the additive thereof are preferably powder having a diameter of about 0.1 through 20 mm or pellets. Depending on the material, much water is contained, and drying is essential in some cases. Drying may be performed independently or a mixture of a plurality of materials may be dried. In some cases, the cellulose ester produces acids when heated. Decomposition and deterioration are encouraged by such acids. To prevent acid formation, it is preferably dried at about 60 through 90° C. To increase the level of drying to be reached, dried air of a low dew point is preferably used for drying, or drying is preferably performed under reduced pressure or vacuum. The dew point is preferably not higher than −20° C. and more preferably not higher than −30° C. Depending on the type of additive, the melting point is low. When drying is performed after mixing, to prevent agglutination and solidification during the process of drying, drying must be done below the melting point of the substance whose melting point is the lowest of other materials being used. Needless to say, materials can be mixed after having been dried independently. However, to avoid possible moisture absorption during the step of mixing, the step of drying after mixing is preferred.

The materials having been dried are immediately fed to the extruder. Alternatively, to avoid possible moisture absorption, they are stored in a stock tank kept at a high temperature and a low dew point, or kept at a reduced pressure, and are then fed to the extruder.

The material as a film loss resulting from slitting after film formation or a failure to get a film product after winding can be collected and recycled for use. The collected film is normally pulverized and supplied for reuse, or can also be formed into pellets, which are then supplied for reuse. The collected film must also be dried. In this case, it can be dried independently, or can be dried after having been mixed with virgin polymer materials. It can also be dried after having been mixed with an additive.

Melt extrusion is provided by a single screw extruder, a twin screw extruder or a tandem extruder wherein two extruders are connected in series. In the present invention, the tandem extruder wherein two extruders are connected in series is preferably used.

A die can be installed on the downstream side of the extruder to produce a film by direct extrusion. Alternatively, a strand die is installed so that the material is formed into pellets, which are then extruded to produce a film.

Further, the contents of the material tank, material inlet and extruder in the process of material supply and melting are preferably by inert gas such as nitrogen gas, or the pressure thereof is preferably reduced. In the present invention, a twin screw extruder characterized by excellent mixing performances is used to mix the cellulose ester with a plurality of additives. After the material is formed into pellets, a single screw extruder characterized by superb quantification performance is used to perform melt extrusion, whereby a film is produced.

What should be noted in manufacturing a film is to use the heating and melting method which requires the minimum possible mechanical stress. The existing apparatus used for this purpose is exemplified by a single screw extruder and a hot press. In the case of a single screw extruder, extrusion should be made in a short tame at the temperature wherein a transparent film can be provided. In the area from the material inlet to the dies, the temperature is preferably set to the glass transition temperature of the cellulose ester: Tg through melting point: Tm+50° C. As one comes close to the dies, the temperature is preferably increased stepwise. The die temperature is preferably set to Tm through Tm+30° C.

The residence time (extrusion time) should be as short as possible. It is preferably 20 through 360 seconds, more preferably 20 through 60 seconds. If the residence time is longer, serious deterioration may occur. If it is shorter, insufficient melting may result. The residence time is adjusted with reference to the shaft rotation speed, viscoelastic properties of the molded product, and heating temperature.

The temperature at the time of melt-extrusion in the present invention is preferably 150 through 300° C., more preferably 200 through 280° C.

A gear pump and filter are preferably arranged on the downstream side of the extruder. The gear pump conveys the molten resin on a quantitative basis and can be preferably used to ensure uniform thickness of the film to be wound. A filter is preferably installed immediately before the gear pump in order to protect the gear pump. A two-gear pump, three-gear pump and others are available as the gear pump. Use of a three-gear pump having excellent quantitative properties is preferred. A main filter is installed on the downstream side of the gear pump. The main filter reduces the amount of foreign substances in the film product and improves the product quality.

T-dies are preferably utilized. A lip clearance adjusting mechanism such as a push-pull bolt, lip heater and heat bolt are provided to adjust the uniform film thickness. To prevent the lip from being easily damaged, it is preferred to apply a process of plating or extra-hardening by diamond-like carbon, etc. The film can be discharged in either the lateral or longitudinal direction. It is possible to use the method of discharging the film to the position off to the lower side in conformity to the winding roll.

The molten film having been discharged can be wound in close contact with the cooling drum by electrostatic application method or can be wound by being sandwiched between two rolls. These two methods can be preferably utilized. The temperature of the cooling drum is preferably kept at Tg−100 of the cellulose ester through Tg. A step is preferably taken to absorb the atmosphere around the cooling drum or winding roll from the die outlet. This is intended to ensure that polymer decomposition products and additives such as a plasticizer will not be deposited on the die lip and roll after being volatilized from the melt-extruded film. An absorption device is installed preferably at the position immediately after the resin is discharged from the die lip. The surrounding area is preferably enclosed to improve the effect of removing the volatile gas. When the surrounding area is enclosed and the volatile gas is absorbed, the air is sucked from the surrounding area through a gap, whereby the resin film discharged from the die lip may fluctuate to produce a film of uneven thickness. Accordingly, the same amount of fresh air as that of the sucked air is preferably supplied into the surrounded area. If the temperature of the air supplied has fluctuated, a change will occur to the resin film temperature and uneven film thickness will result. Accordingly, the temperature is preferably controlled to a constant level. Even if such measures have been taken, contamination of the roll due to the volatile gas from the molten film cannot be eliminated completely. Accordingly, the winding roll and cooling drum are preferably provided with a cleaning apparatus. The cleaning apparatus is available in two types. One is the apparatus that operates throughout the film formation process, and the other is the apparatus that operates on a periodic basis by interrupting the film forming operation. Any of these types can be employed.

The cellulose ester film of the present invention which can be used as a polarizer protective film is preferably a film formed by stretching in the lateral direction or in the direction of film production.

The unstretched film separated from the aforementioned cooling drum is heated to the glass transition temperature (Tg) of the cellulose ester through Tg+100° C. by means of a group of rolls and/or a heating apparatus such, as a infrared heater, and is preferably subjected to single stage or multi-stage longitudinal stretching. The ratio of stretching is selected within the range from 5 through 200% so as to meet the retardation required of the product.

The cellulose ester film obtained in the aforementioned procedure and stretched in the longitudinal direction is subjected to lateral stretching from 5 through 200% within the temperature range from Tg−20° ca through Tg+20° C., and is preferably subjected to thermal setting.

In the case of lateral stretching, the film is stretched laterally in the area of stretching divided into two or more portions with the difference in temperature kept at through 50° C.

while the temperature is raised. This preferably reduces distribution of the physical properties across the width. Further, after stretching in the Lateral direction, the film is left to stand at Tg−40° C. or more without exceeding the temperature in the final lateral stretching for 0.01 through 5 minutes. This more preferably reduces distribution of the physical properties across the width. There is no particular restriction, to the order of stretching. Longitudinal stretching can be followed by the lateral stretching, or lateral retching can be followed by the longitudinal stretching.

Simultaneous biaxial stretching can also be preferably applied. In the sequential stretching, the film tends to break during the process of stretching in the second stage. The simultaneous biaxial stretching has an advantage in that the film tends not to break and uniform stretching in the longitudinal and lateral directions can be carried out.

Thermal setting is achieved normally in 0.5 through 300 seconds at a temperature not higher than Tg+50° C. while higher than the temperature for the final lateral stretching. In this case, thermal setting is preferably carried out in the area divided into two or more portions, with the difference in temperature kept in the range from 1 through 100° C., while the temperature is gradually increased.

The thermally set film is normally cooled down to a temperature below Tg, and is wound while the clipped portions on both ends of the film are being cut off. In this case, the film is preferably subjected to a process of relaxation from 0.1 through 10% the lateral and/or longitudinal direction at the temperature of Tg−30° C. or more without exceeding the final setting temperature. The film is preferably cooled gradually from the final setting temperature to Tg at a cooling speed of 100° C. or less per second. There is no particular restriction to the means used for cooling and relaxation. Any conventional known means can be utilized. It is preferred in particular that the aforementioned process is applied, with the film being gradually cooled in a plurality of temperature areas because the dimensional stability of the film is improved. The cooling speed is given by (T1−Tg)/t where the final thermal setting temperature is T1, and the time for the film to reach Tg from the final thermal setting temperature is t.

The further optimum conditions for the aforementioned thermal setting conditions and cooling and relaxation conditions differ according to the cellulose esters constituting the film, and should be determined by measuring the physical properties of the stretched film having been obtained and making adjustment to ensure that preferred properties will be gained.

The clipped portions on both ends of the film having being cut off in the film making process are pulverized or granulated as required. After that, they can be reused as the material for the same type of film or as the material for a different type of film.

(Stretching Operation, Refractive Index Control)

When the cellulose ester film is used as a retardation film, it is preferable that the film of the present invention is subjected to a refractive index control employing a stretching operation described below, whereby it is possible to achieve the refractive index in the preferred range by stretching 1.0-2.0 times in one direction of the cast cellulose ester and 1.01-2.5 times in the direction at right angles to it in the interior of the film surface.

For example, it is possible to successively or simultaneously perform stretching in the longitudinal direction and the direction at right angles to it in the interior of the film surface, namely across the width of the film. During the above stretching, when the stretching ratio in one direction is excessively small, it is not possible to achieve sufficient retardation, while when it is excessively large, it becomes difficult to perform stretching, whereby breakage occasionally occurs.

In cases in which stretching is performed in the melt cast direction, when width-wise contraction is excessively large, the refractive index of the film in the thickness direction becomes excessively large. In this case, improvement is achieved by minimizing the width-wise contraction of the film or by performing width-wise stretching. In cases in which width-wise stretching is performed, a distribution of the resulting index occasionally results width-wise. This occasionally occurs in the use of the tenter method. This is phenomenon which is formed in such a manner that by performing width-wise stretching, contraction force is generated in the central portion of the film, while the edge portion is fixed is assumed to be so-called boing phenomenon. Even in this case, it is possible to retard the boing phenomenon by performing the above casting direction stretching and to minimize the width-wise retardation distribution.

Further, by stretching in the biaxial directions, being at right angles to each other, it is possible to decrease the thickness variation of the resulting film. When the thickness variation of an optical film is excessively large, uneven retardation results, and when employed in liquid crystal displays, problems of non-uniformity such as coloration occasionally occur.

It is preferable that the thickness variation of the optical film of the present invention is controlled, in the range of ±3 percent and further ±1 percent. To achieve the above purposes, a method is effective in which stretching is performed in the biaxial directions which are in right angles to each other. It is preferable that stretching ratio in the biaxial directions which are in right angles to each other is finally preferably in the range of 1.0-2.0 times in the cast direction and in the range of 1.01-2.5 times in the width direction and more preferably in the range of 1.01-1.5 times in the cast direction and in the range of 1.05-2.0 times in the width direction.

In the case of lese of cellulose ester resulting in positive birefringence for stress, by performing width-wise stretching, it is possible to provide slow axis of the optical film in the width direction. In this case, in the present invention, in order to enhance listed quality, it is preferable that the slow axis of the optical film is in the width direction and it is necessary that the following condition is satisfied (stretching ratio in the width direction)>(stretching ratio in the cast direction).

The method for stretching the web is not particularly limited. Examples include, a method in which a plurality of rolls are caused to have differing peripheral speeds and stretching is done in the casting direction by utilizing the difference in peripheral speed between the rolls; a method in which both ends of the web are fixed with clips or pins and the spaces between the pins or clips are extended in the forward direction to thereby carry out stretching in both the casting and width directions; a method in which widening in the width direction and stretching in the width direction are performed simultaneously; and a method in which widening in the longitudinal direction and stretching in the width direction are performed simultaneously. As a matter of course, these and other methods may be used in combination. In addition, in the case of the so-called tenter method, smooth stretching can be carried out by driving the clip portion using a linear driving method, and this method is favorable because it reduces the risk of, for example, rupture of the film.

Holding the width or stretching in the width direction in the process of preparing the film is preferably performed by using a tenter, and may be performed by a pin tenter or a clip tenter.

When the cellulose ester film of the present invention is used as a retardation film, the above stretching is conducted such that an in-plane retardation value Ro represented Equation (i) under 23° C., 55% RH for a wavelength of 590 nm is made within a range of 10 to 300 nm, preferably 10 to 100 nm and more preferably 20 to 80 nm, a thickness-wise retardation value represented by Equation (ii) is made within a range of 0 to 400 nm, preferably 80 to 400 nm and more preferably 100 to 250 nm, and a ratio of Rt/Ro is made within a range of 2.0 to 5.0.

$$Ro=(nx-ny)\times d \quad \text{Equation (i)}$$

$$Rt=\{(nx+ny)/2-nz\}\times d \quad \text{Equation (ii)}$$

wherein nx represents a refractive index in a slow axis direction in the cellulose ester film; fly represents a refractive index in a direction perpendicular to the slow axis in the cellulose ester film, and nz represents a refractive index in a film thickness direction; and d represents the thickness (nm) of the film.

The thickness of the cellulose ester film of the present invention is preferably 10-500 μm, specifically 20 μm or more and further 35 μm or more, while specifically 150 μm or less and further 120 μm or less. The thickness is specifically preferably 25-90 μm. When the cellulose ester film is thicker than the above range, the polarizing plate after fabricated becomes too thick, while, when it is thinner than the above range, sufficient retardation becomes difficult to obtain and the moisture permeability becomes too high, resulting in loosing the ability to protect the polarizer against moisture.

Provided that the cellulose ester film of the present invention has a slow axis or a fast axis in the film plane and that the angle thereof between the casting direction of the film is designated as θ1, θ1 is preferably −1° or more and +1° or less, and more preferably −0.5° or more and ±0.5° or less. θ1 is defined as an stretching angle, and can be measured by using an automatic birefringent analyzer KOBRA-21ADH (manufactured by Oji Scientific Instruments). When θ1 meets the above condition, high luminance is obtained as well as suppressing or preventing leakage of light in a display image, and high color reproducibility is obtained in a color liquid crystal display.

(Functional Layer)

When manufacturing the cellulose ester film of the present invention, a functional layer such as antistatic layer, hard coat layer, antireflection layer, lubricant layer, adhesive layer, antiglare layer, barrier layer and optical compensation layer can be coated before and/or after stretching. Specifically, it is preferable that at least one selected from antistatic layer, hard coat layer, antireflection layer, adhesive layer, antiglare layer and optical compensation layer is provided. In this case, various forms of surface treatment such as corona discharging, plasma processing, chemical fluid treatment can be provided if necessary.

<Polarizing Plate>

A producing method of a polarizing plate provided with a cellulose ester film the present invention is not limited specifically, and may be produced by a common method. A polarizer was produced such that a polyvinyl alcohol film or an ethylene modification polyvinyl alcohol film having an ethylene unit in the content of 1 to 4 mol %, a polymerization degree of 2000 to 4000, a saponification degree of 99.0 to 99.99 mol % was dipped in an iodine solution and stretched to obtain the polarizer. The cellulose ester film obtained by the present invention was subjected to an alkali treatment and pasted on both surfaces of the polarizer with a complete saponification polyvinyl-alcohol aqueous solution or pasted on one side of the polarizer directly. On the other surface, another polarizing plate protactive film may be pasted or a commercially available cellulose ester film (for example, Konica Minolta TAC, KC8UX, KC4UX, KC5UX, KC8UCR3, KC8UCR4, KC8UY, KC4UY, KC12UR, KC8UCR-3, KC8UCR-4, KC8UCR-5, KC4UE, KC8UE, KC4FR-1, KC4FR-2, KC8UY-HA, KC8UX-RHA, KC8UX-RHA-N, manufactured by Konica Minolta Opt Inc.) may be used preferably.

Instead of the above alkali treatment, a simple pasting process disclosed in JP-A Nos. 6-94915, and 6-118232 may be performed to produce a polarizing plate.

The polarizing plate is structured with a polarizer and protective films to protect both surface of the polarizer or the polarizing plate is structured by pasting a protective film on one surface of the polarizer and a separate film on the opposite surface. The protective film and the separate film are used to protect the polarizing plate in the time of shipment of the polarizing plate and in the time of product inspection for the polarizing plate. At this time, the protective film is pasted for the purpose of protecting the surface of the polarizing plate such that it is pasted on a surface opposite to a surface to be pasted on a liquid crystal plate. Further, the separate film is used for covering the adhesive layer pasted on the liquid crystal plate and used for the surface to be pasted on the liquid crystal plate. It is also preferable as one of the aspects of the present invention that a cellulose ester film of the present invention having a function of a retardation film is used as a polarizer protective film to be pasted on the liquid crystal cell side surface of the polarizer, and a cellulose ester film of the present invention, on which an antireflection layer is provided, is used as the polarizer protective film to be pasted on the viewer side surface of the polarizer.

(Liquid Crystal Display)

Generally in a liquid crystal display, a base plate including a liquid crystal cell is sandwiched between two polarizing plates. The cellulose ester film of the present invention can provide an excellent display ability even if the cellulose ester film is employed at any position. Specifically, since a clear hard coat layer, an antiglare layer or an antireflection layer is provided on a polarizing plate protective film on the uppermost layer of the display side of the liquid crystal display, the cellulose ester film of the present invention is preferably used at this part.

The cellulose ester film of the present invention and the polarizing plate employing the same are preferably used in LCD's of a reflection type, a transmissive type, a semi-transmissive type or in LCD's of various drive modes such as TN mode, STN mode, OCB mode, HAN mode, VA mode (PVA mode, MVA mode), and IPS mode. Specifically, in a display having a screen of 30 size or more, in particular, a large screen of 30 to 54 size, white defects tend not occur on peripheral sections of the screen, the effect is maintained for a long period of time, and prominent effects are observed in MVA mode liquid crystal display. In particular, the following effects are obtained that color unevenness, glaring and waving irregularities are decreased and eye fatigue after a long period observation is only limited.

EXAMPLES

Referring to Examples, the following specifically describes the present invention, however, the present invention is not limited thereto.

(Materials Used)

<Cellulose Ester>

C-1. Cellulose acetate propionate: acetyl substitution degree of 1.8, propionyl substitution degree of 0.9 and falling ball viscosity of 20 sec.

C-2. Cellulose acetate propionate: acetyl substitution degree of 1.6, propionyl substitution degree of 1.1 and falling ball viscosity of 20 sec.

C-3. Cellulose acetate propionate: acetyl substitution degree of 1.1, propionyl substitution degree of 1.6 and falling ball viscosity of 20 sec.

C-4. Cellulose acetate propionate: acetyl substitution degree of 1.2, propionyl substitution degree of 1.6 and falling ball viscosity of 20 sec.

C-5. Cellulose acetate propionate: acetyl substitution degree of 1.2, propionyl substitution degree of 1.6 and falling ball viscosity of 10 sec.

C-6. Cellulose acetate propionate: acetyl substitution degree of 0.9, propionyl substitution degree of 1.8 and falling ball viscosity of 20 sec.

The falling ball viscosity of the cellulose ester was measured using the falling ball Type C (of Eiko Seiki Co., Ltd.) according to ASTM D1343.

<Plasticizer>

PL-1. Trimethylol propane tribenzoate

PL-2. Pentaerithritol tetrabenzoate

<Compound 1:Compound Expressed by Formula (A)>

AP-1 through AP-2: Comparative compounds given below

AP-3 through AP-4: Compounds of the present invention given below

AP-5: Sumirizer GM (Sumitomo Chemical Co., Ltd.)

AP-6: Sumirizer GS (Sumitomo Chemical Co., Ltd.)

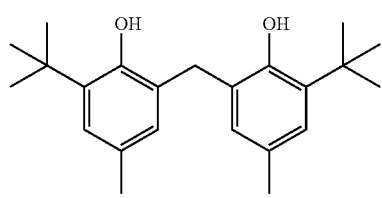

AP-1

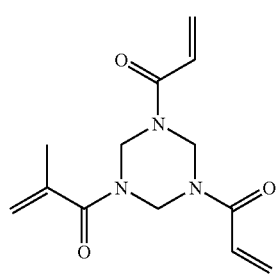

AP-2

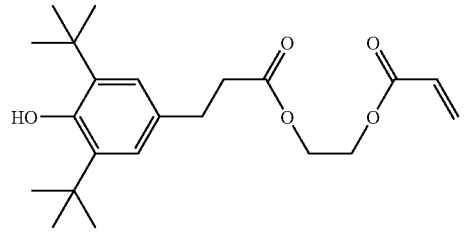

AP-3

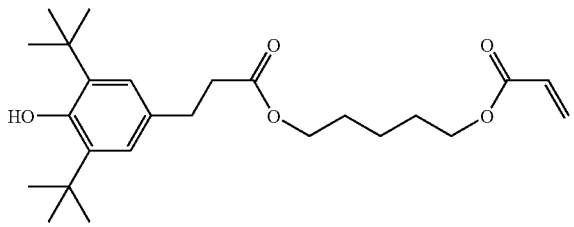

AP-4

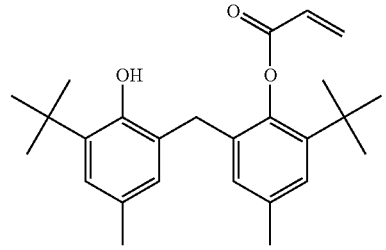

Sumilizer GM

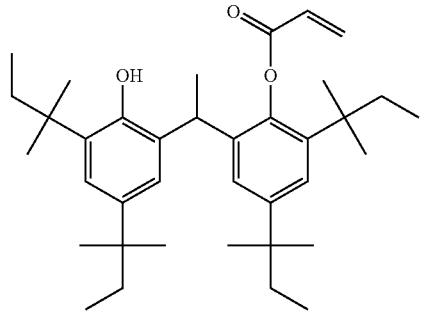

Sumilizer GS

<Compound 2: Compound Expressed by Formula (B)>

The rod-like compounds that can be expressed by Formula (B) are shown by the examples (12), (20), (23), (37), (39), (45) and (46).

<Other Additive: Antioxidant>

HP-1. IRGANOX-101 (pentaerithritol tetrakis[3-(3,5-di-t-butyl-4-hydroxy phenyl) propionate], Ciba Specialty Chemicals K.K)

Example 1

Manufacturing the Cellulose Ester Film 1

The Cellulose ester C-1 was dried in air under atmospheric pressure at 130° C. for two hours and was cooled down to the room temperature. The plasticizer and compounds 1 and 2 shown in Table 1 in the mass parts shown in Table 1 were added to 100 parts by mass of this cellulose ester. This mixture was heat-melted at the melt temperature of 240° C. and extruded from a T-type die to cast a film, followed by stretching at a stretching ratio of 1.2×1.2 in the longitudinal and lateral directions at 160° C. Thus, cellulose ester film 1 having a film thickness of 80 μm was obtained.

[Production of Cellulose Ester Films 2 Through 23]

Cellulose ester films 2 through 23 having a film thickness of 80 μm were obtained according to the same procedure as that of cellulose ester film 1, except that the cellulose ester, plasticizer, compounds 1 and 2 and other additives were changed as shown in Table 1.

[Evaluation of Cellulose Ester Film]

[Coloring]

Tristimulus values X, Y and Z were measured by transmission measurement according to the JIS K-7105 6.3 using a spectrophotometer (Hitachi spectrophotometer U-3310), and YI was calculated from the following mathematical expression (1). The lower the values, the better the coloring.

$$YI = \{(1.28X - 1.06Z)/Y\} \times 100 \quad \text{Mathematical expression (1):}$$

[Retardation Re Fluctuation]

Retardation was measured at an interval of 1 cm across the width of the obtained cellulose ester film sample and the resultant measurement is expressed by the fluctuation coefficient (CV) of the retardation expressed by the following formula. The measurement was made at 23° C. with a relative humidity of 55% RH at a wavelength of 590 nm using an automatic double refractometer KOBPA-21AD1H (produced by Oji Scientific Instruments). The retardation Re fluctuation indicates the fluctuation coefficient of the in-plane retardation value Ro expressed by the following formula:

In-plane retardation value $Ro = (nx - ny) \times d$ Retardation value in the thickness direction $Rt = ((nx + ny)/2 - nz) \times d$ wherein d represents a film thickness (nm), "nx" shows the refractive index (the maximum refractive index in the plane of the film, also called, the refractive index in the direction of the slow axis), "ny" the refractive index (refractive index in the direction perpendicular to the slow axis in the plane of the film), and "nz" the refractive index (refractive index of the film in the thickness direction.). The retardation value in the plane and in the thickness direction were obtained from the standard deviation according to the (n−1) method. The retardation distribution was obtained according to the fluctuation coefficient (CV) shown below. In the actual measurement, "n" was set at 140. The smaller the fluctuation coefficient, the better the result.

Fluctuation coefficient($CV$)=standard deviation/average retardation value

[Haze]

The haze was measured by a haze meter (Model 1001DP of Nippon Denshoiku Co., Ltd.).

[Bright Foreign Defects (Bright Spots Due to Foreign Substances)]

Two polarizing plates were arranged in the crossed state (crossed-Nicols) to cut off the transmitted light, and each sample was placed between two polarizing pate. The protective plates of glass were used as the polarizing plates. Light was applied from one side, and bright spots having a diameter of 0.01 mm or more per $cm^2$ were counted using an optical microscope (having 50 magnifications) from the opposite side. In the evaluation, A was assigned when the number of bright spots was 0 through 30, B when the number of bright spots was 31 through 50, C when the number of bright spots was 51 through 80, D when the number of bright spots was 81 through 100, and E when the number of bright spots was 101 or more.

TABLE 1

| * | Cellulose ester | Plasticizer Type | Plasticizer Amount added (parts by mass) | Compound 1 Type | Compound 1 Amount added (parts by mass) | Compound 2 Type | Compound 2 Amount added (parts by mass) | Other additive Type | Other additive Amount added (parts by mass) | Coloring | Re fluctuation (%) | Haze (%) | Bright foreign defect | Remarks |
|---|---|---|---|---|---|---|---|---|---|---|---|---|---|---|
| 1 | C-1 | PL-1 | 8 | — | — | — | — | — | — | 2.7 | 26 | 1.2 | E | *a |
| 2 | C-1 | PL-1 | 8 | AP-1 | 0.5 | — | — | — | — | 1.9 | 19 | 1.2 | D | *a |
| 3 | C-1 | PL-1 | 8 | AP-2 | 0.5 | — | — | — | — | 2.9 | 24 | 1.2 | D | *a |
| 4 | C-1 | PL-1 | 8 | AP-1 | 0.5 | AP-2 | 0.5 | — | — | 2 | 19 | 1.4 | D | *a |
| 5 | C-1 | PL-1 | 8 | AP-3 | 0.5 | — | — | — | — | 1.4 | 10 | 1 | B | *b |
| 6 | C-1 | PL-1 | 8 | AP-4 | 0.5 | — | — | — | — | 1.2 | 11 | 0.9 | B | *b |
| 7 | C-1 | PL-1 | 8 | AP-5 | 0.5 | — | — | — | — | 1.4 | 11 | 0.8 | B | *b |
| 8 | C-1 | PL-1 | 8 | AP-6 | 0.5 | — | — | — | — | 0.8 | 6 | 0.7 | B | *b |
| 9 | C-1 | PL-1 | 8 | AP-6 | 0.5 | — | — | HP-1 | 0.5 | 0.8 | 7 | 0.6 | B | *b |
| 10 | C-1 | PL-2 | 8 | AP-6 | 0.5 | — | — | HP-1 | 0.5 | 0.7 | 7 | 0.6 | B | *b |
| 11 | C-1 | PL-2 | 5 | AP-6 | 0.5 | (39) | 5 | HP-1 | 0.5 | 0.7 | 3 | 0.4 | B | *b |
| 12 | C-1 | PL-2 | 5 | AP-6 | 0.5 | (46) | 5 | HP-1 | 0.5 | 0.7 | 5 | 0.5 | B | *b |
| 13 | C-1 | PL-2 | 5 | AP-6 | 0.5 | (23) | 5 | HP-1 | 0.5 | 0.7 | 5 | 0.4 | B | *b |
| 14 | C-1 | PL-2 | 5 | AP-6 | 0.5 | (37) | 5 | HP-1 | 0.5 | 0.7 | 4 | 0.4 | B | *b |
| 15 | C-1 | PL-2 | 5 | AP-6 | 0.5 | (12) | 5 | HP-1 | 0.5 | 0.7 | 5 | 0.5 | B | *b |
| 16 | C-1 | PL-2 | 5 | AP-6 | 0.5 | (45) | 5 | HP-1 | 0.5 | 0.7 | 4 | 0.5 | B | *b |
| 17 | C-1 | PL-2 | 5 | AP-6 | 0.5 | (20) | 5 | HP-1 | 0.5 | 0.7 | 5 | 0.4 | B | *b |
| 18 | C-2 | PL-2 | 5 | AP-6 | 0.5 | (20) | 5 | HP-1 | 0.5 | 0.8 | 5 | 0.3 | A | *b |
| 19 | C-3 | PL-2 | 5 | AP-6 | 0.5 | (20) | 5 | HP-1 | 0.5 | 0.8 | 4 | 0.3 | A | *b |
| 20 | C-4 | PL-2 | 5 | AP-6 | 0.5 | (20) | 5 | HP-1 | 0.5 | 0.8 | 5 | 0.3 | A | *b |
| 21 | C-5 | PL-2 | 5 | AP-6 | 0.5 | (20) | 5 | HP-1 | 0.5 | 1.1 | 4 | 0.5 | A | *b |
| 22 | C-6 | PL-2 | 5 | AP-6 | 0.5 | (20) | 5 | HP-1 | 0.5 | 1 | 4 | 0.5 | A | *b |
| 23 | C-1 | PL-2 | 5 | — | — | (20) | 5 | HP-1 | 0.5 | 1.7 | 22 | 1.2 | D | *a |

\* Cellulose ester film number
\*a Comparative example
\*b Present invention

Table 1 demonstrates that cellulose ester films 5 through 22 of the present invention provides excellent performances with respect to coloring, retardation Re fluctuation, haze, bright foreign defects.

Example 2

Manufacturing the Polarizing Plate

Cellulose ester film 1 for comparison manufactured in Example 1 and cellulose ester film 18 of the present invention were used to manufacture a polarizing plate according to the aforementioned procedure.

(Forming the Hard Coated Layer)

The coating liquid for the following hard coated layer was filtered by a polypropylene filter having a pore diameter of 0.4 μm and a hard coated layer coating solution was prepared. This liquid was applied on the aforementioned cellulose ester film by a microgravure coater. After having been dried at 90° C., the coated layer was cured at a dose of 0.1 J/cm² using an ultraviolet lamp wherein the intensity of illumination at the irradiation section was 100 mW/cm². Thus, a hard coated layer having a dry film thickness of 7 μm was formed, and a hard coated film was produced.

(Hard Coated Layer Coating Solution)

The hard coated layer coating solution was prepared by stirring and mixing the following materials:

| | |
|---|---|
| Acryl monomer: KAYARAD DPHA (dipentaerithritol hexaacrylate of Nippon Kayaku Co.) | 220 parts by mass |
| Irgacure 184 (Ciba Specialty Chemicals K.K) | 20 parts by mass |
| Propylene glycol monomethyl ether | 110 parts by mass |
| Ethyl acetate | 110 parts by mass |

<Manufacturing the Polarizing Plate Protective Film with Antireflective Layer>

Antireflective layers were formed on the hard coated film prepared according to the aforementioned procedure sequentially in the order of a layer of high refractive index layer and layer of low refractive index layer, as shown below. Thus, cellulose ester films (antireflective films) 1 and 18 with antireflective layers were formed.

(Forming the Antireflective Layer: High Refractive index Layer)

The following high refractive index layer coating composition was extruded onto the hard coated film and was coated by a coater. After having been dried at 80° C. for one minute, the film was cured by applying the ultraviolet ray of 0.1 J/cm². It was further heated and cured at 100° C. for one minute, whereby a high refractive index layer with a thickness of 78 nm was produced.

The refractive index of this high refractive index layer was 1.62.

(High Refractive Index Layer Coating Composition)

| | |
|---|---|
| Metallic oxide particles isopropyl alcohol solution (solid of 20%, ITO particles with a diameter of 5 nm) | 55 parts by mass |
| Metal compound: Ti(OBu)₄ (tetra-n-butoxy titanium) | 1.3 parts by mass |
| Ionizing radiation curable resin: dipentaerithritol hexaacrylate | 3.2 parts by mass |
| Photo-polymerization initiator: Irgacure 184 (Ciba Specialty Chemicals Inc.) | 0.8 part by mass |
| Solution containing 10% propylene glycol monomethyl ether of straight chain dimethyl silicone-EO block copolymer (FZ-2207 of Nippon Yunika Co., Ltd.) | 1.5 parts by mass |
| Propylene glycol monomethyl ether | 120 parts by mass |
| Isopropyl alcohol | 240 parts by mass |
| Methyl ethyl ketone | 40 parts by mass |

(Forming the Antireflective Layer Low Refractive Index Layer)

The following low refractive index layer coating composition was extruded and applied onto the aforementioned high refractive index layer by the coater. After having been dried at 100° C. for one minute, it was cured by exposure to an ultraviolet lamp of 0.1 J/cm² and was wound on a heat resistant plastic core to a length of 4000 m. Then it was heat-treated at 80° C. for three days, whereby antireflective films 1 and 18 were produced.

This low refractive index layer had a thickness 95 nm and a refractive index of 1.37.

(Preparing the Low Refractive Index Layer Coating Composition)

<Preparing the Tetraethoxysilane Hydrolysate A>

289 q of tetraethoxysilane and 553 g of ethanol were mixed, and 157 g of aqueous solution containing 0.15% of acetic acid was added to this mixture. This was stirred for 30 hours in a water bath having a temperature of 25° C., whereby hydrolysate A was prepared.

| | |
|---|---|
| Tetraethoxysilane hydrolysate A | 110 parts by mass |
| Hollow silica particles (the following P-2) dispersion | 30 parts by mass |
| KBM503 (silane coupling agent of Shin-Etsu Chemical Co. Ltd.) | 4 parts by mass |
| Straight chain dimethyl silicone-EO block copolymer (FZ-2207 of Nippon Yunika Co., Ltd.) | 3 parts by mass |
| Propylene glycol monomethyl ether | 400 parts by mass |
| Isopropyl alcohol | 400 parts by mass |

<Preparing the Hollow Silica Particle (P-2) Dispersion>

One hundred g of silica sol having an average particle diameter of 5 nm and having a SiO₂ concentration of 20% by mass was mixed with 1900 g of pure water, and this mixture was heated at 80° C. This mother liquid for reaction had a pH value of 10.5. Then 9000 g of aqueous solution containing 0.98% by mass of sodium silicate as SiO₂ and 9000 g of aqueous solution containing 1.02% by mass of sodium aluminate for Al₂O₃ were added simultaneously to this solution. During this time, reaction solution was kept at 80° C. Immediately after addition, the pH value of the reaction solution rose to 12.5, which exhibits almost no change thereafter. After termination of addition, the reaction solution was cooled down to the room temperature and was washed by an ultra-filter, whereby SiO₂/Al₂O₃ nuclear particles dispersion having a solid concentration of 20% by mass was prepared (Step (a)).

1700 g of pure water was added to 500 g of this nuclear particles dispersion 500 FT and was heated to 98° C. With this temperature kept unchanged, 3000 g of silica solution (SiO₂ concentration: 3.5% by mass) obtained by dealkalization of the aqueous solution of sodium silicate with a positive ion exchange resin was added to this solution. This procedure yielded d dispersion of the nuclear particles forming the first silica coating layer (Step (b)).

Then 1125 g of pure water was added to 500 g of the nuclear particle dispersion forming the first silica coating layer which was washed by the ultrafilter to have a solid concentration of 13% by mass. Further, a concentrated hydrochloric acid (35.5%) was dropped to get a pH value of 1.0, and the solution was doaluminized. Then 10 L of aqueous solution containing hydrochloric acid having a pH value of 3 and 5 L of pure water were added, and the dissolved aluminum salt was separated by an ultrafilter, thereby preparing the dispersion of $SiO_2$—$Al_2O_3$ porous particles (Step (c)) from which part of the components of the nuclear particles forming the first silica coating layer was removed. A mixture of 1500 g of the aforementioned porous particles dispersion, 500 g of pure water, 1750 g of ethanol and 626 g of 28% ammonium water was heated to 35° C., and was then mixed with 104 g of ethyl silicate ($SiO_2$ 28% by mass). The surface of the porous particles forming the first silica coating layer was coated with the polycondensated hydrolysate of ethyl silicate, whereby a second silica coating layer was formed. Then the solvent was replaced by ethanol using an ultrafilter to produce a dispersion of hollow silica particles (P-2) having a solid concentration of 20% by mass.

The first silica coating layer of this hollow silica particles had a thickness of 3 μm, the average particle diameter of 47 nm, $MOx/SiO_2$ (mole ratio) of 0.0017, and the refractive index of 1.28. The average particle diameter was measured according to the dynamic light scattering method.

Then a polyvinyl alcohol film having a thickness of 120 μm was uniaxially stretched (at a temperature 110° C. with a stretching ratio of 500%). This film was immersed for 60 seconds in an aqueous solution containing 0.075 g of iodine, 5 g of potassium iodide and 100 g of water, and was then immersed in an aqueous solution containing 6 g of potassium iodide, 7.5 of boric acid and 100 g of water at a temperature of 68° C. This was washed by water and dried to obtain a polarizer film.

Then according to the following Steps 1 through 5, a polarizer film, the aforementioned antireflective films 1 and 18 and the cellulose ester film on the rear side were laminated together to produce a polarizing plate. When manufacturing the cellulose ester films 1 and 18 of Example 1, the polarizing plate protective film on the rear side was stretched in a stretching ratio of 1.1 along the longitudinal direction of the film, and was then stretched in a stretching ratio of 1.3 in the width direction using a tenter. Except for this, the same procedure was utilized to produce cellulose ester films 1' and 18'. A combination of 1' with 1 and a combination of 18' with 18, respectively, were used as polarizing plate protective films on the front and rear sides. The cellulose ester films 1' and 18' had retardation values of Ro=45 nm and Rt=140 nm.

Step 1: A cellulose ester film sample was immersed in a 2 mol/L solution of sodium hydroxide at 60° C. for 90 seconds. The film was then washed by water and dried to form a cellulose ester film for the rear side of the aforementioned antireflective film, wherein the side to be adhered with a polarizer was saponified.

Step 2. The aforementioned polarizer film was immersed in a tank of polyvinyl alcohol adhesive with a solid content of 2% by mass for 1 through 2 seconds.

Step 3: The excessive adhesive deposited on the polarizer film in Step 2 was gently wiped off and was laminated on the antireflective film and cellulose ester film processed on Step 1.

Step 4: The antireflective film, polarizer film and cellulose ester film laminated in Step 3 were adhered at a pressure of 20 through 30 N/cm² with a conveyance speed of about 2 m/minute.

Step 5: The sample bonded with the antireflective film, polarizer film and cellulose ester film produced in Step 4 was dried in a drier of a temperature of 80° C. for two minutes to produce polarizing plates 1 and 18.

<<Manufacturing the Liquid Crystal Display Apparatus>>

A liquid crystal panel for measuring the viewing angle was manufactured according to the following procedure, and the characteristics as a liquid crystal display apparatus were evaluated.

The polarizing plate on the display side bonded with Model 15 display VL-150SD of Fujitsu Ltd. in advance was peeled, and the polarizing plate manufactured in the above procedure was adhered on the glass surfaced of the liquid crystal cell.

In this case, the direction of laminating the polarizing plate was determined in such a way that the surface of the aforementioned antireflective film is on the display side of the liquid crystal cell, and that the absorbing axis lies in the same direction as that of the polarizing plate laminated in advance. Thus, the liquid crystal display apparatuses 1 and 18 were manufactured.

As compared with the comparative example 1, polarizing plate 0.18 and liquid crystal display is of the present invention employing antireflective film 18 and cellulose ester film 18' for the rear side were found to exhibit excellent antireflection characteristics free from coloration of the film and uneven reflection color resulting from retardation unevenness, as well as an excellent visibility with an enlarged viewing angle.

POSSIBILITY FOR INDUSTRIAL USE

According to the present invention, the burden for production and facility due to drying and recovering the solvent can be reduced, and a cellulose ester film exhibiting: optical properties free from a fluctuation in a retardation vale, coloration of the film, haze and bright foreign defects; a method of producing the cellulose ester film; and a polarizing plate and a liquid crystal display using the same can be obtained.

What is claimed is:

1. A cellulose ester film comprising: a cellulose ester; a compound containing an acrylate group or a methacrylate group, and a phenolic hydroxyl group, in the molecule, represented by Formula (A):

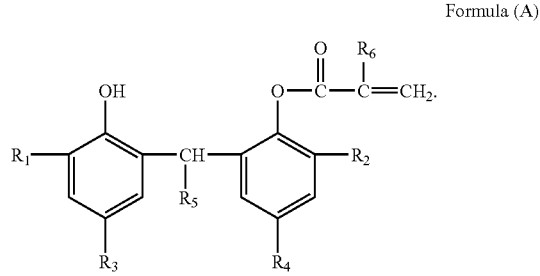

Formula (A)

wherein $R_1$ through $R_5$ each represent a hydrogen atom or an alkyl group containing 1 through 10 carbon atoms, $R_1$ through $R_5$ may be the same or different from each other, and $R_6$ represents a hydrogen atom or a methyl group; and a compound represented by Formula (C):

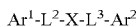 Formula (C)

wherein

Ar$^1$ and Ar$^2$ are each independently an aromatic group,
L$^2$ and L$^3$ are each independently a divalent linkage group selected from the group of an alkylene group, an —O— atom, a —CO— group and a combination thereof, and
X is a 1,4-cyclohexylene group, a vinylene group or an ethynylene group.

2. The cellulose film of claim 1, wherein the compound represented by Formula (A) is Compound S:

Compound S

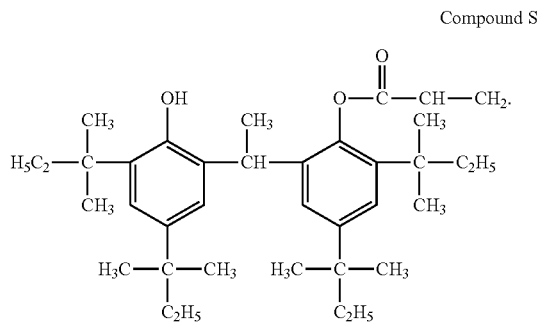

3. The cellulose ester film of claim 1 further comprising a compound represented by Formula (p):

Formula (p)

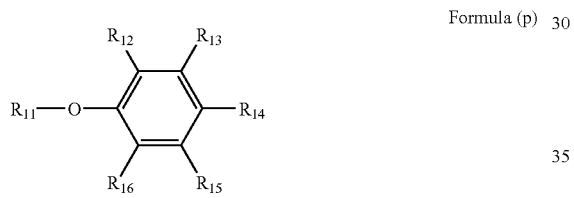

wherein $R_{11}$, $R_{12}$, $R_{13}$, $R_{14}$, $R_{15}$, and $R_{16}$ each represent a substituent, provided that the compound containing an acrylate group or a methacrylate group, and a phenolic hydroxyl group, in the molecule is not included in the compound represented by Formula (p).

4. The cellulose ester film of claim 3, wherein the compound represented by Formula (p) is pentaerythritoltetrakis [3-(3,5-di-t-butyl-4-hydroxyphenyl) propionate].

5. The cellulose ester film of claim 1 further comprising a polyalcohol ester.

6. The cellulose ester film of claim 1, wherein the cellulose ester film is a cellulose acetate propionate film having:
an acetyl substitution degree of 0.9 to 1.6; and
a propionyl substitution of 1.1 to 1.8.

7. The cellulose ester film of claim 1, wherein the cellulose ester film exhibits:
an in-plane retardation value Ro of 10 to 100 nm, Ro being represented by Equation (i);
a retardation value in a thickness direction Rt of 80 to 400 nm, Rt being represented by Equation (ii); and
an Rt/Ro value of 2.0 to 5.0,
wherein Ro and Rt being measured at a wavelength of 590 nm, under a condition of 23 ° C. and 55% RH:

$Ro=(nx-ny)\times d$     Equation (i)

$Rt=\{(nx+ny)/2-nz\}\times d$     Equation (ii)

wherein nx represents a refractive index in a slow axis direction of the cellulose ester film; ny represents a refractive index in a direction perpendicular to the slow axis in a plane of the cellulose ester film, and nz represents a refractive index in a thickness direction of the cellulose ester film; and d represents a thickness (nm) of the cellulose ester film.

8. A polarizing plate comprising:
a polarizer;
the cellulose ester film of claim 7 provided on one surface of the polarizer; and
a cellulose ester film comprising a compound containing an acrylate group or a methacrylate group, and a phenolic hydroxyl group, in the molecule provided on the other surface of the polarizer.

9. The cellulose ester film of claim 1 having an antireflection layer.

10. A polarizing plate comprising a polarizer and the cellulose ester film of claim 1 provided on one surface of the polarizer.

11. A liquid crystal display employing the polarizing plate of claim 10.

12. A liquid crystal display employing the cellulose ester film of claim 1.

13. A method of producing a cellulose ester film comprising the steps of:
melting a cellulose ester,
a compound containing an acrylate group or a methacrylate group, and a phenolic hydroxyl group, in the molecule, represented by Formula (A):

Formula (A)

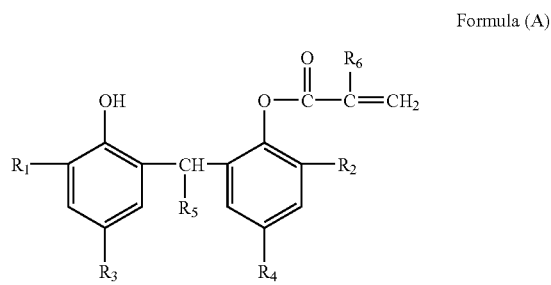

wherein $R_1$ through $R_5$ each represent a hydrogen atoms containing 1 through 10 carbon atoms, $R_1$ through $R_5$ may be the same or different from each other, and $R_6$ represents a hydrogen atom or a methyl group, and a compound represented by Formula (C):

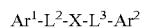 Formula (C)

wherein

Ar$^1$ and Ar$^2$ are each independently an aromatic group,
L$^2$ and L$^3$ are each independently a divalent linkage group selected from the group of an alkylene group, an —O— atom, a —CO— group and a combination thereof, and
X is a 1,4-cyclohexylene group, a vinylene group or an ethynylene group,
to form a melt;
extruding the melt in a film form from a casting die;
cooling the melt extruded from the die on a support for cooling to form a cooled film;
peeling the cooled film from the support;
stretching the peeled film; and
winding the stretched film to form a roll.

* * * * *